United States Patent [19]

Davis

[11] Patent Number: 4,673,937

[45] Date of Patent: Jun. 16, 1987

[54] AUTOMOTIVE COLLISION AVOIDANCE AND/OR AIR BAG DEPLOYMENT RADAR

[76] Inventor: John W. Davis, 7817 Ostrow St., San Diego, Calif. 92111

[21] Appl. No.: 758,366

[22] Filed: Jul. 24, 1985

[51] Int. Cl.$^4$ ............................................. G01S 13/93
[52] U.S. Cl. ....................................... 342/72; 342/71; 342/128
[58] Field of Search ............ 343/5 PD, 7 ED, 7 VC, 343/7 VM; 342/27-29, 41, 61, 69-72, 104-109, 113-115, 118, 119, 128, 133

[56] References Cited

U.S. PATENT DOCUMENTS

| | | | |
|---|---|---|---|
| 3,153,230 | 10/1964 | Van Krevelen et al. | 343/7 ED |
| 3,383,678 | 5/1968 | Palmer | 343/5 PD |
| 3,689,882 | 9/1972 | Dessailly | 343/7 VM |
| 3,725,921 | 4/1973 | Weidman et al. | 343/7 VM |
| 3,778,826 | 12/1973 | Flannery et al. | 343/7 VM |
| 4,366,546 | 12/1982 | Tachibana et al. | 343/7 VM X |
| 4,382,291 | 5/1983 | Nakauchi | 343/5 PD X |

OTHER PUBLICATIONS

E. Belohoubek, "Radar Control for Automotive Collision Mitigation and Headway Spacing"; IEEE Trans. on Vehicular Tech. (vol. VT-31, No. 2; 5/82; pp. 89-99).

*Primary Examiner*—T. H. Tubbesing
*Assistant Examiner*—Bernarr Earl Gregory
*Attorney, Agent, or Firm*—Frank D. Gilliam

[57] ABSTRACT

A Doppler radar system for a vehicle providing driver warning, vehicle brake application and air bag deployment. The system produces voltage level input directed to the distance and approach rate to an object, vehicle speed and driving monitor inputs, such as steering angles, turning rates, braking, and acceleration/deceleration. These voltages are properly weighted as to their importance. These weighted instantaneous input voltages are summed. The summed voltage is then compared with a predetermined voltage level dividing safe and danger zones. If the summed level falls within the safe zone, the radar system produces no output signals. If the summed voltage level falls within the danger zone, the radar system produces audio warning signals and if impact with an object is eminent vehicles braking signals are then produced. The invention further includes an air bag deployment feature. A vehicle air bag is deployed when the vehicle speed exceeds a pre-determined value and the distance to impact is within a predetermined distance. The air bag deployment and audio and braking functions are independent.

37 Claims, 12 Drawing Figures

AUTOMOTIVE COLLISION AVOIDANCE AND/OR AIR BAG DEPLOYMENT RADAR

BACKGROUND OF THE INVENTION

This invention relates to vehicle safety devices, and particularly to radar operated vehicle systems for avoiding a collision with dangerous objects and preventing injury to passengers when impact with a dangerous object is eminent.

Many radar systems for the prevention of vehicular collisions with objects in the path of travel of the vehicle have been designed and to a large extent have been moderately successful in warning the driver or automatically braking the vehicle to prevent collisions or deploying air bags when collisions were eminent. Prior art systems have a number of problems when collisions are eminent, among which are the detection of and reaction to non-hazardous targets, the failure to instantaneously vary the activation level of the radar produced signals with varying changes in vehicle conditions, to inactivate or activate air bag deployment systems under certain vehicle conditions and providing input signals relative thereto into the system for proper evaluations for necessary vehicle response and/or air bag deployment. The radar system of this invention is directed towards the solution of these and other problems.

SUMMARY OF THE INVENTION

The radar systems of the invention is based on three primary factors, namely, how far away is the object from the vehicle, how fast is the vehicle traveling and how fast is the vehicle approaching the object. These factors are referred to as range, ground speed and approaching rate. These factors when represented as voltage levels each weighted by an amount equal to the normal operator fear levels in a given driving situation and are then summed to produce an instantaneous voltage level. A predetermined system voltage level separates safe and danger zones. When the instantaneous level of the voltage voltage is below the predetermined system danger voltage level the output control signals from the radar systems are passive and when the instantaneous system voltage level is above the predetermined danger voltage level the radar system becomes active and initiates audio warnings and activates braking. If the danger level is one of eminent impact with an object and the vehicle forward speed is above a second predetermined level, air bag deployment is initiated by the radar system. The radar system is designed to deploy the air bag in approximately 0.2 seconds before impact at all approaching speeds between 35 and 204 miles per hour (MPH). This feature allows sufficient time for the air bag to fully inflate prior to impact. The total time it takes the radar system of the invention to activate air bag deployment is approximately 0.01 seconds (1 foot at 68 MPH) from the time the object first appears to the radar.

A driving monitor circuit monitors the vehicle's operation as it is driven and feeds this information into the radar system, which produces an additional weighted voltage level. This is normally a negative voltage and when summed with the above mentioned voltage levels modify the otherwise safe or danger level of the voltage which in effect is a reduction of the driver's overall fear level. If the vehicle is braked or accelerated or turned sharply at various speeds, these conditions are reflected into the summed voltage levels already established for straight-line driving conditions. Simply stated, the radar system of the invention evaluates a plurality of conditions (nine) in the same manner which these conditions collectively are normally evaluated by the operator of a vehicle with regard to an overall degree of safety or danger.

An object of this invention is to provide a Doppler radar system which evaluates a plurality of inputs, produces voltage levels therefrom each of which are weighted accordingly to a normal vehicle operator's sensed safe or danger levels, these weighted voltage levels are then summed to produce a voltage level related to the overall operator sensed degree of safe or danger conditions.

Another object of this invention is to produce an air bag signal when collision with a dangerous object is eminent and the vehicle is traveling toward the object above a predetermined speed.

Still another object of the invention is to produce summed voltage levels representative of various degrees of safe and dangerous driving conditions normally sensed by the vehicle operator which place the vehicle operation in a safe zone where the system is passive or a danger zone when the system produces output signals for audio warnings of different representative fear levels and signals for applying partial vehicle braking and air bag deployment at selected predetermined danger levels.

Still another object of this invention is to provide operation input means to the radar system for varying the vehicle operator fear and danger representative voltage levels produced thereby.

A further object of the invention is to provide an anti-collision vehicle radar control which enables the vehicle operator to readily override the control system when so necessary.

A still further object of the invention is to automatically provide a marginal operating parameter of the vehicle condition in relation to the normal safe and danger conditions sensed by a vehicle operator and initiate appropriate vehicle response signals when the normal safe conditions are exceeded.

The above and other objects, features and advantages of the present invention will become more apparent from the following description of the preferred embodiment thereof taken in conjunction with the accompanying drawings wherein:

DETAILED DESCRIPTION OF THE DRAWINGS

Figure 1:
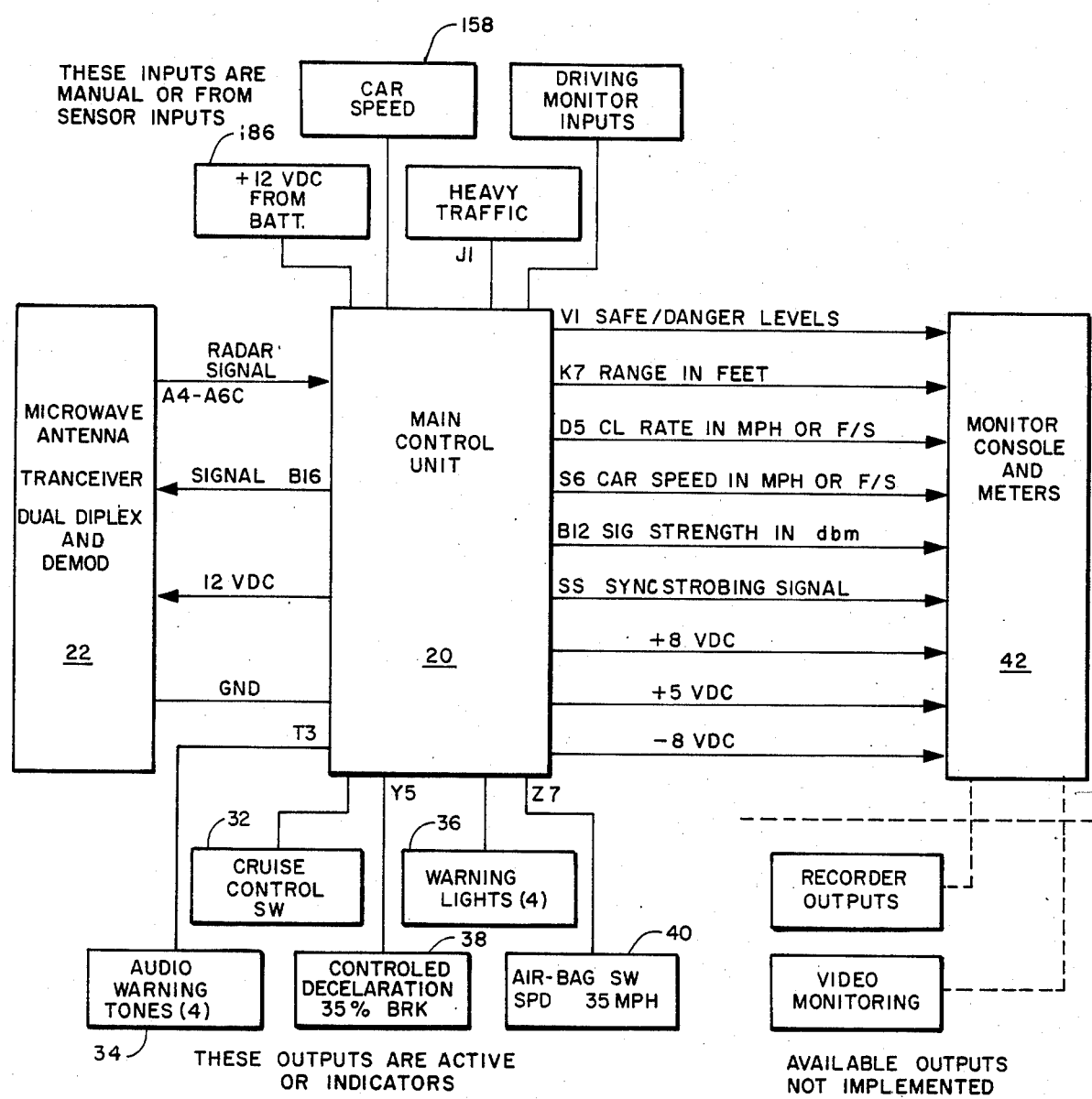
FIG. 1 is a block diagram of the invention showing the central unit, various inputs thereto, outputs therefrom and monitors.

Referring now to the various drawing Figures wherein the same reference numeral is used to depict the same or like element and the various arrow heads indicate signal flow in the various circuit diagrams. The following is a list of circuit designators use to identify the application of the various components throughout the description:

- A = Amplifier and Diplex Channels
- B = Log—Amp and Threshold Circuits
- C = Capacitors
- D = Doppler Speed Channel and Circuits
- E = Directional Doppler
- F = Air-Bag Signal Strength Circuits
- G = Air-Bag Doppler Circuits
- H = Air-Bag Range Circuits
- I = Metering and Indicating Devices
- J = Sensor and Switch Inputs
- K = Range Channel and Circuits
- L = Inductors
- M = Diplex Generator and Modulator Circuits
- N = Driver-Monitor "Sum" Circuits
- O = NOT USED
- P = DC "Power-Down" Circuit
- Q = Transistors
- R = Resistors
- S = Vehicle Speed Channel and Circuits
- T = Tone Generator and Power Amp Circuits
- U = Integrated Circuits
- V = Main Radar "Sum" Circuits
- W = Warning "Level" Circuit
- X = Caution "Level" Circuit
- Y = Braking "Level" Circuit
- Z = Air-Bag "Sum" Circuits and Switches
- AA = Pendulum Circuits J4
- BB = Braking Input Circuit J5
- CC = Carburetor Vacuum Circuit J6
- DD = Steering Angle Input Circuits J7
- EE = "Look-Ahead" Circuit
- FF = "High-Speed" Turn Circuits
- GG = "Driver Under Control" Circuit
- HH = "Slow-Speed" Modifier Circuit
- KA = Long-Range Circuits Centrally located in the FIG. 1 showing is the main control unit 20 which is mounted at a convenient location in the interior of the vehicle (not shown). The main control unit 20 receives signals and transmits signals according to the direction of the arrow heads on the interconnecting lines therefrom. On the left hand side of the FIG. 1, the external mounted portion 22 of the system is shown which is generally located at the front most of the vehicle. This unit 22 includes a microwave antenna which is shock mounted to the vehicle by use of a shock absorbing medium such as, rubber or the like to isolate any vehicle vibration from the antenna, a microwave transceiver, a low-noise amplifier and the diplex generator with its respective modulator and demodulator circuits. As shown by the interconnecting lines to the main control unit 20, a radar object reflection signal is received by the main control unit from the outside unit 22. A threshold control signal B16 from the main control unit is transmitted through interconnecting lines to the outside unit as it is a 12 volt D.C. operating voltage. The outside unit is connected to a common system ground. The external inputs to the main control unit are shown on the upper central portion of the Figure. The 12 volt D.C. source 20 is supplied to the main control unit, as is the car speed taken from the cruise control 158 or a like pickup (not shown), as well as the vehicle operator traffic condition manual input J1 and the driving monitor inputs, hereinafter discussed in more detail. Positioned on the Figure below the main control unit are shown some visual indicators interconnected to the main control unit for supplying information thereto. The indicator 32 is the cruise control setting, the indicator 34 is the audio warning which includes tones, warning lights 36, control deacceleration for the brakes 38, and an air bag energize/deenergize switch 40.

On FIG. 1 at the right hand side of the main control unit 20 are a plurality of interconnecting lines to the monitor console 42 and to meters located within the vehicle for monitoring the entire system. The monitoring console 42 is supplied with input signal V1 indicating the safe/danger levels, the range K7 in feet (0–250'), the car closing rate D5 to a dangerous object in MPH or feet per second, the car speed S6 in miles per hour or feet per second, the signal strength B12, a regulated positive 8 volts D.C. source, a regulated 5 volts D.C. source, a sync strobe signal and a regulated minus 8 volts D.C. source. The reason for these monitors will be hereinafter explained in more detail. Further, there are available outputs from the monitor console 42 to supply signals for a data recorder if desired and a video monitoring device.

Referring now specifically to FIGS. 2A, 2B, 2C and 2D. These Figs.; combined as shown in FIG. 2, are a detailed block diagram showing of the entire collision radar system of the instant invention. A microwave antenna 48 which transmits a dual-diplexed radar signal forward of the vehicle and also receives the return signals. The antenna which is rotatably positionable in a manner hereafter described is interconnected to a coupler or circulator 49 through line 50 which relays signals in both directions. Power to the antenna 48 is fed through the circulator or coupler 49 is supplied by a gunn diode transmitter 58 and interconnected circuit which includes a system clock 52 (U1, Q4), a dual diplex generator 54 (U2–U6), a gunn diode modulator 56, (Q5 and Q6), a directional coupler 60, and an RF load 62. The object reflection signal received from the antenna 48 is fed through the coupler 49 to a shockley diode receiver 64 which produces an output signal A which provides an input signal to a low noise pre amplifier 66 (U8). The output signal A4 from the low noise preamplifier 66 is routed to the input of a low pass filter 68. The output signal B from low pass filter 68 provides an input to a log-linear converter 70 (Q7, Q8, Q9, Q10 and Q11) the output signal therefrom B8 provides an input signal to a D.C. offset amplifier 72 (U21A) the output signal B10 therefrom provides an input signal to a D.C., amplifier 74 (U21B) the output signal B12 provides an input to a threshold detector 76 (Q12, Q13 and Q14) its output B16 provides inputs to a logic buffer 78 (U22) the input signal and dual duplex generator 54 to a logic sensor 80 (U23), which has two output signal paths B19 and B19A. B19A is connected to a loss signal indicator 82. B19 is connected to a common connection between a short range hold switch 84 (U33A) and a second hold switch Doppler 86 (U33B).

Output signal B10 hereinafter mentioned also provides an input to a signal strength D.C. amplifier 88 (U39A). Output signal B21 from the threshold detector 76 is connected to one input of a range slope inverter 90 (Q27) and to on input of a long range slope inverter 92 (Q16). An output signal K from Q27 provides an input to integrator range 85 (U36C) and hold switch 84 (U33A). The output H3 of integrator range 85 provides an input to D.C. range offset amplifier 87 (U36D, U38D).

The signal A4 is further connected to de-modulator switches 94, 96, 98, 100 (U7A–U7D), and provides four separate channels (A5–A5C). The dual diplex generator 54 (U2–U6) feeds timing pulses (M9, M10, M13, and M14) to their respective de-modulator switches (U7A,B,C, and D). The circuits providing signals A5 to A17 are identical for, all four channels. Following only one channel for ease of explanation, signal A5 is connected to a low pass filter 102A (U11), and also receives a timing signal M3 from the system clock 52 (U1, Q4). This timing signal is also applied to the other low pass filters 102D–102B (U9, U10, U11 and U12). Output signal A6 from U11 is applied to the compressor amp 104A (U13A and U14A). The output A9 from U13 and U14 is applied to the input of amplifier 106A (U17A). The output signal A14 from U17A supplies an input signal to squaring amp 108A (U18A and U18B). The output signal A17 from the squaring amplifier (U18A and B) provides an input signal to channel 1 short range phase detector 110, and one input to the directional Doppler detector 112 (U24, U25, and Q15). A second signal A17A from compressor amp 104B (U13B, U17B), map 106B (U17B) and squaring amp 108B (U18C, U18D). Amp 108B provides a second input to the directional Doppler detector 112 and is also fed to channel 2 short range phase detector 114. The output of the directional Doppler detector 112 provides a directional doppler signal E4. Signals A17B and A17C, compressor amp 104C (U15A, U16A), amp 106C (U19A) and squaring amp (U20A, U20B) and compressor amp 104D (U15B, U16B), amp 106D (U19B) and squaring amp 108D (U20C, U20D) respectfully are applied to the long range phase detector 116. A second output A17D from amp. 108B provides a Doppler signal. Output signal KA is connected to the long range slope inverter 92 (Q16) which also has an input B21 from the threshold detector 76 (Q12, 13 and 14 described earlier). Signal KA2 the output from Q16, is applied to the long range integrator 118 (U27A) and the output KA4 from U27A provides an input to the long range comparator 120 (U27B and Q17). The output K4 from comparator 120 is the range disable signal.

The signal A17D from Amp 108B is connected to the input of Doppler frequency/analog converter 122 (U35A) the output D therefrom provides an input to hold switch 86 (U33B). The output D also provides an input to the integrator Doppler 124 (U36A). The output G2 from the Doppler integrator 124 is connected to the input of a Doppler D.C. amplifier 126 (U36B), the output G5 from D.C amplifier 126 provides inputs to a Doppler buffer amplifier 128 (U38A) and the Doppler threshold comparator 130 (U38C). The output of Doppler amplifier buffer 128 provides one input G6A to the air bag summing amplifier 132 (U38B). The output of the Doppler threshold comparator 130 and H6 DC from offset and range amplifier 87 provide second and third inputs to the air bag summing amplifier 132 (U39B). The output Z1 from amplifier 132 provides an input to air bag comparator 134 (U40D). The output Z3 from the air bag comparator 134 takes two paths, one path provides an input to an air bag tone switch 136 (Q34) and the other provides one input to an air bag power switch 138 (Q33), the output Z7 from the air bag power switch 138 provides an input signal Z7 to convenient air bag deploying mechanism (not shown). The air bag tone switch 136 provides an input Z6 to a tone generator 142 (U41). The output T1 from the tone generator provides an input to audio power amplifier 143 (U42), the output of 143 T3, is connected to an 8 ohm speaker (not shown).

The output K from the range slope inverter 90 (Q27) provides an input to the hold switch 84 and to intergrator range switch 85 (U36C). The output K1 from the hold level switch 84 (U33A) provides an input to a range integrator circuit 144 (U34A). The output K4 from the range integrator circuit 144 provides the input to the D.C. offset and range amplifier circuit 146 (U34B and U37A) which also receives a second range disable input signal K4 from the comparator 120. The output K7 of the D.C. offset and range amplifier 146 provides an input to a main summing amplifier 148 (U37D).

The output from hold switch 86 provides an input D1 to a Doppler integrating circuit 152 (U34C). The output D4 from circuit 152 supplies an input to a D.C. Doppler amplifier 154 (U37B). The output D5 from the amplifier 154 provides a second input to the main summing amplifier 148.

The inputs to a speed frequency to analog converter 156 (U35B) is provided from an automobile speed transducer (not shown) and typical of those used with conventional speed controllers of the magnetic pickup drive shaft mounted type. The output S2 from the speed frequency to analog converter 156 provides an input to the speed integrator circuit 160 (U35D). The output S4 from the speed integrator provides an input to D.C. amplifier speed circuit 162 (U37C), inputs to compatator high speed 164 (U48A), inverted speed 166 and slow speed modifier 170 (U47C, U47D). The output S6 from amplifier 162 provides a third input to the main summing amplifier 148 (U37D).

The output V2 from the main sum amplifier 148 takes two paths. One path is to a warning comparator 172 (U40A). The output W1 of warning comparator 172 is connected to a tone generator power switch 174 (Q28 and Q29). The output W4 from the tone generator power switch 174 supplies DC power to the tone generator 142 (U41). The second path of output V2 provides an input to the caution comparator 176 (U40B). The output X1 of the caution comparator provides an input to a caution tone switch 178 (Q30). The output X3 from the caution tone switch 178 is connected to the tone generator 142.

A second output V1 from the main summing amplifier 148 provides an input to a brake comparator circuit 180 (U40C). The output Y1 from brake comparator 180 takes three paths; one path is to a brake tone switch 181 (Q31), the output Y3 of bake tone switch 181 is connected to tone generator 142. Another path of output Y1 provides an input to the driver monitor sum modifier 150 (Q43). The other output Y1 of the brake comparator circuit 180 provides an input to a brake power switch 182 (Q32). The output Y5 from the brake power switch 182 is applied directly to the braking control circuits. The brake control circuits connect the electric output signal Y5 to vehicle braking means not shown.

Referring now again to the tone generator 142. As aforementioned, the output T1 of the tone generator provides an input to audio power amplifier 143 (U42), the output T3 of U42 is connected to the speaker (as hereinbefore discussed) so that the operator of the vehicle receives an audio warning.

The output F1 from the signal strength D.C. amplifier 88 provides an input to a signal strength comparator and switch 184 (U39B), the output F3 from 184 is connected to the input of an air bag disable switch 186 (Q36, Q39C). The output Z4 of the air bag disable switch 186 and the output from power up air bag control 190 (Q35) provide an input to the air bag power switch 138 (Q33). The switch 186 is connected to a 12 V DC power source hereinafter discussed and switch 190 is connected to a 8 V DC source.

The output FF3 of the vehicle speed inverter 166 provides one input to a high speed enable switch 192 (U49A). The second input FF2A to the high speed enable switch 192 is provided from the output of the high speed comparator 164. The output FF4 from switch 194 provides an input to a turning enable switch 194 (U49B). The output FF5 from the turning enable switch 194 provides one input to driver monitor sum amplifier 196 (U47A). The output FF2A from compatator high speed 164 is also connected as the input to enable low speed switch 198 (Q42). The output FF4A from output enable switch 198 provides an input to a low speed steering angle switch 200 (U49C).

An Inverted Turning Circuit 202 (U48D) receives its input signal DD from a switch assembly hereinafter discussed operated by the vehicle steering linkage. The output DD is also supplied to the turn comparator 204 (U48C). The output DD1A of the turn comparator 204 takes two paths; one path to a second input of the turning enable switch 194 and the second path provides an input to the inverted turn circuit 206 (U50A, U50B). The output DD2 of the circuit 202 provides an input to the low speed turning switch 200. Output signal DD4 from switch 200 provides another input to signal amp. 196.

The conventional vehicle brake lamp switch (not shown) when closed provides a +12 V signal input BB to driver control logic 208 (U50D), to slow speed modifier 170 (U47C, U47D) and to inverted brake circuit 209 (U50C). The output BB2 from circuit 209 provides one input to look ahead logic 210. A second input to logic 210 is provided from output DD 3A from switch 206. The output GG2 from the logic 208 provides another input to sum amp 196.

The vehicle intake manifold vacuum switch either supplies a +12 V or 0 V signal input CC to the Logic 208, to modifier 170 and to look ahead logic circuit 210 (U51). The output EE2 of logic 210 and the output signal HH5 from modifier 170 provides additional input to sum amp 196.

A signal AA from a pendulum switch, hereinafter discussed, provides an input to pendulum logic 212 (U47B, Q44). The Output Signal AA4 from 212 provides an input to sum amp 196. The output V of the sum amp 196 is connected to an input of the main summing amplifier 148. Output N from Disable 150 provides another input to sum amp 196.

Figure 3:
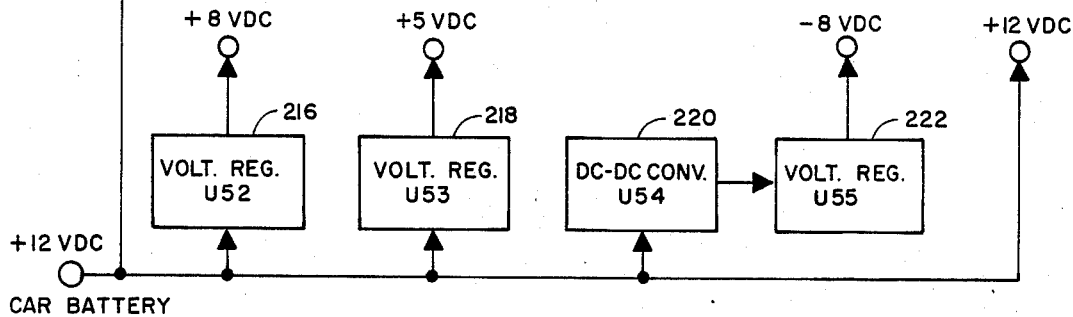
FIG. 3 is a block diagram of the power supplies of the invention.
Figure 2C:
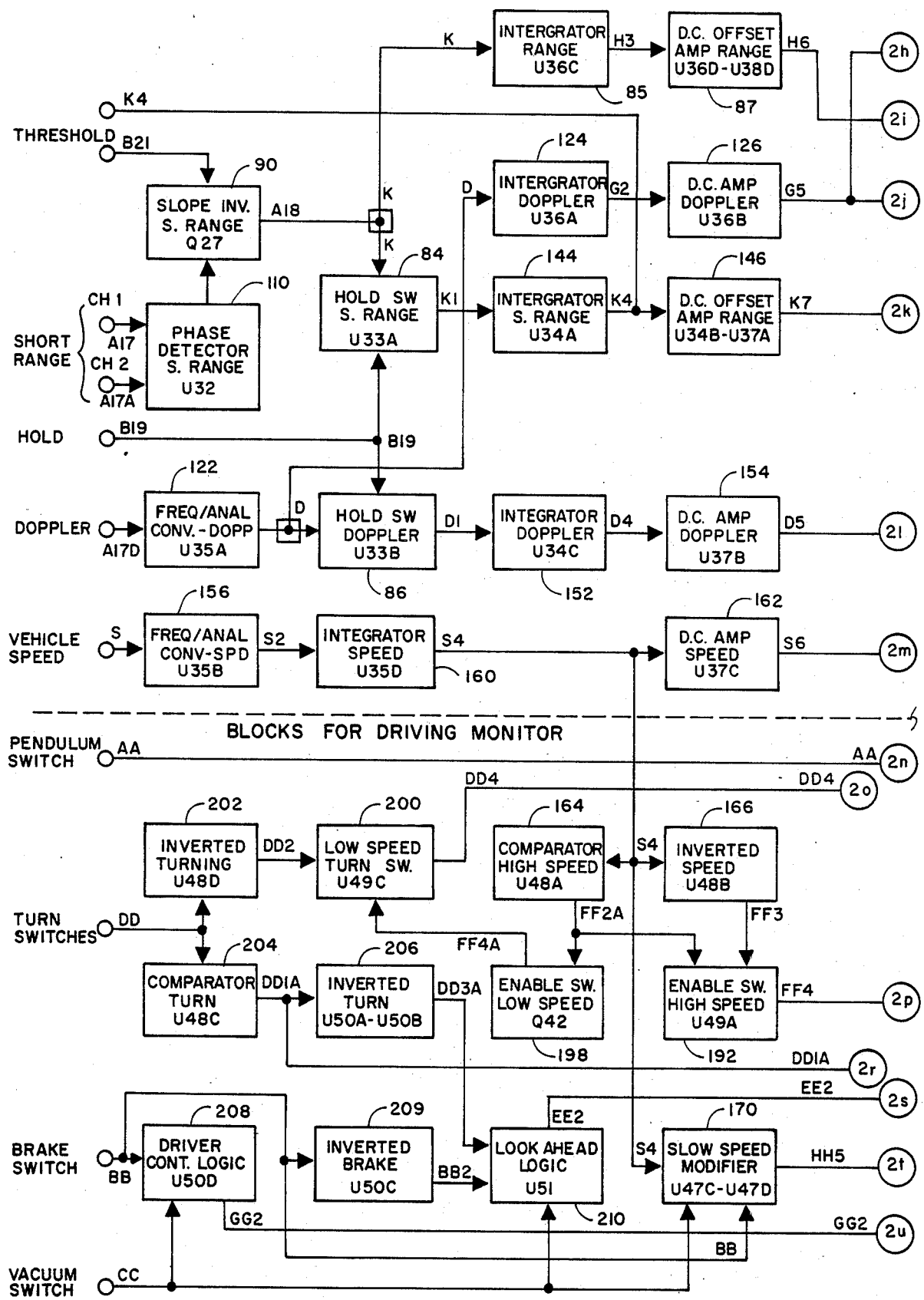
Figure 2D:
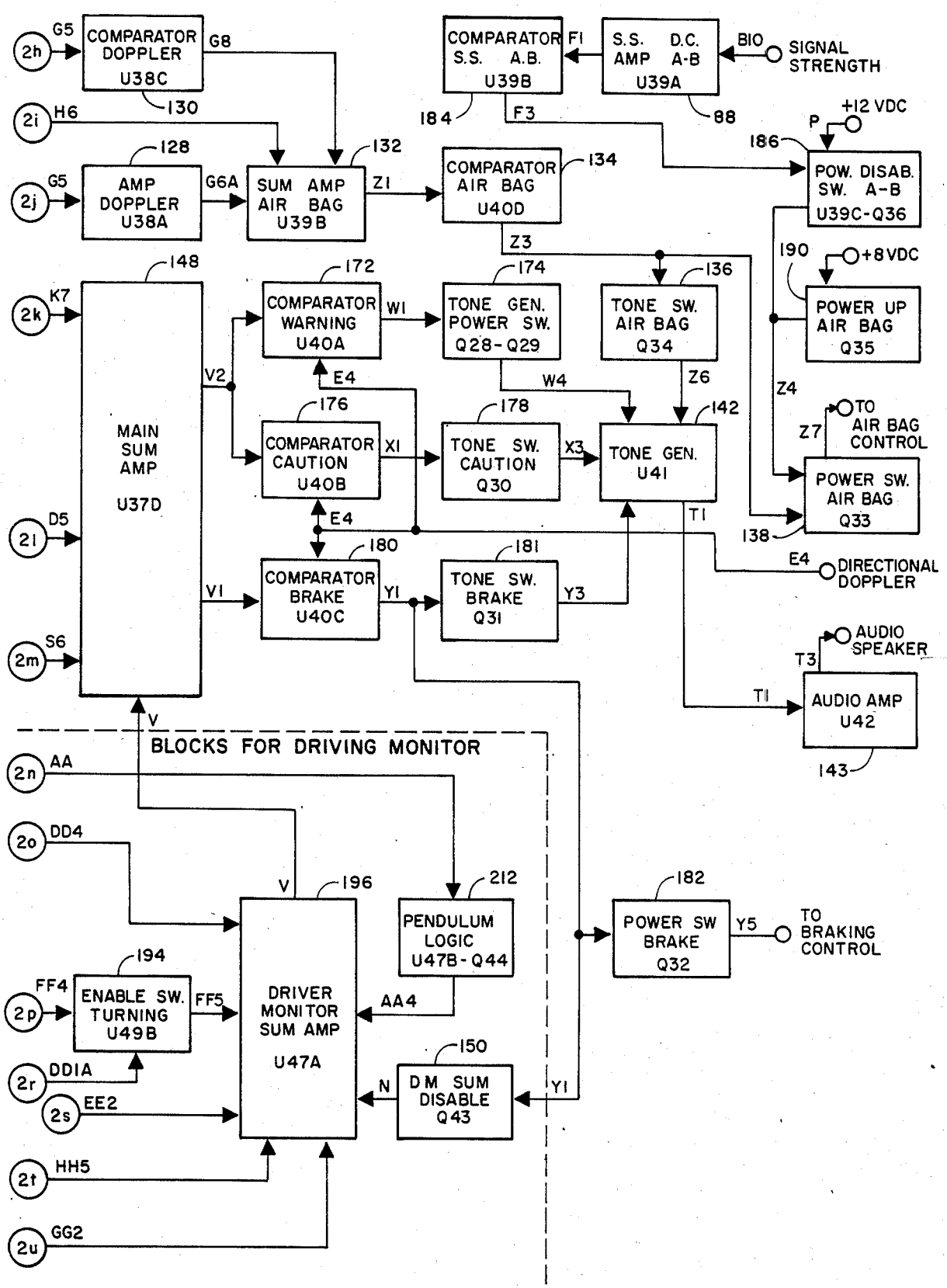

Referring now to FIG. 3, the main control unit 20 provides a source of switched 12 V DC voltage from the battery of the vehicle. This source provides an input to power a +10 V DC regulated supply 214 (Q1, Q2, Q3), a +8 V DC regulated power supply 216 (U52), a +5 V DC power supply 218 (U53) and a DC-DC converter 220 (U54). The DC-DC convertor provides a power source for a 8 V regulated DC power supply 222 (U55).

Figure 4:
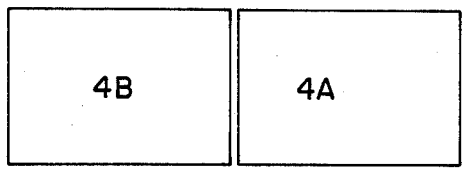
FIG. 4 depicts the relative positions of FIGS. 4A and 4B.
Figure 4A:
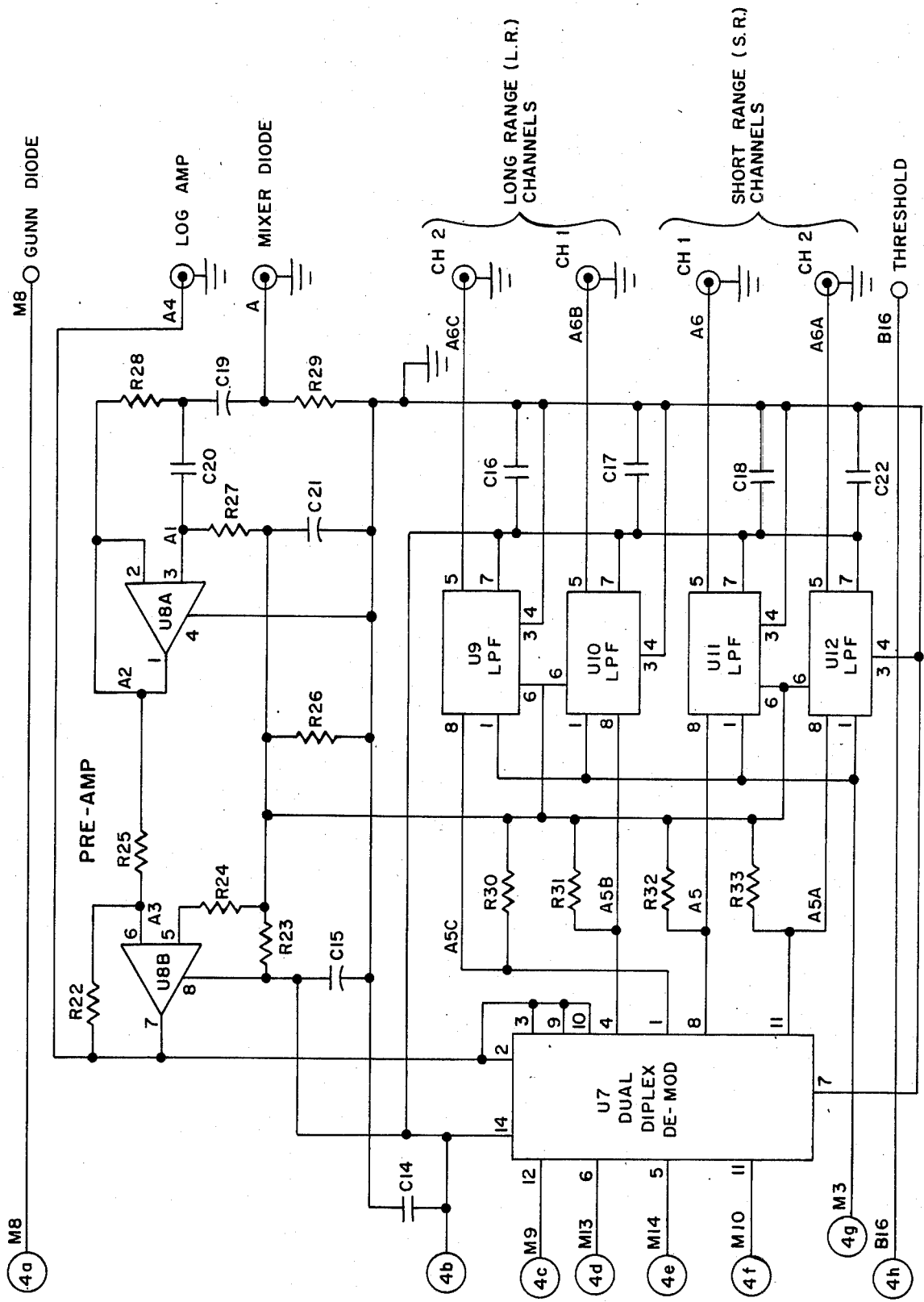
FIGS. 4A and 4B are detailed block diagrams of the drive monitor circuit of FIGS. 1 and 2.
Figure 4B:
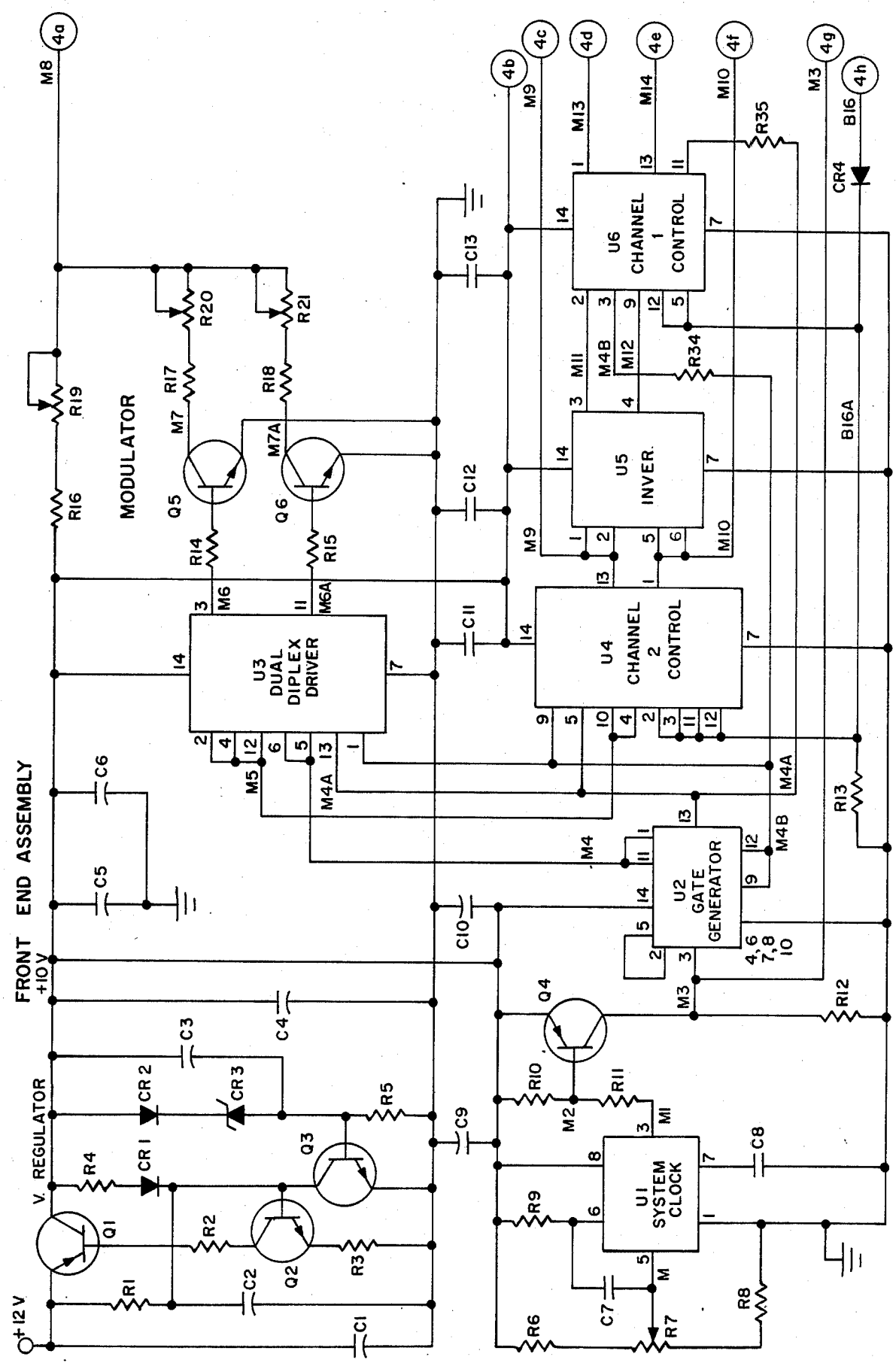

Referring now to FIGS. 4A and 4B. These combined Figs. as shown in FIG. 4 are a detailed block diagram of the front end circuit of FIG. 2. Beginning at mixer diode input point A (reference Mixer Diode) on the righthand side of FIG. 4A, the center lead of a shielded wire is connected to one side of capacitor C19 of 0.47 microfarads and through resistor R29 of 1.5K ohms to ground. The outer shield of the shield wire is connected directly to ground. The other end of capacitor C19 is connected to one end of resistor R28 of 5.11K ohms and through capacitor C20 of 0.47 microfarads to line A1 which connects to terminal 3 of pre-amp U8A and to one end of a resistor R27 of 10K ohms. The other end of R28 is connected to both terminals 1 and 2 A2 of U8A and to one end of resistor R25 of 1K ohms. Terminal 4 of U8A is connected to ground. The other end of R27 is connected to the positive 5 volt bias line, the positive end of capacitor C21 of 22 microfarads, terminal 6 on each of low pass filters U9, U10, U11 and V12, one end of the following resistors, R26 of 10K ohms, R23 of 10K ohms, R24 of 1K ohms, R30 of 1K ohms, R31 of 1K ohms, R32 of 1K ohms and R33 of 1K ohms. The other ends of both C21 and R26 are connected to ground. The other end of R23 is connected to the positive 10 volt line, terminal 8 of pre-amp U8B and through a capacitor C15 of 0.01 microfarads to ground. The other end of R24 is connected to terminal 5 of amplifier U8B. The other end of R25 A3 is connected to one end of resistor R22 of 10K ohms and to terminal 6 of U8B. The other end of R22 is connected to the following terminal 7 of U8B, terminals 2, 3, 9 and 10 of dual diplex demodulator U7 and the center lead of log amp shielded output A4. The outer shield of A4 is connected to ground.

Beginning now at circuit point M in the lower left hand corner of FIG. 4B, terminal 5 of system clock U1 is connected to one end of capacitor C7 of 0.001 microfarads and to the wiper of potentiometer resistor R7 of 10K ohms. The other end of C7 is connected to terminal 6 of U1 and to one end of resistor R9 of 2.21K ohms. The other end of resistor R9 is connected to the following, one end of resistor R6 of 3.32K ohms, one end of resistor R10 of 1K ohms, the emitter of transistor Q4, the positive 10 volt line, terminal 8 of U1 and one end of capacitors C9 of 0.01 microfarads. The other end of C9 is connected to ground. The other end of R6 is connected in series with resistors R7 and R8 of 33.2K ohms to ground. Terminal 7 of U1 is connected through capacitor C8 of 470 picofarads to ground. Terminal 1 of U1 is connected directly to ground. The other end of R10 is connected to one end of resistor R11 of 3.01K ohms and to the base of Q4 at signal reference M2. The other end of R11 is connected to terminal 3 of U1 M1. The collector of Q4 is connected through resistor R12 of 1K ohms to ground to terminal 3 of gate generator U2 and to terminal 1 of U9, U10, U11 and U12. Terminals 2 and 5 of U2 are connected together. Terminals 4, 6, 7, 8 and 10 of U2 are all connected to ground. Terminals 9 and 12 signal M4B of U2 are both connected to one end of resistor R34 of 5.62K ohms to terminal 9 of channel 2 control U4 and to terminal 1 of dual diplex driver U3. Terminal 13 of U2 signal M4A is connected to terminal 13 of U3 and to terminal 5 of U4 and to one end of resistor R35 of 5.62K ohms. Terminals 1 and 11 of U2 signal M4, and terminals 5 and 6 of U3 are interconnected. Terminal 14 of U2 is connected through capacitor C10 of 0.1 microfarads to ground and to the positive 10 volt line. Also connected to the positive 10 volt line is one end of each of the following: the positive end of capacitor C4 of 47 microfarads, the positive end of capacitor C3 of 2.2 microfarads, the anode of diode CR2, one end of resistor R4 of 511 ohms and the collector of transistor Q1. The other end of C4 is connected to ground, the other end of C3 is connected to the anode of diode CR3, one end of resistor R5 of 100 ohms and to the base of transistor Q3. The cathode of CR3 is connected to the cathode of CR2. The emitter of Q3 and the remaining end of R5 are connected to ground. The other end of R4 is connected to the anode of diode CR1. The cathode of CR1 is connected to one end of resistor R1 of 47K ohms, to one end of capacitor C2 of 0.1 microfarads and to both the collector of Q3 and the base of transistor Q2. The emitter of Q2 is connected to one end of resistor R3 of 47 ohms. The other end of R3 and C2 are connected to ground. The collector of Q2 is connected through resistor R2 of 180 ohms to the base of transistor Q1. The emitter of Q1 is connected, along with the positive end of capacitor C1 of 2.2 microfarads and the other end of R1, to the positive 12 volt DC. The other side of C1 is connected to ground.

Continuing now with the connections to U3, terminal 14 is connected to the positive ends of both capacitors C6 of 22 microfarads and C5 of 0.01 microfarads and to the positive 10 volt line. The other ends of C5 and C6 are connected to ground. Terminal 3 of U3 signal M6 is connected through resistor R14 of 1.5K ohms to the base of transistor Q5. Terminal 11 of U3 signal M6A is connected through resistor R16 of 1.5K ohms to the base of transistor Q6. The emitters of both Q5 and Q6 are connected to ground. The collector of Q5, signal M7, is connected through resistor R17 of 56 ohms to one end of potentiometer resistor R20 of 500 ohms. The collector of Q6, signal M7A is connected through resistor R18 of 511 ohms to one end of potentiometer resistor R21 of 10K ohms. The remaining ends and wipers of both R20 and R21, signal M8, are interconnected to a common line which is connected to one end of and to the wiper of potentiometer resistor R19 of 10 ohms and to the gunn diode output terminal. The other end of R19 is connected through one watt resistor R16 of 10 ohms to the positive 10 volt line.

Referring again to U3, terminals 2, 4 and 12 signal M5, are all connected to each other and to both terminals 4 and 10 of channel 2 control, U4. Terminal 7 of U3 is connected to ground. Terminal 14 of U4 is connected to the positive 10 volt line and capacitor C11 of 0.01 microfarads. Terminals 2, 3, 11 and 12 of U4, signal B16A, are all connected together to terminals 5 and 12 of channel 1 control U6, to the cathode of diode CR4 and through resistor R13 of 10K ohms to ground. Terminal 7 of U4 and the other end of C11 is connected to ground. Terminal 13 of U4 signal M9 is connected to terminals 1 and 2 of inverter U5 and to terminal 12 of U7.

Terminal 1 of U4 signal M10 is connected to terminals 5 and 6 of U5 as well as to terminal 13 of U7. Terminal 14 of U5 is connected through capacitor C12 of 0.01 microfarads to ground and to the positive 10 volt line. Terminal 3 of U5 signal M11 is connected to terminal 2 of U6. Terminal 4 of U5 signal M2 is connected to terminal 9 of U6. Terminal 3 of U6, signal M4B is connected to the other end of R34. Terminal 14 of U6 is connected through capacitor C13 of 0.01 microfarads to ground and to the positive 10 volt line. Terminals 7 of U5, U6 and U7 are all connected to ground. Terminal 1 of U6, signal M13 is connected to terminal 6 of U7, and terminal 13, signal M14, is connected to terminal 5 of U7. Terminal 11 of U6 is connected to the other end of R35. Terminal 14 of U7 is connected through the capacitor C14 of 0.01 microfarads to ground and to the positive 10 volt line.

Terminal 4 of U7 signal A5B is connected to terminal 8 of U10 and to the other end of R31. Terminal 1 of U7, signal A5C, is connected to terminal 8 of U9 and to the other end of R30. Terminal 8 of U7, signal A5 is connected to terminal 8 of U11 and to the other end of R32. Terminal 11 of U7, signal A5A, is connected to terminal 8 of U12 and to the other end of R33. Terminal 5 of U9, signal A6C, is connected to long range channel 2 output. Terminal 7 of U9 is connected through capacitor C16 of 0.1 microfarads to ground and to the positive 10 volt line.

Terminals 3 and 4 of U9, U10, U11 and U12 are connected to ground. Terminal 7 of U10 is connected through capacitor C17 of 0.1 microfarads to ground and to the positive 10 volt line. Terminal 7 of U11 is connected through capacitor C18 of 0.1 microfarads to ground and to the positive 10 volt line. Terminal 7 of U12 is connected through capacitor C22 of 0.1 microfarads to ground and to the positive 10 volt line. Terminal 5 of U10, signal A6B, is connected to the long range channel 1 output. Terminal 5 of U11, signal A6, is connected to the short range channel 1 output. Terminal 5 of U12, signal A6A, is connected to the short range channel 2 output. The outer shields of outputs A6, A6A, A6B and A6C are connected to ground. The anode of CR4 is connected to threshold output signal B16.

Figure 6:
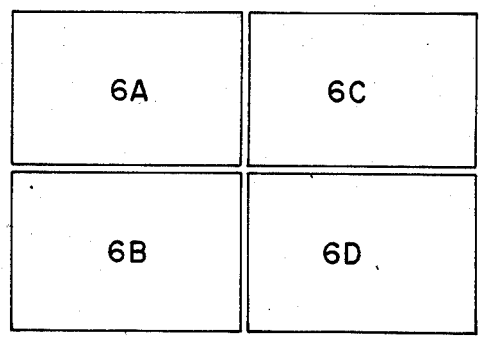
FIG. 6 depicts the relative positions of FIGS. 6A, 6C and 6D.
Figures 2, 2B:
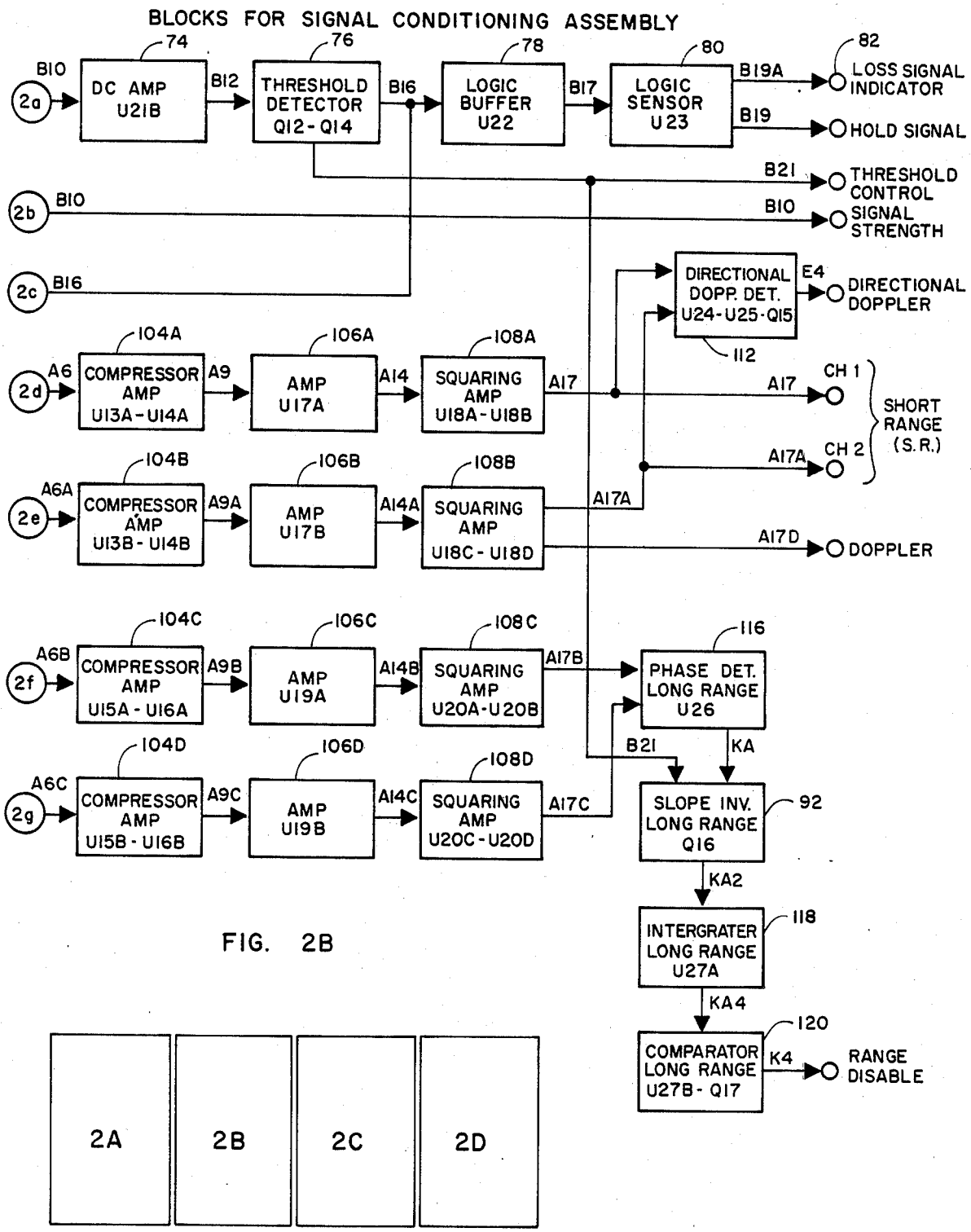
FIG. 2 depicts the relative positions of FIGS. 2A, 2B, 2C and 2D.
FIGS. 2A, 2B, 2C and 2D represent a detailed block diagram of FIG. 1.
Figure 2A:
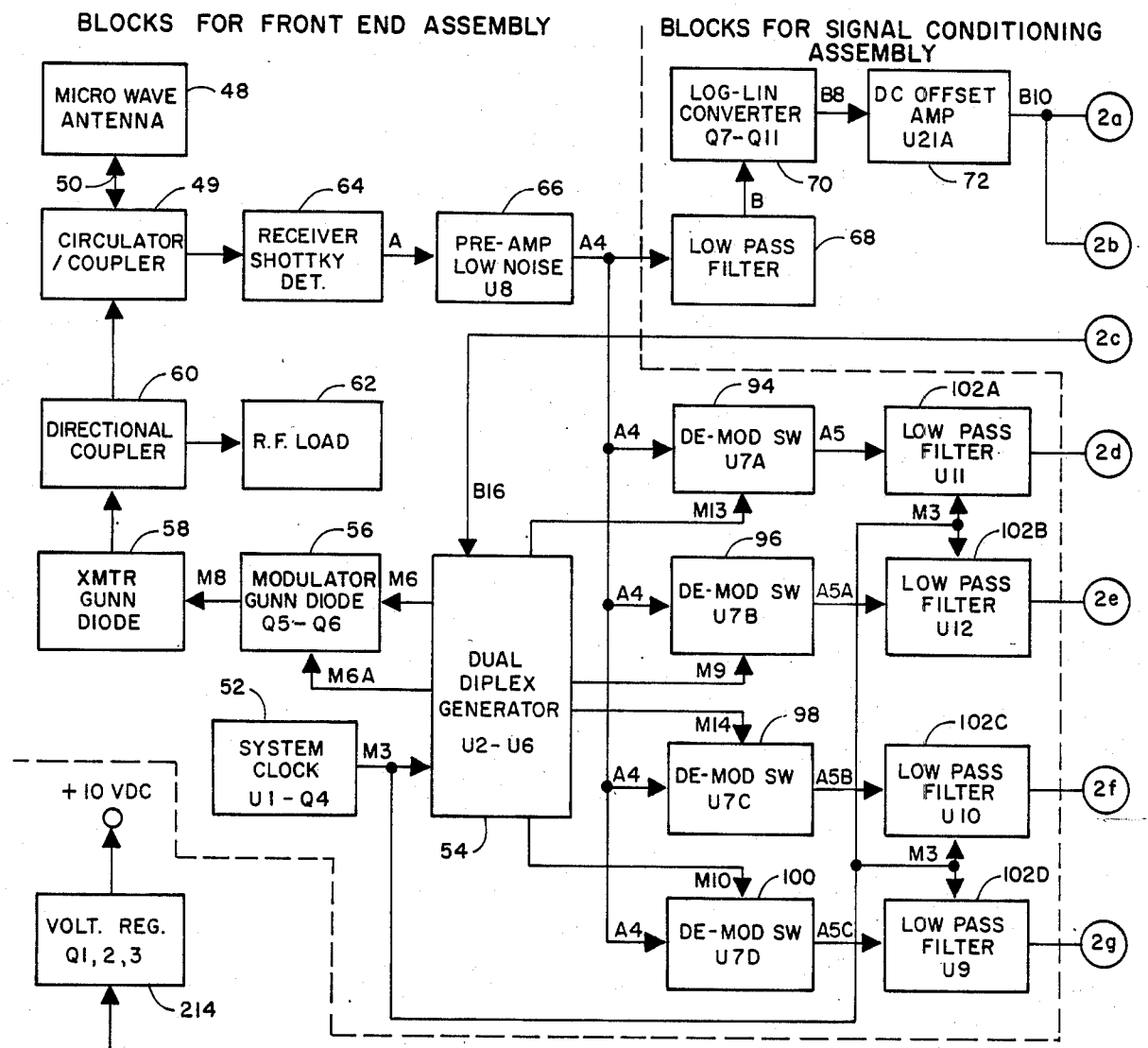

Referring now specifically FIGS. 6A, 6B, 6C and 6D which are a schematic showing of the signal conditioning circuit of FIGS. 2A and 2B. These Figs are combined as shown in FIG. 6. The input A4, the output of the preamplifier 66 and is connected to L1, an inductor of 2.2 milli henries the output of L1 is connected through a 0.1 microfarad capacitor C26 to ground potential and through a second series 2.2 milli henry inductor L2. The output of the inductor L2, signal B, is connected through a 0.047 microfarad capacitor C27 and through resistor R189 of 470 ohms to ground potential and through a capacitor C29 of 10 microfarads. The output end of C29, signal B1 is connected to the base of transistor Q7. The base of Q7 is connected to resistor R190 of 5.1K ohms. The emitter of transistor Q4 is connected to ground potential through a 22 microfarad capacitor C30 and to one end of a 5.11K ohm resistor R191. The other end of the resistor R191 is connected to a capacitor C28 of 22 microfarads. The other side of C28 is connected to ground potential. The resistor R191 is also connected through a 47 ohm resistor R42 to the emitter of transistor Q11. Also connected at one end to a point electrically common to the R191 side of R42, is a resistor R194 of 5.1K ohms, resistor R37 of 5.11K ohms, resistor R40 of 5.11K ohms and a capacitor C36 of 0.01 microfarad. The other end of capacitor C36 is connected to ground potential. The collector of transistor Q7, signal B2, is connected through a 5.11K ohm resistor R192, through a capacitor C31 of 0.001 microfarads to ground potential and to the positive side of capacitor of C32 of 10 microfarads. The negative side of capacitor C32 is connected to the base of transistor Q8, signal B3. Also connected to the base of transistor Q8 is resistor R193 of 5.11K ohms. The emitter of transistor Q8 is connected through capacitor C33 of 22 microfarads to ground potential and to the other side of resistor R194. The collector of transistor Q8, signal B4, is connected through resistor R36 of 5.11K ohms and through capacitor C34 of 0.001 microfarads to ground potential. Collector of transistor Q8 is also connected to the positive side of capacitor C35 of 10 microfarads. The opposite side of capacitor C35, signal B5, is connected to one side of R188 of 5.11K ohms and to the base of transistor Q9. The emitter of transistor Q9 is connected to ground through a capacitor C37 of 22 microfarads and to the other end of resistor R37. The collector of Q9, signal B6, is connected to ground potential through a 5.11K resistor R38 and a parallel capacitor C38 of 0.001 microfarads. The collector of transistor Q9 is also connected to the positive side of capacitor C39 of 10 microfarads. The negative side of capacitor C39, signal B7, is connected to the base of transistor Q10 and to one end of resistor R39 of 5.11K ohms. The emitter of transistor Q10 is connected to ground potential through capacitor C40 of 22 microfarads and to the opposite end of resistor R40. The collector of transistor Q10 is connected to ground potential through resistor R41 of 5.11K ohms and parallel capacitor C41 of 0.001 microfarads. The other end of resistors R190, R93, R188 and R39 are connected to a common signal line designated as B8. A capacitor C42 of 4.7 microfarads is connected from this common line B8 to ground potential. Connected in series with the parallel resistors and capacitors connected to common line B8 is a resistor R45 of 100 ohms.

Referring now to transistor Q11, the emitter is connected to the other side of resistor R42. The base is connected through two series diodes, CR5 and CR6, through a potentiometer resistor R43 of 500 ohms operating as a voltage divider. The other end of resistor R43 is connected to ground potential. Also connected to the base of transistor Q8 is the positive side of capacitor C43 of 22 microfarads. The negative side of C43 is connected to ground potential. Additionally connected to the base of transistor Q11 is resistor R44 of 3K ohms. The end of resistor R44 is connected to the collector of Q11 and to the positive 8 volt regulated supply.

One end of resistor R53 of 7.5K ohms is connected to the positive 8 volt D.C. regulated power supply and the other end to one side of potentiometer resistor R49 of 500 ohms. The other side of the potentiometer resistor R49 is connected to ground potential. The wiper of the potentiometer R49 is connected through a resistor R48 of 1K ohms to terminal 2 of the inverting operational amplifier U21A and also through R47 of 1K ohms to the output pin 1 of operational amplifier 72. Capacitor C44 of 22 microfarads is connected across potentiometer R49.

The output terminal 1, signal B10, of operational amplifier U21A is connected through a resistor R50 of 1K ohms to terminal 5 of operational amplifier U21B. Terminal 6 of operational amplifier 74 takes two paths, one path is through resistor R51 of 1K ohms to ground potential and the other path through the feed back circuit which ties through a resistor R52 of 100K ohms to the terminal 7, signal B12, of operational amplifier V21B and also in parallel across a resistor R52 of 100K ohms is a capacitor C124 of 0.18 microfarads. A capacitor C46 of 0.01 microfarads is connected to the 8 V DC at one end and the other end to ground potential. Referring again to operational amplifier U21B. The terminal 8 of operational amplifier is connected to +8 V DC. Terminal 4 is connected to the −8 V DC and also through a capacitor C45 of 0.01 microfarads, to ground potential.

Signal B12 from terminal 7 of operational amplifier U21B is connected to one side of resistor R54 of 3K ohms and through a potentiometer R55 of 10K ohms to ground potential. The wiper of resistor R55 is connected to one side of indicator I7, the opposite side of the indicator I7 is tied to ground potential. The opposite side of resistor R54, signal B13, is connected to the cathode of diode CR7 and to the base of transistor Q12. The collector of transistor Q12, signal B14, is connected through resistor R56 of 5.11K ohms to the +8 volt DC regulated power supply 188 and also through resistor R58 of 10K ohms to the base of transistor Q13, signal B16, through resistor. The emitter of transistor Q13 is also connected directly to the +8 volt DC regulated supply. The anode of CR7 is connected through resistor R59 of 150K ohms to the collector of transistor Q13, signal B16, through resistor R85 of 3.32K ohms to the −8 Volt supply. The emitter of transistor Q12 is connected directly to ground potential.

The collector of transistor Q14, signal B21 (inverted threshold), is connected through R57 of 5.62K ohms to the positive 8 volt DC power supply, and through R170 10K ohms to the base of a transistor Q16, signal KA1, one end of resistor 171 of 10K ohms, one end of resistor R172 of 5.11K ohms. The emitter of transistor Q14 is connected directly to ground potential. The base of transistor Q14 is connected to the cathode of diode CR8 and to one side of resistor R60 of 10K ohms. The anode of diode CR8 is connected to ground potential. Signal B16 is also connected to terminals 1, 2, 5, 6, 8 and 9 of logic buffer U22 and through resistor R85 of 3.32K ohms to the −8 V DC supply. The anode of diode CR8 is connected to ground. The cathode of diode CR9 is connected to one side of a resistor R86 of 10 meg ohms, one side of a capacitor C60 of 0.047 microfarads and to terminal 13 of logic sensor driver U23. The opposite sides of resistor R86 and the anode of diode CR9, signal B17, are connected to terminal 11 of the logic buffer U22 and to terminals 1 and 2 of Logic Sensor U23. Through resistor R87 of 22 meg ohms, one end of CR10 is connected to terminals 4 and 10 of logic buffer U22, to signal B18A terminals 5 and 6 of Logic Sensor Driver U23 and to the positive side of capacitor C61 of 2.2 microfarads. Terminals 3, 12 and 13 of U22 are connected together. The terminal 11 of logic sensor driver U23 provides hold signal B19. Terminal 10 of logic sensor driver U23 is connected to the anode of diode CR11. The cathode of CR11 is connected to resistor R88 of 10K ohms and provides loss of signal output B19A. Terminals 7 of U22 and U23 and the other end of capacitors C60 and C61 and resistor R85 are connected to −8 V DC. Terminals 14 of U22 and U23 are connected to +8 V DC. Terminals 4, 8 and 9 are connected together and 3 and 12 of U23 are connected together. The other end of R88 is connected to ground.

Signal line A6 is connected to the positive side of capacitor C47 of 47 microfarads. The outer shield of signal line A6 is connected to ground. The negative side of capacitor C47 is connected through resistor R61 of 100 ohms to ground and to one end of potentiometer resistor R62 of 10K ohms. The other end of R62, signal line A7, is connected to one side of capacitor C48 of 0.01 microfarads, to the wiper of R62 and to capacitor C51 of 1.0 microfarads. The other end of C48 is connected to ground.

The other end of C51 is connected through resistor R66 of 5.62K ohms. The opposite end of R66, signal line A8, is connected to terminal 5 of compressor control U13A, terminal 2 of compressor amp U14A, one side of resistor R68 of 1M ohms, one side of capacitor C56 of 33 picofarads and one side of resistor R69 of 10K ohms. Terminal 1 of U13A is connected through resistor R63 of 330K ohms to ground. Terminal 6 is U13A is connected through resistor R64 of 1K ohms to the positive end of capacitor C54 of 22 microfarads and to one side of of resistor R67 of 10K ohms. The other side of R67 is connected to terminal 3 of U14A and through capacitor C55 of 0.01 microfarads to ground. The negative side of C54 is connected to ground. Terminal 7 of U13A is connected to the positive side of capacitor C52 of 2.2 microfarads. Terminal 3 of U13A is connected through resistor R65 of 3.32 ohms to the positive side of capacitor C53 of 2.2 microfarads. Terminal 2 of U13A is connected to the positive side of capacitor C50 of 1.0 microfarads. The other side of C50 is connected to ground. The remaining ends of capacitors C52 and C53 are connected together with terminal 1 of U14A, and the other end of R68, the other end of C56, one end of resistor R70 of 10K ohms and to one end of capacitor C58 of 1.0 microfarads. The remaining ends of R69 and R70 are tied together and connected to one end of potentiometer resistor R71 of 100K ohms, the wiper of R71 and to the positive side of capacitor C57 of 22 microfarads. The remaining end of potentiometer resistor R71 is connected to the positive 8 volt supply line and the remaining end of C57 is connected to ground. The remaining end of C58, signal A12, is connected through resistor R72 of 16.2K ohms to ground and through resistor R73 of 3.32K ohms to terminal 3 of amplifier U17A. Terminal 2 of U17A is connected to one end of resistor R75 of 100K ohms and through resistor R74 of 3.3K ohms to ground. The other end of R75 (signal A13) is connected to terminal 1 of U17A and to one end of resistor R76 of 10K ohms. The other end of R76 is connected to terminal 7 of squaring amplifier U18A. Terminal 6 of U18A is connected to one end of resistor R185 of 10K ohms and to both the wiper and one end of potentiometer resistor R79 of 100K ohms. The other end of resistor R185 is connected to one end of resistor R78 of 5.11K ohms and through resistor R77 of 100 ohms to ground. The remaining end of R78 is connected to the positive 8 volt supply. Terminal 3 of U18A is connected to the positive 8 volt supply and to the positive end of 0.01 microfarad capacitors: C79, C77, C72 and C71 of 22 microfarads. Also connected to this positive 8 volt line is terminal 16 of compressor control U13B, terminal 8 of compressor amplifier U14B, the wiper, and one side of potentiometer resistor R99 of 100K ohms and terminal 8 of amplifier U17B.

The other ends of C79, C77, C72 and C71 are all connected to ground. Terminal 1 of U18A A15 is connected through resistor R80 of 10K ohms to terminal 4 of squaring amplifier U18B. Terminal 2 of U18B signal A16, is connected through resistor R82 of 200K ohms to resistor R79. Terminal 5 of U18B is connected through resistor R81 of 10K ohms to ground.

Referring now to short range channel 2, input A6A is fed through a capacitor C62 of 47 microfarads, positive side, to one side of resistor R90 of 5.11K ohms and resistor R89 of 100 ohms. The opposite side of resistor R89 is connected to ground. The opposite side of resistor R90 is connected to one side of capacitor C63 of 0.01 microfarads and to one side of capacitor C66 of 1 microfarad. The other side of C63 is connected to ground. The opposite side of capacitor C66 is connected to one side of resistor R94 of 5.62K ohms. The other side of resistor R94 A8A is connected to terminal 11 of U13B, to terminal 6 of U14B, to one side of resistor R96 of 1 Meg ohm, to one side of capacitor C74 of 33 picofarads and to one side of resistor R97 of 10K ohms. The opposite side of R96, signal A9A, is connected to terminal 7 of U14B.

Terminal 12 of U13B is connected to one side of capacitor C64 of 0.1 microfarads. The other side of capacitor C64 is connected to ground. Terminal 15 of U13B is connected to one side of resistor R91 of 330K ohms. The opposite side of resistor R91 is connected to ground. Terminal 14 of U13B is connected to the positive side of capacitor C65 of 1.0 microfarads. The opposite side of capacitor C65 is connected to ground. Terminal 8 is U13B is connected to ground. Terminal 13 of U13B is connected to one side of resistor R92 of 3.32K ohms. The opposite side of resistor R92 is connected to the positive side of capacitor C68 of 2.2 microfarads. Terminal 9 of U13B A10A is connected to the positive side of capacitor C67 of 2.2 microfarads. The other side of capacitor C67 is connected to the other end of C68, to terminal 7 of U14B A9A, to the other side of capacitor C74, to one side of a resistor R98 of 10K ohms and to one side of capacitor C76 of 1.0 microfarads. Terminal 10 of U13B is connected to one side of resistor R93 of 1K ohm. The opposite side of resistor R93 is connected to the positive side of of capacitor C69 of 22 microfarads and to one side of resistor R95 of 10K ohms. The other side of capacitor C69 is connected to ground. The other side of resistor R95 is connected to terminal 5 of U14B and capacitor C70 of 0.01 microfarads. The other end of capacitor C70 is connected to ground. The opposite ends of resistors R97 and R98 are connected to the positive side of capacitor C75 of 22 microfarads and to the other side of potentiometer resistor R99. The opposite side of capacitor C75 is connected to ground. Terminal 4 of U14B is connected to −8 V DC supply and to capacitor C73 of 0.01 microfarads. The other side of capacitor C73 is connected to ground.

Referring now to U17B, terminal 5 is connected to one side of resistor R1001 of 3.32K ohms. The other side of resistor R101 A12A connected to the other side of capacitor C76 and one side of resistor R100 of 16.2K ohms. The other side of resistor R100 is connected to ground. Terminal 6 of U17B is connected to one side of resistors R103 of 100K ohms and R102 of 3.32K ohms. The other end of resistor R102 is connected to ground and to one side of capacitor C78 of 0.01 microfarads. The opposite side of capacitor C78 is connected to pin 4 of U17B and to the −8 VDC supply. Terminal 7

A13A is connected to the other end of resistor R105 of 10K ohms. Terminal 8 is connected to the +8 V DC supply and to one side of resistor R104 of 5.11K ohms.

Referring now to U18C, terminal 9 is connected to the other side of resistor R105 A14A. Terminal 8 is connected to one end and the wiper of potentiometer resistor R107 of 100K ohms and to one side of resistor R106 of 10K ohms. The opposite side of resistor R106 is connected to the other end of resistor R104 and to one end of resistor R186 of 100 ohms. The opposite end of R186 is connected to ground. Terminal 14 A15A is connected to one side of resistor R108 of 10K ohms and R111 of 3.65K ohms. The other side of R111 A17A is connected to one side of R112.

Referring now to U18D, terminal 10 is connected to the other side of resistor R108. Terminal 11 is connected through resistor R109 of 10K ohms to ground. Terminal 12 is connected through capacitor C80 of 0.01 microfarads to ground and directly to the −8 V DC supply. Terminal 13 A16A is connected to one side of resistor R110 of 200K ohms. The opposite side of resistor R110 is connected to the other end of potentiometer resistor R107.

Referring now to Long Range channel 1, input A6B is fed through the positive side capacitor C81 of 41 microfarads, to one side of resistor R119 of 100 ohms and potentiometer resistor R120 of 10K ohms. The opposite side of resistor R119 is connected to ground. The opposite end and wiper of potentiometer resistor R120 A7B is connected to one side of capacitor C82 of 0.01 microfarads and to one side of capacitor C85 of 1 microfarads. The other side of C82 is connected to ground. The opposite side of capacitor C85 is connected to one side of resistor R124 of 5.62K ohms. The other side of resistor R124 A13B is connected to terminal 5 of U15A, to terminal 2 of U16B, to one side of capacitor C92 of 33 picofarads, to one side of resistor R126 of 1 meg ohm, and to one side of resistor R127 of 10K ohms. The opposite side of resistor R126 A9B is connected to terminal 1 of U16B.

Terminal 4 of U15A is connected to one side of capacitor C83 of 0.1 microfarads. The other side of capacitor C83 is connected to ground. Terminal 1 of U13B is connected to one side of resistor R121 of 330K ohms. The opposite side of resistor R121 is connected to ground. Terminal 2 of U15A is connected to the positive side of capacitor C84 of 1 microfarad. The opposite side of capacitor C84 is connected to ground. Terminal 3 of U15A is connected to resistor R122 of 3.32K ohms the other end of which is connected to the positive side of capacitor C87 of 2.2 microfarads. Terminal 7 of U15A A10C is connected to the positive side of capacitor C86 of 2.2 microfarads of capacitor C86 is connected to the other side of capacitor C87, to terminal 1 of U16B A9B, to the other side of capacitor C92, to the other side of R126, to one side of a resistor R128 of 10K ohms and to one side of capacitor C94 of 1.0 microfarads. Terminal 6 of U15A is connected to one side of resistor R123 of 1K ohms. The positive side of capacitor C88 of 22 microfarads and to one side of resistor R125 of 10K ohms. The other side of capacitor C88 is connected to ground. The other side of resistor R125 is connected to terminal 3 of U16B and one side of capacitor C89 of 0.01 microfarads. The other end of capacitor C89 is connected to ground. The opposite ends of resistor R127 and R128 are connected to the positive side of capacitor C93 of 22 microfarads and to the wiper and one end of potentiometer resistor R129 of 100K ohms.

The opposite side of capacitor C93 is connected to ground. The opposite side of potentiometer resistor R129 is connected to the +8 V DC supply. Terminal 4 of U16B is connected to the −8 V DC supply.

Referring now to U19A, terminal 3 is connected to one side of resistor R131 of 3.32K ohms. The other side of resistor R131 A12B is connected to the other side of capacitor C94 and one side of resistor R130 of 16.2K ohms. The other side of resistor R130 is connected to ground. Terminal 2 of U19A is connected to one side of resistor R133 of 100K ohms and R132 of 3.32K ohms. The other end of resistor R132 is connected to ground. Terminal 4 is connected to the −8 V DC supply. Terminal 1 A13B is connected to the other end of resistor R133 and to one side of resistor R135 of 10K ohms.

Referring now to U20A, terminal 7 is connected to the other side of resistor R135 A14B. Terminal 6 is connected to one end and the wiper of potentiometer resistor R138 of 100K ohms and to one side of resistor R136 of 10K ohms. The opposite side of resistor R136 is connected to one side of resistor R134 of 100 ohms and R137 of 5.11K ohms. The opposite end of R134 is connected to ground and the opposite end of R137 is connected to the +8 V DC supply. Terminal 3 is connected to the +8 V DC supply. Terminal 1 A15B is connected to one end of resistor R139 of 10K ohms, and resistor R142 of 3.65K ohms. to terminals 6 and 8 of U26. The opposite side of R142 A17B is connected to one side of R143 of 2.21K ohms. The opposite side of R143 is connected to the +5 V DC supply.

Referring again to U20B, terminal 4 is connected to the other side of resistor R139. Terminal 5 is connected through resistor R140 of 10K ohms to ground. Terminal 2 A16B is connected to one side of resistor R141 of 200K ohms. The opposite side of resistor R141 is connected to the other end of potentiometer resistor R138. Terminal 12 is connected to −8VDC supply.

Referring now to long range channel 2, input A6C is fed through positive side capacitor C100 of 47 microfarads, to one side of resistor R145 of 5.11K ohms and resistor R144 of 100 ohms. The opposite side of resistor R144 is connected to ground. The opposite side of resistor R145 is connected to one side of capacitor C101 of 0.01 microfarads and to one side of capacitor C104 of 1 microfarad. The other side of C101 is connected to ground. The opposite side of capacitor C104 is connected to one side of resistor R149 of 5.62K ohms. The other side of resistor R149 A8C is connected to terminal 6 of U16B, to one side of resistor R152 of 1 meg ohm, to one side of capacitor C112 of 33 picofarads to terminal 11 U15B, and to one side of resistor R152 of 10K ohms. The opposite side of resistor R151 A9C is connected to terminal 7 of U16B.

Terminal 12 of U15B is connected to one side of resistor C102 of 0.1 microfarads. The other side of capacitor C102 is connected to ground. Terminal 15 of U13B is connected to one side of resistor R146 of 330K ohms. The opposite side of resistor R146 is connected to ground. Terminal 14 of U16B is connected to the positive side of capacitor C103 of 1 microfarads. The opposite side of capacitor C103 is connected to ground. Terminal 8 of U15B is connected to ground. Terminal 13 of U15B A11C is connected to one side of resistor R147 of 3.32K ohms. The opposite side of resistor R147 is connected to the positive side of capacitor C108 of 2.2 microfarads. Terminal 9 of U15B A10C is connected to the positive side of capacitor C107 of 2.2 microfarads. The other side of capacitor C107 is connected to the other side of capacitor C108, to terminal 7 of U16B A9C, to the other side of capacitor C112, to one side of a resistor R153 of 10K ohms and to one side of capacitor C114 of 1 microfarad. Terminal 10 of U15B is connected to one side of resistor R148 of 1K ohm. The opposite side of resistor R148 is connected to the positive side of capacitor C109 of 22 microfarads and to one side of resistor R150 of 10K ohms. The other side of capacitor C109 is connected to ground. The other side of resistor R150 is connected to terminal 5 of U16B and one side of capacitor C110 of 0.01 microfarads. The other end of capacitor C110 is connected to ground. The opposite ends of resistors R152 and R153 are connected to the positive side of capacitor C113 of 22 microfarads and to the other side of potentiometer resistor R154. The opposite side of capacitor C113 is connected to ground.

Referring now to U19B, terminal 5 is connected to one side of resistor R156 of 3.32K ohm. The other side of resistor R156 A12C is connected to one end of resistor R155 of 16.2K ohms and to the other side of capacitor C114. Terminal 8 is connected to the +8 V DC power supply and to one side of resistor R159 of 5.11K ohms. The other end of R155 is connected to ground.

Referring now to U20C, terminal 9 A14C is connected to the other side of resistor R160. Terminal 8 is connected to one end and the wiper of potentiometer resistor R163 of 100K ohms and to one side of resistor R161 of 10K ohms. The opposite side of resistor R161 is connected to the other end of resistor R159 and to one end of resistor R162 of 100 ohms. The opposite end of R162 is connected to ground. Terminal 14 A15C is connected to one side of resistor R164 of 10K ohms and R167 of 3.65K ohms. The other end of R167 A17C is connected to one side of resistor R168 of 2.21K ohms and terminals 1 and 5 of U26. The other side of R168 is connected to +5 V line.

Referring now to U20D, terminal 10 is connected to the other side of resistor R164. Terminal 11 is connected through resistor R165 of 10K ohms to ground. Terminal 13 A16C is connected to one side of resistor R166 of 200K ohms. The opposite side of resistor R166 is connected to the other end of potentiometer resistor R163.

The other side of capacitors C72, C77, C79, C91, C95, C96, C105, C106, C111, C115, and C116 of 0.01 microfarads are connected to ground. Capacitors C71 and C59 of 22 microfarads have their negative sides connected to ground. The other end of C59 is connected to the +5 VDC supply, and the other end of C71 is connected to the +8 VDC supply.

Continuing from A15, terminal 1 of squaring amplifier U18A is connected to one end of resistor R83 of 3.65K ohms and to one end of resistor R169 of 3.65K ohms. The other end of R169, signal A17D, is connected out and to one end of resistor R113 of 2.21K ohms. The other end of R83 A17 is connected to one end of resistor R84 of 2.21K ohms and out and to terminal 5 of channel comparator U25. The remaining ends of R84 and R113 are both connected to the positive 5 volt line. The positive end of capacitor C59 of 22 microfarads is connected to the positive 5 volt line as is one end of resistor R112 of 2.21K ohms. The other end of C59 is connected to ground and the other end of R112 is connected to the other end of resistor R111, terminal 4 of pulse generator U24 and to signal line A17A.

Starting now at signal line A15B, terminal 1 of long range squaring amplifier U20A is connected to one end of resistor R139 of 10K ohms and to one end of resistor R142 of 3.65K ohms. The other end of R142 A17B is connected through resistor R143 of 2.21K ohms to the positive 5 volt line and to terminals 6 and 8 of long range phase detector U26.

Starting now at signal line A15C, terminal 14 of long range squaring amplifier U20C is connected to one end of resistor R164 of 10K ohms and to one end of resistor R167 of 3.65K ohms. The other end of R167 is connected to terminals 1 and 5 of U26 and to one end of resistor R168 of 2.21K ohms. The other end of R168 is connected to the positive 5 volt line. Terminals 2, 4 and 9 of U26 are connected together. Terminal 7 of U26 is connected to ground. Terminals 3 and 13 of U26 are connected together. Terminals 10 and 12 of U26 are also connected together. Terminal 14 of U26 is connected to the positive 5 volt line. Terminal 11 of U26 KA is connected to one end of resistor R171 of 10K ohms. The other end of R171 KA1 is connected to one end of resistor R172 of 5.11K ohms, one end of resistor R170 of 10K ohms and the base of long range slope inverter Q16. The other end of R172 is connected to ground while the other end of R170 is connected to previously described line B21. The emitter of Q16 is connected to ground and the collector of Q16 KA2 is connected to one end of resistor R174 of 511K ohms and to one end of resistor R173 of 1K ohms. The other end of R173 is connected to the positive 5 volt line. The other end of R174 is connected to one end of resistor R175 of 511K ohms and to one end of capacitor C118 of 0.1 microfarads. The other end of R175 KA3 is connected to terminal 5 of long range integrator U27A and to one end of capacitor C119 of 0.047 microfarads. The other end of C119 is connected to ground. Terminal 4 of U27A is connected to the minus 8 volt line and to one end of capacitor C120 of 0.01 microfarads. The other end of C120 is connected to ground. The other end of C118 signal KA4 is connected to both terminals 6 and 7 of U27A, to one end of resistors R177 of 10K ohms and potentiometer resistor R178 of 10K ohms. The other end of R178 is connected to ground and the wiper is connected to one side of long range indicator I12. The other end of I12 is connected to ground. Terminal 8 of U27A is connected to both the positive 8 volt line and to one end of capacitor C121 of 0.01 microfarads. The other end of C121 is connected to ground. The other end of resistor R177 is connected to one end of R181, of 1M ohms KA5 and to terminal 3 of long range comparator U27B. Terminal 2 of U27B is connected to one end of resistor R176 of 2K ohms, one end of resistor R179 of 47.5K ohms and the positive side of capacitor C122 of 2.2 microfarads. The other end of R176 is connected to the positive 5 volt line and to one end of capacitor C117 of 0.01 microfarads. The other end of C117 is connected to ground. The other end of C122 is also connected to ground, while the remaining end of R179 is connected to one end of potentiometer resistor R180 of 500 ohms. The other end of R180 is connected to ground and to its wiper.

The other end of R181 is connected to one end of resistor R183 of 330 ohms, to terminal 1 of U27B KA6, through resistor R182 of 10K ohms to one end of resistor R184 of 3.32K ohms KA7, and to the base of transistor Q17. The other end of R184 is connected to ground. The emitter of Q17 is connected to ground, and the collector provides output signal K4. The other end of R183 KA8 is connected to one end of indicator I14. The other end of I14 is connected to ground. Indicator I13 is connected to ground, and the other end is connected to resistor R118 of 330 ohms to the collector of transistor Q15 to signal out E4. The emitter of Q15 is connected to the positive 8 volt line, and the base of Q15 is connected to the negative side of capacitor C99 of 2.2 microfarads, one end of resistor R117 of 1K ohms and one side of resistor R116 of 3.3K ohms. The remaining sides of both C99 and R117 are connected to the positive 8 volt line. The other end of R116 is connected to terminal 1 of U25 E2. Terminal 14 of U25 is connected to both the positive 5 volt line and to the positive end of capacitor C98 of 0.01 microfarads. The other end of C98 is connected to ground. Terminals 4, 6, 7, 8, 9, 10 and 11 of U25 are all connected to ground. Terminal 3 of U25 is connected though resistor R115 of 10K ohms to terminal 6 of U25 E1. Terminal 2 of U24 is connected through capacitor C97 of 0.001 microfarads to ground and connected through resistor R114 of 10K ohms to the positive 5 volt line. Terminals 3, 5 and 16 of U24 are also connected to the positive 5 volt line, and terminals 1, 8, 11, 12, 13, 14 and 15 are connected to ground.

Figure 5D:
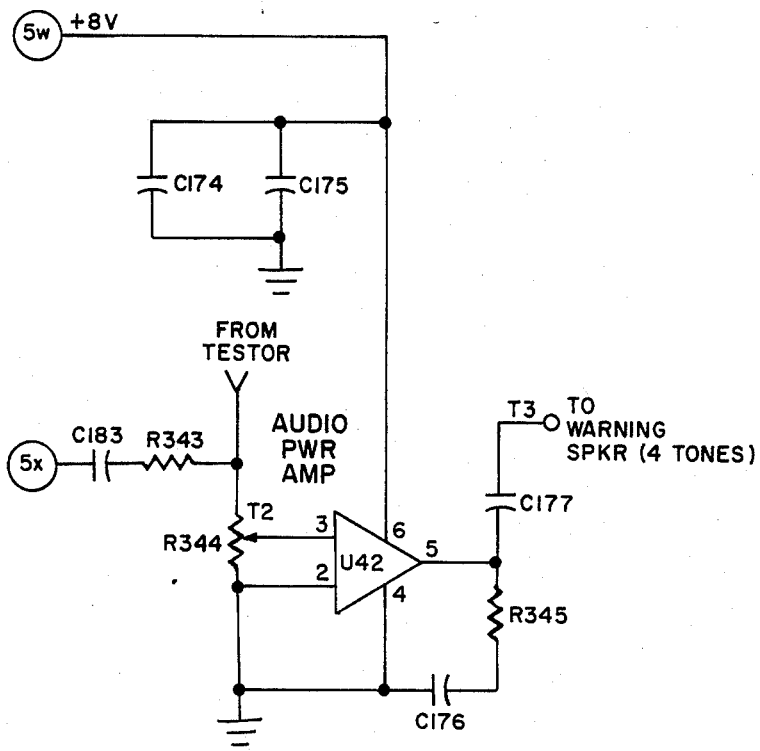
FIGS. 5A, 5B, 5C and 5D are detailed schematic showings of the pre-amp/modulator circuit of FIGS. 2A, 2B, 2C and 2D.
Figure 5D:
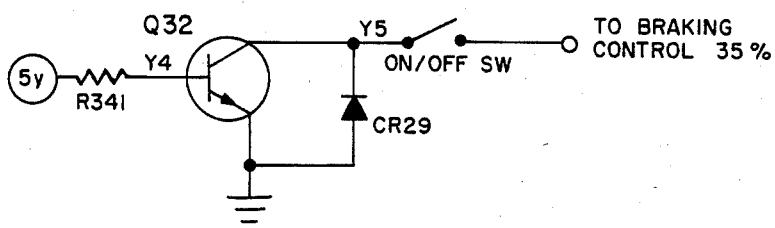
Figure 5D:
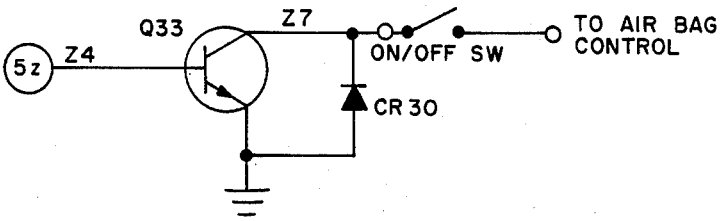
Figure 5:
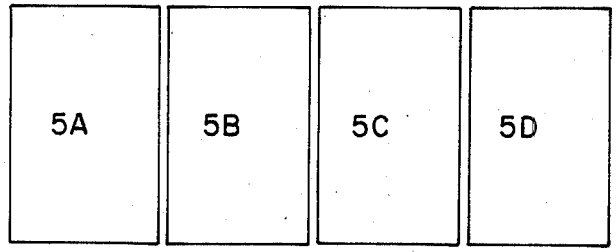
FIG. 5 depicts the relative positions of FIGS. 5A, 5B, 5C and 5D.
Figure 5A:
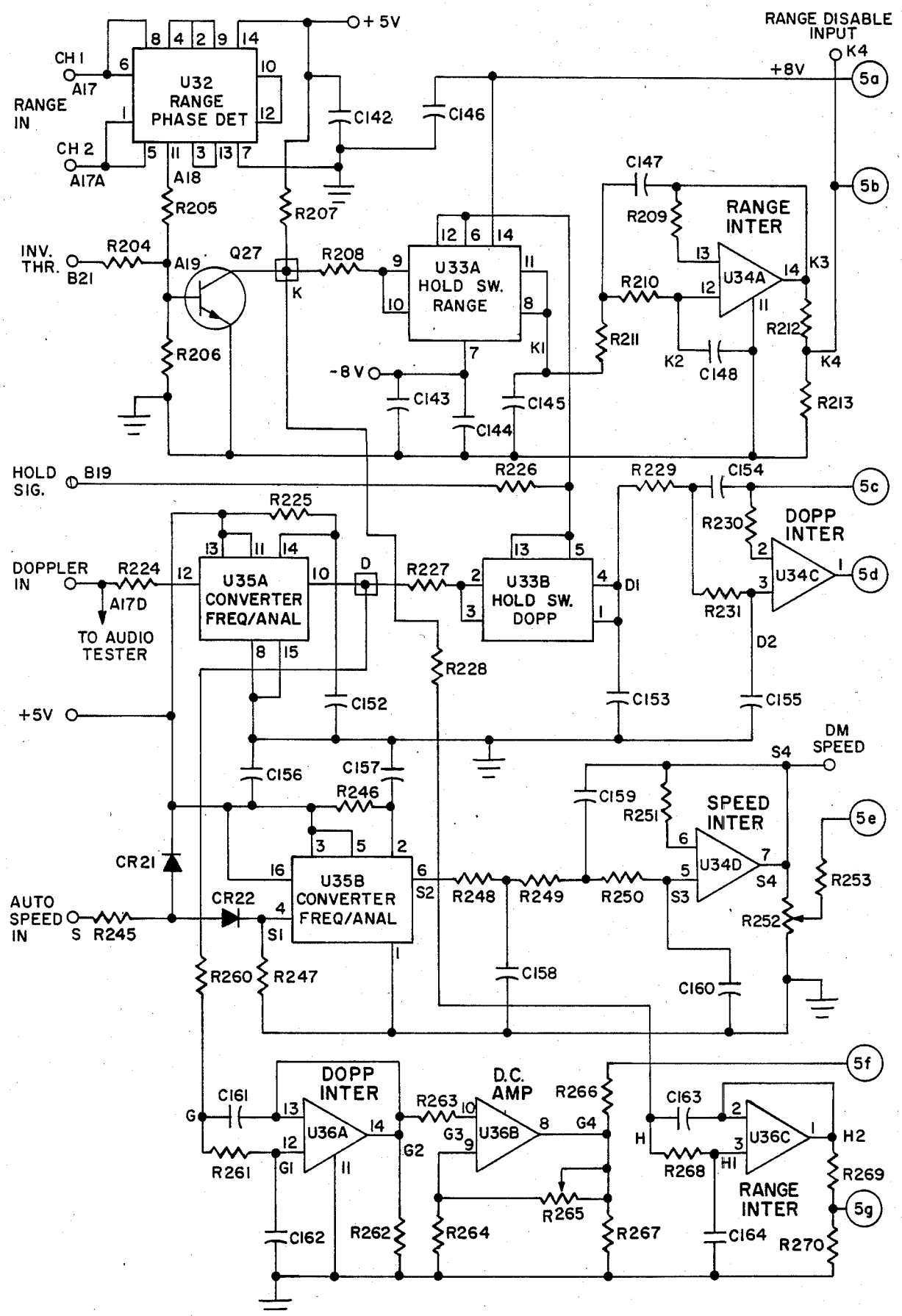
Figure 5B:
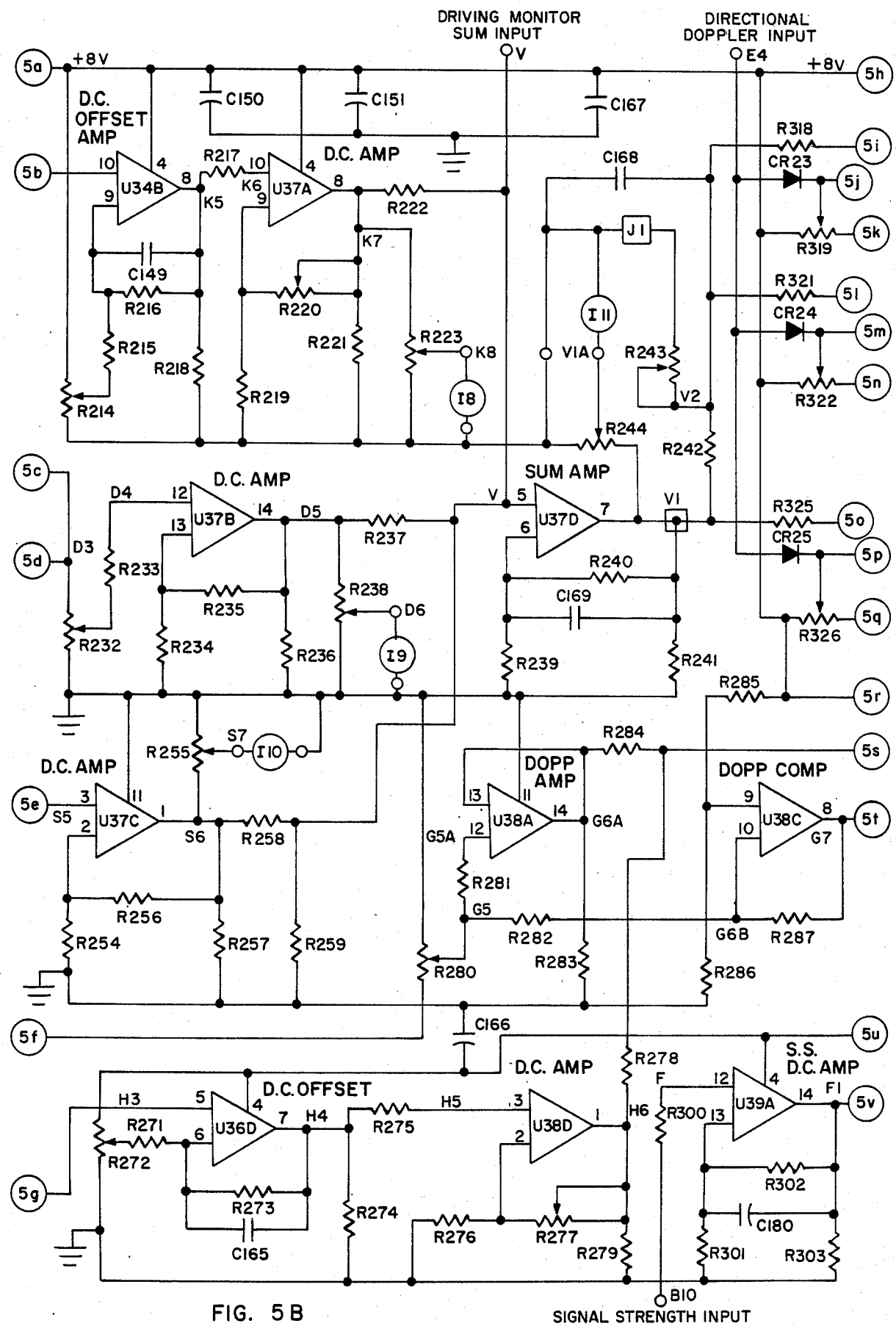
Figure 5C:
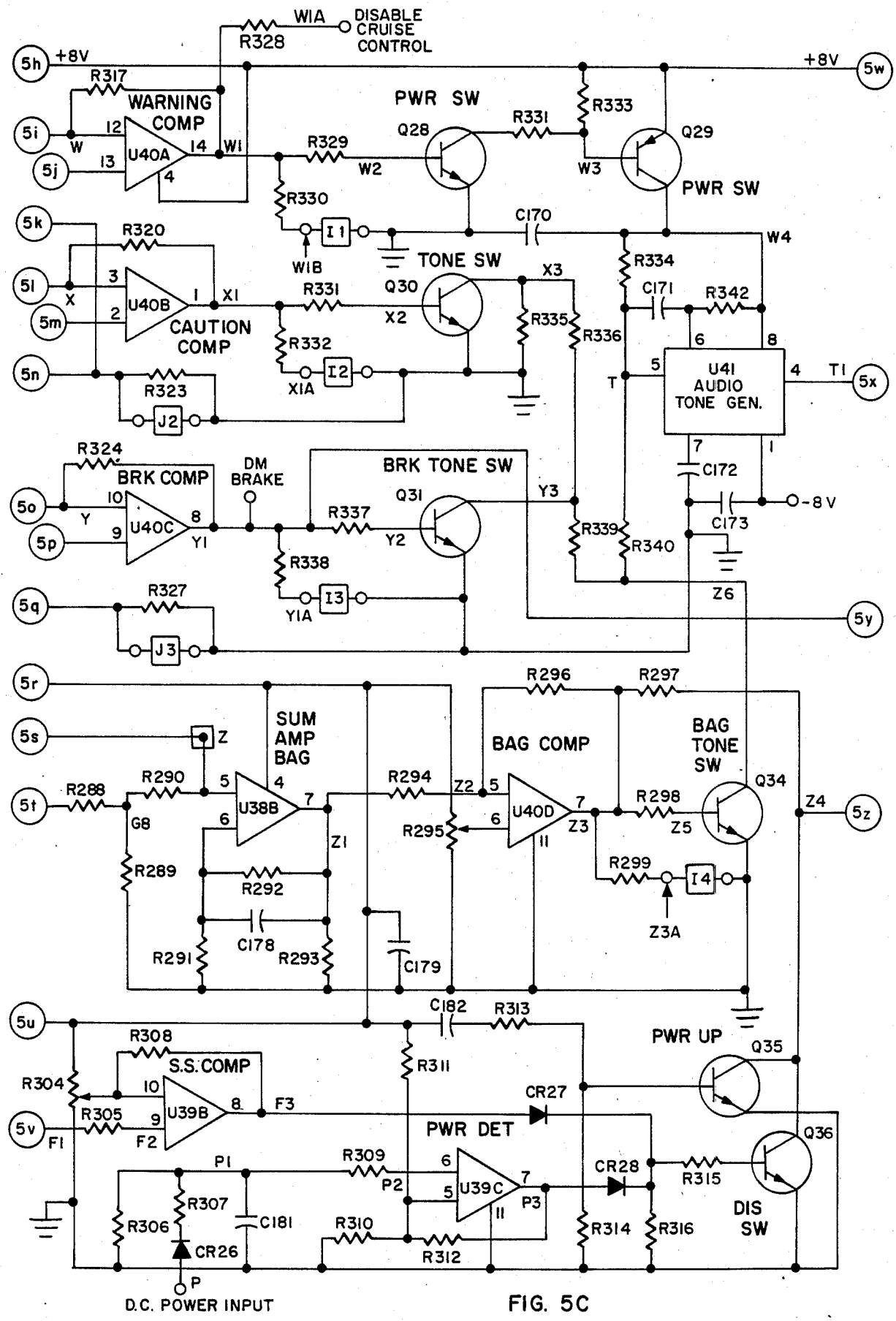
Figure 6A:
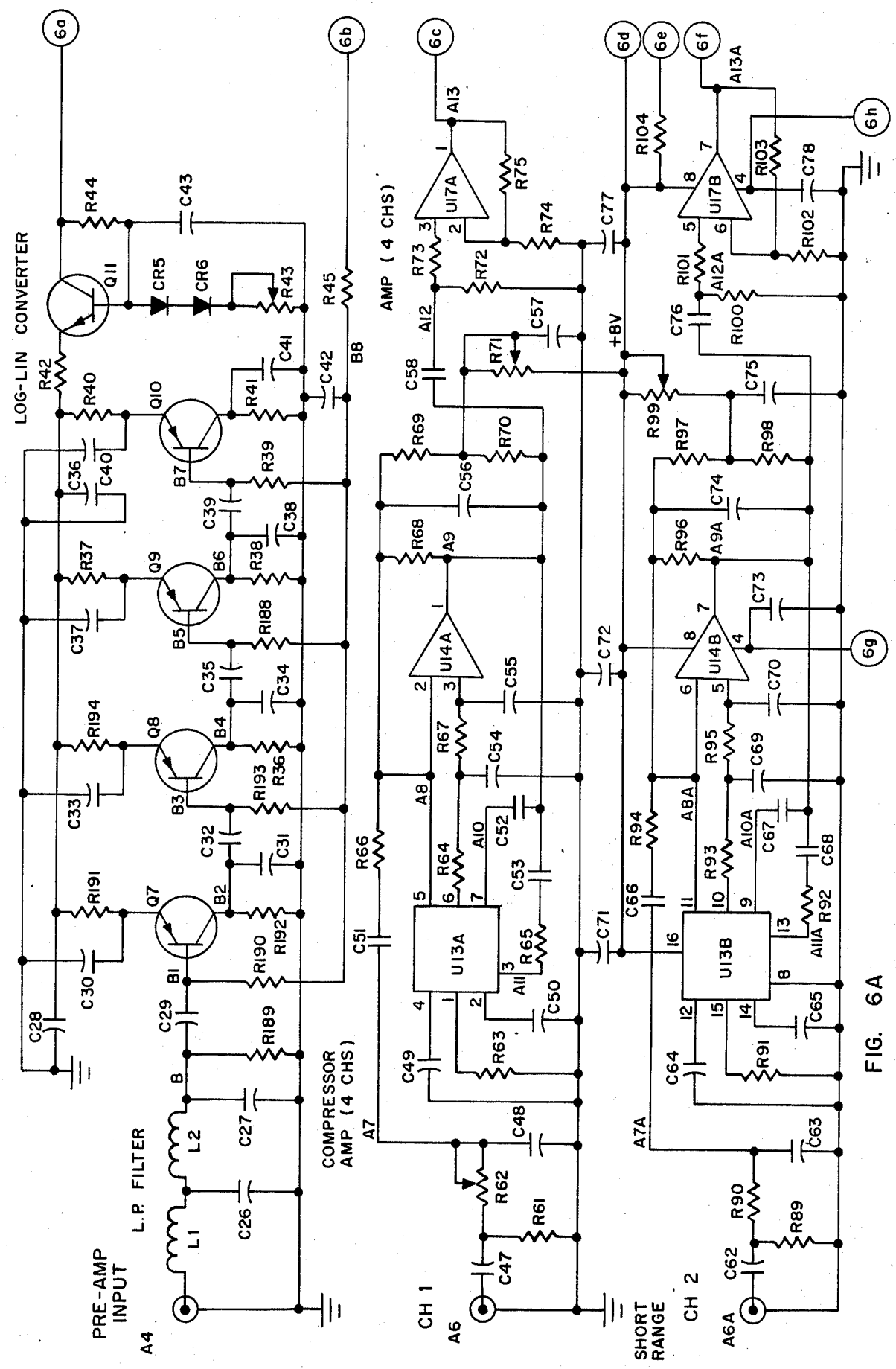
FIGS. 6A, 6B, 6C and 6D are detailed schematic showings of the signal conditions of FIGS. 2A, 2B, 2C and 2D.
Figure 6B:
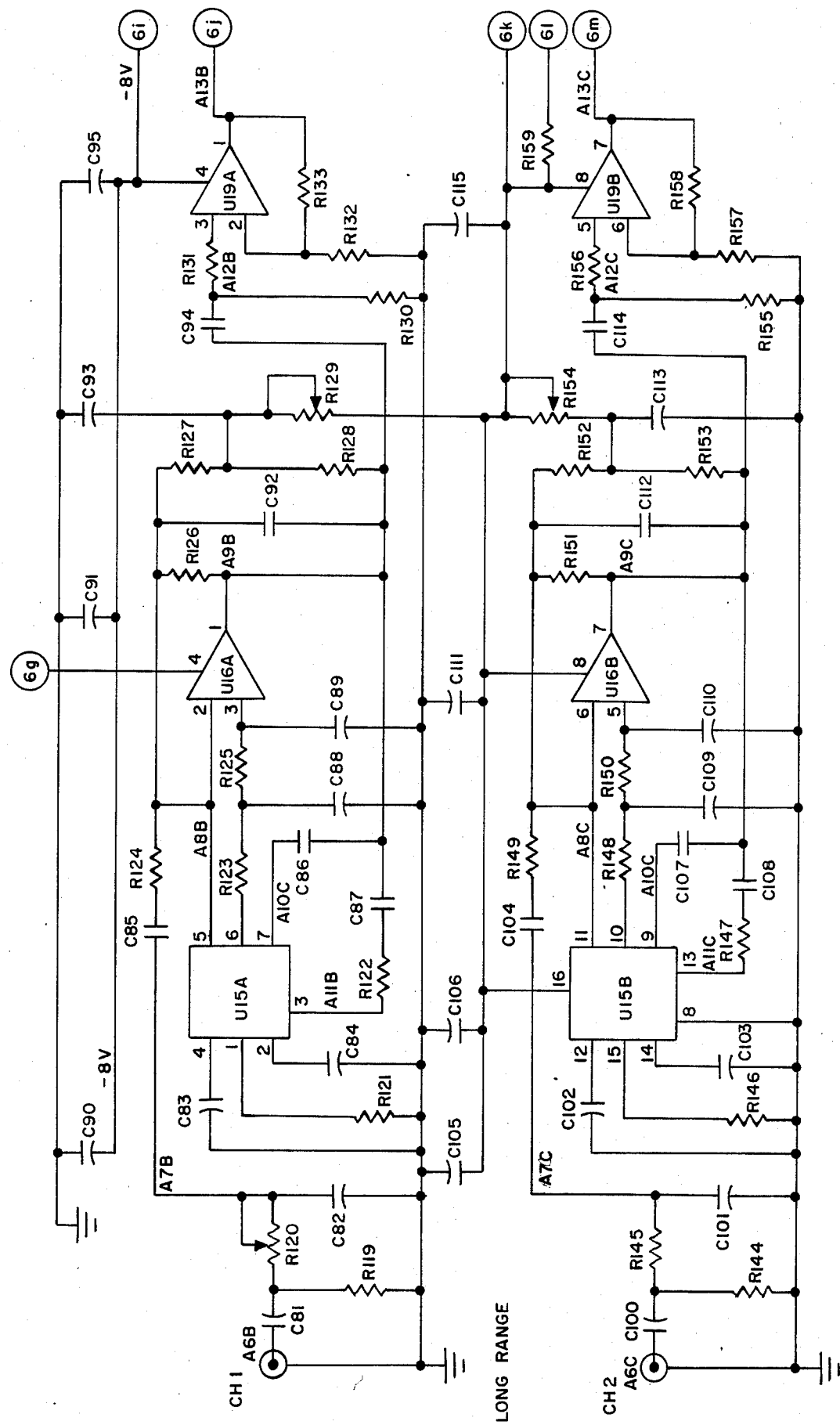
Figure 6C:
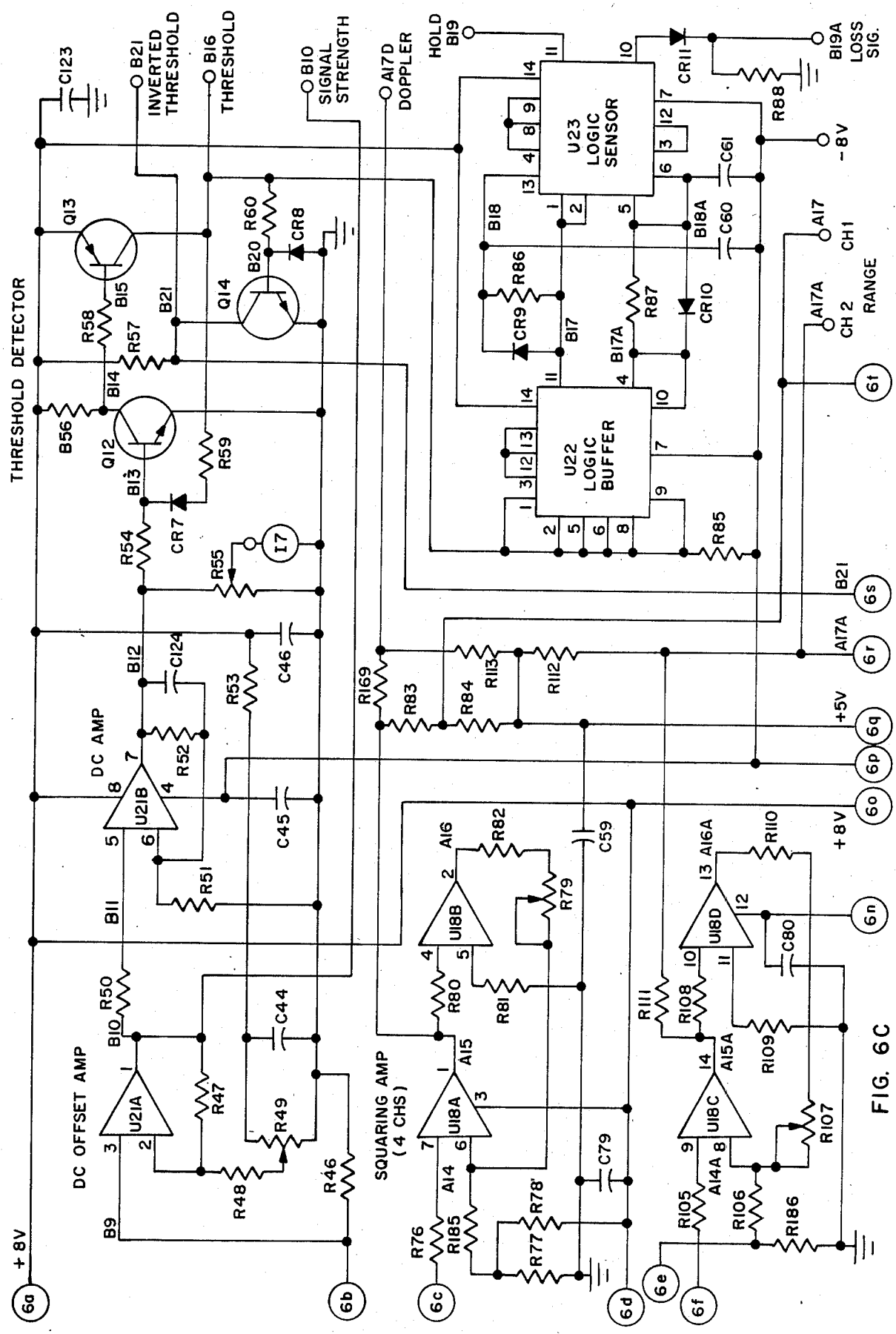
Figure 6D:
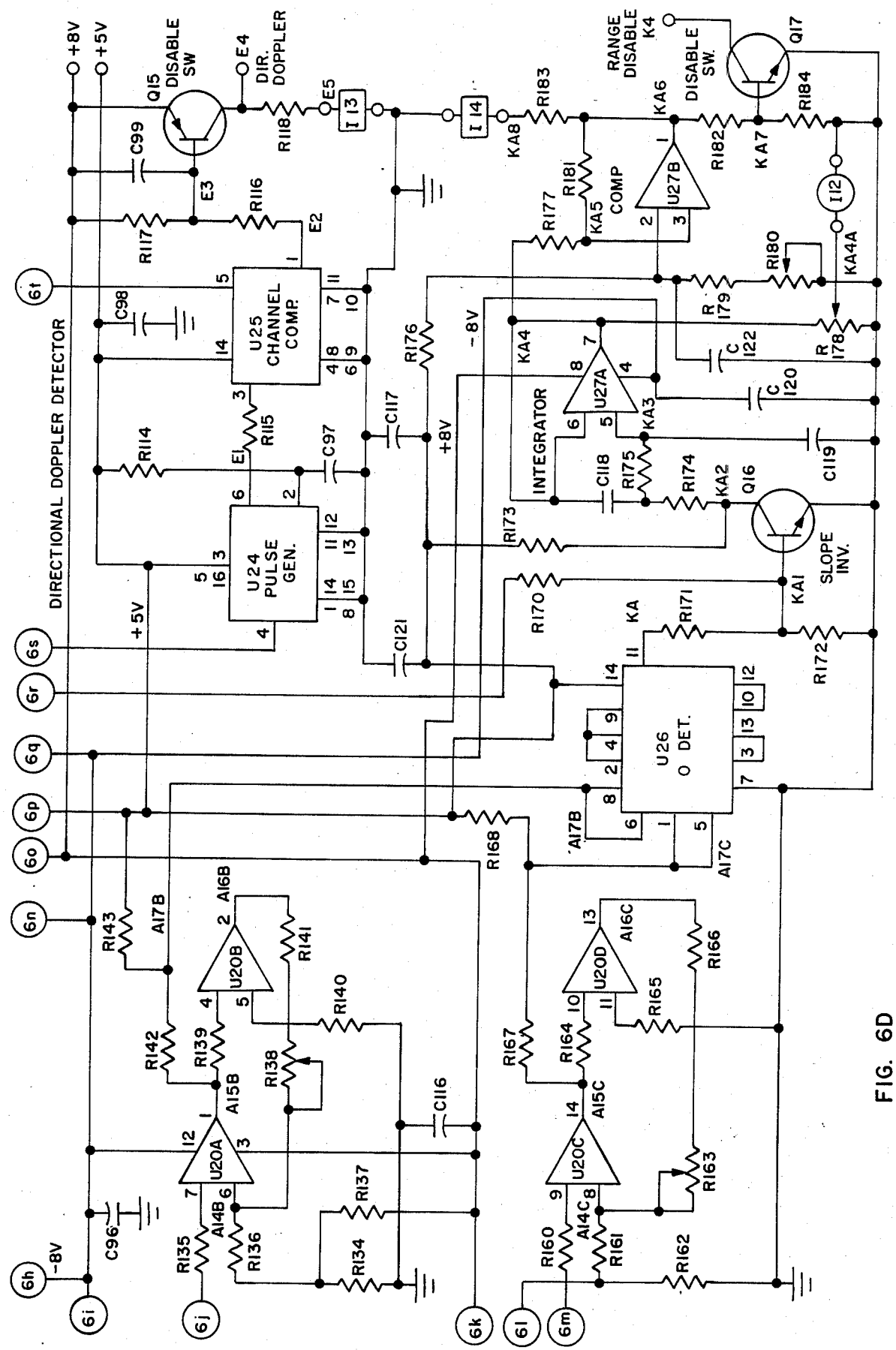

Referring specifically now to FIG. 5. The Figs. are combined as shown in FIG. 5. FIG. 5 shows the schematic for the signal processor of FIGS. 2C–2D. Referring now to the upper left hand corner of the combined fig. there is shown a range phase detector U32. Terminals 1 and 5 are connected together and are connected to the signal line A17A. Terminals 6 and 8 are connected together and are connected to the channel 1 signal line A17. Terminals 4, 2 and 9 are interconnected, terminals 10 and 12 are interconnected and terminals 3 and 13 are interconnected. Terminal 14 is connected to the positive 5 volt D.C. regulated power supply, to one side of a resistor R207 of 1K ohms, to one side of a capacitor C142 of 0.01 microfarads, the other side of which is connected to ground. Terminal 7 is connected to ground potential. Terminal 11, signal A18, is connected to one side of a resistor R205 of 10K ohms. The opposite side of the resistor R205, signal A19, is connected to the base of transistor Q27, to one side of the resistor R206 of 5.11K ohms and to one side of a resistor R204 of 10K ohms. The opposite side of resistor R204 is connected to the signal line B21. The opposite side of the resistor R206 is connected to ground potential. The opposite side of the resistor R207 is connected to the collector of the transistor Q27, to one side of a resistor R208 of 100K ohms and to one side of a resistor R228 of 150K ohms. The emitter of transistor Q27 is connected to ground potential.

The opposite side of the resistor R208 is connected to terminals 9 and 10 of range hold switch U33A. Terminal 7 of hold range switch U33A is connected to the negative 8 volt D.C. regulated power supply and also through a capacitor C143 and C144 of 0.01 microfarads to ground potential. Terminals 11 and 8 are interconnected and connected to one side of a resistor R211 of 511K ohms and to one side of a capacitor C145 of 0.18 microfarads. The opposite side of the capacitor C145 is connected to ground potential. Terminals 6 and 12 of the hold range switch U33A are interconnected and connected to one side of a resistor R226 of 10K ohms and to terminals 5 and 13 of the Doppler hold switch U33B. The opposite side of the resistor R226 is connected to signal line B19.

The opposite side of resistor R211 is connected to one side of a resistor R210 of 511K ohms and one side of a capacitor C147 of 0.10 microfarads. The other side of the resistor R210 is connected to terminal 12 of operational amplifier U34A, through a capacitor C148 of 0.047 microfarads, to terminal 11 of operational amplifier U34A and to ground. The opposite side of the capacitor C147 is connected to one side of a resistor R209 of 1M ohms, to terminal 14, signal K3, of operational amplifier U34A and to one side of a resistor R212 of 20K ohms. The opposite side of the resistor R209 is tied to terminal 13 of the operation amplifier U34A. The opposite side of resistor R212 is connected to terminal 10 of operational amplifier U34B to one side of a resistor R213 of 20K ohms and signal K4. The opposite side of the resistor R213 is connected to ground. The junction of R212 and R213 is signal K4 which is also connected to the collector of Q17.

Terminal 4 of operational amplifier U34B is connected to terminal 14 of the hold range switch U33A, to one side of a potentiometer resistor R214 of 10K ohms, to one side capacitors C146, C150, C151 and C167 of 0.01 microfarads. The opposite sides of the last mentioned capacitors are tied to ground. Terminal 4 of operational amplifier U37A and terminal 4 of operational amplifier U34B are connected to +8 V DC supply. Terminal 9 of operational amplifier U34B is connected to one side of resistor R215 of 100K ohms, to one of resistor R216 of 100K ohms and to one side of capacitor C149 of 0.01 microfarads. The opposite side of the resistor R216, signal K5, to the other side of C149, is connected to terminal 8 of operational amplifier U16B, to one side of a resistor R217 of 33.2K ohms and to one side of a resistor R218 of 2K ohms. The opposite side of the resistor R218 is tied to ground. The opposite side of the resistor R215 is tied to the wiper of a potentiometer resistor R214. One side of the potentiometer R214 is connected to ground.

The other side of the resistor R217, signal K6 is connected to terminal 10 of operational amplifier U37A. Terminal 9 of operational amplifier U17A is connected to one side of a potentiometer resistor R220 of 100K ohms and to one side of a resistor R219 of 33.2K ohms. The opposite side of the resistor R219 is connected to ground. The other side of the potentiometer resistor R220, signal K7, is connected to terminal 8 of operational amplifier U37A, to one side of a resistor R222 of 100K ohms, to one side of a resistor R221 of 10K ohms to the wiper of potentiometer R220 and to one side of potentiometer resistor R223 of 10K ohms. The opposite end of the resistor R221 is connected to ground. The wiper of the potentiometer resistor R223 is connected to one side of indicator I8. The other side of I8 is connected to ground. The opposite side of the potentiometer R223 is connected to ground potential. The opposite side of the resistor R222 is connected to the driving monitor sum input to terminal 5 of operational amplifier U37D, to one side of a resistor R237 of 100K ohms, to one side of a resistor R258 of 100K ohms and to one side of a resistor R259 of 100K ohms. The opposite side of the resistor R259 is connected to ground.

Referring now to the frequency to analog converter U35A, terminal 12 is connected to one side of a resistor R224 of 10K ohms. The other side of the resistor R224 is connected to the audio test point and to the Doppler signal A17D from FIG. 4. The terminals 13 and 11 of U35A are interconnected and connected to one side of a resistor R225 of 150K ohms, to the positive 5 volt D.C. regulated power supply. The 5 VDC supply is connected to the cathode of diode CR21, to terminal 3, 5 and 16 of frequency to analog converter U35B, to one side of a resistor R246 of 100K ohms and to one side of a capacitor C156 of 0.01 microfarads. The opposite side of the resistor R225 is connected to terminal 14 of the frequency to analog convertor U35A and to one side of a capacitor C152 of 0.001 microfarads. The opposite side of the capacitors C152 and C156 are connected to ground potential. Terminal 10 of the frequency to analog converter U35A point D is connected to one side of a resistor R227 of 100K ohms and to one side of a resistor R260 of 150K ohms.

The anode of diode CR21 is connected to the anode of a diode CR22 and one side of a resistor R245 of 10K ohms. The opposite side of the resistor R245 is connected to the automobile speed signal S. The cathode of the diode CR22, signal S1, is connected to terminal 4 of the frequency to analog converter of U35B and also to one side of a resistor R247 of 100K ohms. The opposite side of the resistor R247 is connected to ground. Terminal 1 of the frequency to analog converter U35B is connected directly to ground. Terminal 2 of frequency analog convertor U35B is connected to the opposite side of the resistor R246 and to one side of a capacitor C157 of 0.1 microfarads. The opposite side of the capacitor C157 is connected to ground. Terminal 6, signal S2 of frequency to analog converter U35B is connected to one side of a resistor R248 of 330K ohms.

The opposite side of the resistor R260, signal G, is connected to one side of a capacitor C161 of 0.02 microfarads and to one side of a resistor R261 of 150K ohms. The other opposite side of the capacitor C161 is connected to terminal 13 of the Doppler integrator U36A, to one side of the resistor R263, to terminal 14, signal G2, of the operational amplifier U36A and to one side of a resistor R262 of 10K ohms. The opposite side of the resistor R262 is connected to ground. Terminal 11 of operational amplifier U36A is connected directly to ground. The opposite side of the resistor R261, signal G1, is connected to terminal 12 of operational amplifier U36A and to one side of a capacitor C162 of 0.01 microfarads. The opposite side of the capacitor C162 is connected to ground.

The opposite side of the resistor R227 is connected to terminals 2 and 3 of hold switch Doppler U33B. Terminals 1 and 4, signal D1, of hold switch Doppler U33B are interconnected and connected, to one side of a resistor R229 of 511K ohms and to one side of a capacitor C153 of 0.18 microfarads. The other side of the capacitor C153 is connected to ground. The other side of the resistor R229 is connected to one side of a capacitor C154 of 0.10 microfarads and to one side of a resistor R231 of 511K ohms. The opposite side of the capacitor C154 is connected to one side of a resistor R230 of 1M ohms, to terminal 1 of operational amplifier U34C D3 and to one side of a potentiometer resistor R232 of 10K ohms. The opposite side of the resistor R230 is connected to terminal 2 of operational amplifier U34C. The opposite side of the resistor R231, signal D2, is connected to terminal 3 of operational amplifier U34C and to one side of a capacitor C155 of 0.047 microfarads. The opposite side of capacitor C155 is connected to ground.

The opposite side of the resistor R248 is connected to one side of resistor R249 of 1 megohm and to one side of a capacitor C158 of 0.47 microfarads. The opposite side of the capacitor C158 is connected to ground. The opposite side of the resistor R249 is connected to one side of a resistor R250 of 1 meg ohm and to one side of a capacitor C159 of 0.18 microfarads. The opposite side of the resistor R250, signal S3, is connected to terminal 5 of operational amplifier U34D and to one side of a capacitor C160 of 0.1 microfarads. The opposite side of the capacitor C159 is connected to one side of the resistor R251 of 2 meg ohms, to the DM speed line S4, to terminal 7 of operational amplifier U34D and to one side of a potentiometer R252 of 10K ohms. The opposite end of the resistor R251 is connected to terminal 6 of the operational amplifier U34D.

The opposite side of the resistor R263, signal G3, is connected to terminal 10 of operational amplifier U36B. Terminal 9 of operational amplifier U36B is connected to one side of a potentiometer resistor R265 of 100K ohms and to one side of a resistor R264 of 33K ohms. The opposite side of the resistor R264 is connected to ground. Terminal 8 of operational amplifier U36B, signal G4, is connected to one side of a resistor R266 of 33K ohms, to the other end of potentiometer resistor R265, to the wiper of potentiometer resistor R265 and to one side of a resistor R267 of 10K ohms. The opposite side of the resistor R267 is tied to ground potential.

The opposite side of the potentiometer R232 is tied to ground. The wiper of that potentiometer is connected to one side of a resistor R233 of 33K ohms. The opposite side of the resistor R233, signal D4, is connected directly to terminal 12 of operational amplifier U37B. Terminal 13 of operational amplifier U37B is connected to one side of a resistor R234 of 33K ohms and to one side of a resistor R235 of 100K ohms. The opposite side of the resistor R234 is connected to ground.

The terminal 14 of operational amplifier U37B, signal D5, is connected to the opposite end of the resistor R235, to one side of a resistor R236 of 10K ohms, to the one side of the resistor R237 and to one side of potentiometer resistor R238 of 10K ohms. The opposite side of the resistor R236 is connected to ground. The opposite side of potentiometer R238 is connected to ground and its wiper signal D6, is connected through indicator I9 to ground potential.

The opposite end of potentiometer R252 is connected to ground. The wiper of that potentiometer is connected through a resistor R253 of 33K ohms to terminal 3, signal S5, of operational amplifier U37C. Terminal 2 of operational amplifier U37C is connected to one side of resistor R254 of 33K ohms and to one side of a resistor R256 of 100K ohms. The opposite side of the resistor R254 is connected to ground. Terminal 11 of operational amplifier U37C is connected directly to ground. Terminal 1 of operational amplifier U37C is tied to one side of a potentiometer resistor R255 of 10K ohms, to one side of the resistor R258 of 100K ohms, to the other side of the resistor R256 and to one side of a resistor R257 of 10K ohms. The opposite side of the resistor R257 is connected to ground potential. The wiper is potentiometer R255, signal S7, is connected is connected through indicator I10 to ground potential. The opposite end of the potentiometer R255 is connected to ground potential.

The opposite end of the resistor R266 is connected to one side of potentiometer resistor R280 of 10K ohms. The opposite side of the potentiometer resistor R280 is tied to ground potential.

The opposite side of the resistor R228 is tied to one side of a capacitor C163 of 0.02 microfarads, signal H and to one side of a resistor R268 of 150K ohms. The opposite side of the resistor R268, signal H1, is connected to terminal 3 of operational amplifier U36C and to one side of a capacitor C164 of 0.01 microfarads. The opposite side of the capacitor C164 is connected to ground. The opposite side of the capacitor C163 is connected to terminal 1 and 2 of operational amplifier U36C, signal H2 and to one side of a resistor R269 of 10K ohms. The opposite side of the resistor R269, signal H3, is connected to terminal 5 of U36D and to one side of a resistor R270 of 10K ohms. The opposite side of the resistor R270 is connected to ground potential.

Terminal 6 of operational amplifier U36D is connected to one side of potentiometer resistor R271 of 100K ohms, to one side of a resistor R273 of 100K ohms and to capacitor C165 of 0.01 micro farads. The opposite side of the resistor R273 and capacitor C165 is connected to terminal 7, signal H4, of operational amplifier U36D, to one side of a resistor R275 of 33K ohms and to one side of a resistor R274 of 10K ohms. The opposite side of the resistor R274 is connected to ground. Terminal 4 of operational amplifier U36D is connected to the +8 volt supply. The other end of the resistor R271 is connected to the wiper of a potentiometer resistor R272 of 100K ohms. One side of the potentiometer resistor R272 is connected to ground and the other side is connected to the +8 V DC. A capacitor C166 of 0.01 microfarads is connected across the +8 V DC to ground.

Terminal 6 of operational amplifier U37D is connected to one side of a resistor R240 of 100K, and to one side of a resistor R239 of 33K ohms and to one side of capacitor C169 of 0.47 micro farads. The opposite side of the resistor R239 is connected to ground potential. Terminal 7 of operational amplifier U37D, signal V1, is connected to one side of a potentiometer R244 of 10K ohms, to the other side of the resistor R240, to the other side of capacitor C169, to one side of the resistor R241 of 10K ohms, to one side of the resistor R242 of 10K ohms, and to one side of a resistor R325 of 10K ohms. The opposite side of the resistor R241 is connected to ground. The opposite end of the potentiometer resistor R244 is connected to ground potential. The wiper of potentiometer resistor R244, signal V1A, is connected to ground through Indicator I11. Connected to the opposite side of the resistor R242, signal V2, is one end of a potentiometer resistor R243 of 100k ohms, one side of a resistor R321 of 10K ohms, positive side of capacitor C168 of 10 micro farads, and one side of a resistor R318 of 10K ohms. The opposite end of the potentiometer resistor R243 is connected to ground through "J1". The wiper of potentiometer R243 is connected to the V2 side of resistor R242.

The wiper of potentiometer R280 is connected to one side of a resistor R281 of 10K ohms and one side of a resistor R282 of 10K ohms. The opposite end of the resistor R281 is connected to terminal 12 of operational amplifier U38A. Terminal 11 of operational amplfier U38A is connected to ground potential. Terminal 13 of operational amplifier U38A, signal G6A, is connected to one side of a resistor R284 of 100K ohms, to terminal 14 of operational amplifier U38A and to ne side of a resistor R283 of 1K ohm. The opposite side of the resistor R283 is tied to ground.

The oppposite side of the resistor R275 signal H5 is tied to terminal 3 of operational amplifier U38D. Terminal 2, of operational amplifier U38D, is connected to one side of potentiometer R277 of 100K ohms, and to one side of a resistor R276 of 33K ohms. The opposite end of the resistor R276 is connected to ground. The opposite end of the potentiometer R277 is connected to one side of a resistor R279 of 10K ohms, to its wiper, to terminal 1 of operational amplifier U38D, signal H6, and to one side of a resistor R278 of 100K ohms. The opposite side of the resistor R279 is connected to ground.

The opposite side of the resistor R278 is connected to the opposite side of the resistor R284, signal Z, to terminal 5 of operational amplifier U38B and to one side of a resistor R290 of 100K ohms.

The other end of the resistor R282, signal G6B, is connected to terminal 10 of operational amplifier U38C and to one side of a resistor R287 of 5.1 megohms. Terminal 9 of operational amplifier U38C is connected to one side of a resistor R286 of 180 ohms and to one side of a resistor R285 of 10K ohms. The other side of the resistor R286 is connected to ground. The other side of the resistor R285 is connected to the positive 8 volt D.C. regulated power supply, to terminal 4 of operational amplifier U38B, to one side of a potentiometer resistor R295 of 10K ohms, and to one side of a capacitor C179 of 0.01 microfarads. The opposite side of the capacitor C179 is connected to ground potential. Terminal 8 of operational amplifier U38C, signal G7, is connected to the other end of the resistor R287 and to one side of a resistor R288 of 7.5K ohms. The other end of the resistor R288 is connected to the other end of the resistor R290, signal G8, and to one side of a resistor R289 of 1K ohm. The other end of the resistor R280 is connected to ground. Terminal 6 of operational amplifier U38B is connected to one side of resistor R292 of 100K ohms, to one side of capacitor C178 of 0.047 micro farads and to one side of resistor R291 of 51K ohms. The other side of the resistor R291 is connected to ground. The other side of the resistor R292 and capacitor C178 are connected to terminal 7 of operational amplifier U38B, signal Z1, to one side of a resistor R294 of 10K ohms and to one side of resistor R293 of 10K ohms. The other end of resistor R293 is connected to ground.

The other side of resistor R294, signal Z2, is connected to terminal 5 of operational amplifier U40D and to one side of a resistor R296 of 2 megohms. Terminal 6 of operational amplifier U40D is connected to the wiper of potentiometer resistor R295. The opposite end of the potentiometer resistor R295 is connected to ground. Terminal 11 of operational amplifier U40D is connected directly to ground. Terminal 7 of operational amplifier U40D, signal Z3, is connected to one side of a resistor R299 of 330 ohms, to the other side of the resistor R296 to one side of a resistor R297 of 2K ohms and resistor R298 of 10K ohms. The opposite side of the resistor R299, signal Z3A, is connected through indicator I4 to the emitter of transistor Q34 both of which are tied to ground potential. The opposite side of the resistor R298 is connected to the base of transistor Q34, signal Z5. The other side of R297 is connected to the base of transistor Q33 and to the collectors of the both transistors Q35 and Q36. The collector of transistor Q35 is connected to the air bag power switch, the output of which provides an on and off function to the air bag control. The collector of Q33 is connected to the cathode of diode CR30. The anode of CR30 is connected to ground as is the emitter of Q33.

The opposite side of the resistor R318, signal W, is connected to terminal 12 of operational amplifier U40A and to one side of a resistor R317 of 2 megohms. Terminal 13 of operational amplifier U40A is connected to the wiper of a potentiometer resistor 319 of 10K ohms and to the cathode of CR23 which is connected to signal line E4. One end of the potentiometer resistor R319 is connected to the positive 8 volt D.C. regulated power supply. Terminal 14 of operational amplifier U40A, signal W1, is connected to the other side of the resistor R317, to one side of a resistor R329 of 10K ohms, to one side of a resistor R330 of 330 ohms, and to one side of the resistor R328 of 51 ohms. The other side of resistor R330, signal W1B, is connected through indicator I1 to ground potential. The opposite side of the resistor R329 signal W2, is connected to the base of transistor Q28. The emitter of transistor Q28 is tied to ground. The opposite side of the resistor R328 provides signal W1A. The collector of transistor Q28 is connected to one side of a resistor R331 of 5.1K ohms. The opposite end of the resistor R331 is connected to the base of transistor Q29 and to one side of a resistor R333 of 10K ohms. The opposite side of the resistor R333 is connected to the positive 8 volt D.C. regulated power supply. The emitter of transistor Q29 is connected directly to the positive 8 volt D.C. regulated power supply. The collector of transistor Q29, signal W4, is connected to one end of C170 of 0.01 microfarads, to one side of a resistor R334 of 1K ohm, to one side of a resistor R342 of 20K ohms and to terminal 8 of audio tone generator U41. The negative end of the capacitor C170 is connected to ground potential.

Capacitors C174 of 0.1 microfarad and capacitor C175 of 22 microfarads are connected from the positive 8 volt D.C. power supply to ground.

The opposite side of the resistor R321, signal X, is connected to terminal 3 of operational amplifier U40B and to one side of a resistor R320 of 2 megohms. Terminal 2 of operational amplifier U40B is connected to the wiper of a potentiometer, resistor R322 of 10K ohms and to the cathode of CR24. The anode of CR24 is connected to signal line E4. The one side of the potentiometer R322 is connected to the positive 8 volt D.C. regulated power supply, and the other side is connected to one side of a resistor R323 of 2K ohms and the other end of R319. The opposite side of the resistor R323 is connected to ground. The opposite side of the resistor R320, signal X1, is connected to terminal 1 of operational amplifier U40B, to one side of a resistor R331 of 10K ohms and to one side of a resistor R332 of 330 ohms. The opposite side of the resistor R331, signal X2, is connected to the base of transistor Q30. The opposite side of the resistor R332, signal X1A, is connected to one side of indicator I2, the other side of which is connected to ground. The emitter of transistor Q30 is connected directly to ground. The collector of transistor Q30, signal X3, is connected to one side of a resistor R335 of 6.8K ohms and to one side of a resistor R336 of 3.6K ohms. The opposite side of the resistor R335 is connected to ground potential.

The opposite side of the resistor R334, signal T, is connected to one side of a capacitor C171 of 0.001 microfarads, to terminal 5 of the audio tone generator U41 and to one side a resistor R340 of 3.3K ohms. The opposite side of the resistor R340, signal Z6, is connected to one side of a resistor R339 of 2.2K ohms and to the collector of transistor Q34. The opposite side of the capacitor C171 is connected to one side of the resistor R342 and to terminal 6 of the audio tone generator U41. Terminal 7 of audio tone generator U41 is connected to one side of a capacitor C172 of 0.01 microfarads. The opposite side of the capacitor C172 is connected to ground and to one side of a capacitor C173 of 0.01 microfarad. The opposite side of the capacitor C173 is connected to the negative 8 volt D.C. regulated power supply and to terminal 1 of the audio tone generator U41. Terminal 4, signal T1, of the audio tone generator U41 is connected to one side of a capacitor C183 of 0.1 microfarads.

The opposite side of the capacitor C183 is connected to one side of a resistor R343 of 10K ohms. The opposite side of the resistor R343 is connected to one side of potentiometer resistor R344 of 10K ohms. The opposite side the potentiometer resistor R344 is connected to ground and to terminal 2 of operational amplifier U42. The wiper of potentiometer resistor R344 is connected to terminal 3 of power amplifier U42. Terminal 6 of power amplifier U42 is connected to the positive 8 volt D.C. regulated power supply. Terminal 4 of power amplifier U42 is connected to ground potential. Terminal 5 of power amplifier U42 is connected to one side of a resistor R345 of 10 ohms and one side of a capacitor C177 at 100 microfarads. The opposite side of the resistor R345 is connected to one side of a capacitor C176 of 0.047 microfarads. The other side of C176 is connected to ground. The opposite side of the capacitor C177 provides signal T3.

The opposite side of the resistor R325, signal Y, is connected to terminal 10 of operational amplifier U40C and to one side of a resistor R324 of 2 megohms. Terminal 9 of operational amplifier U40C is connected to the wiper arm of a potentiometer resistor R326 of 10K ohms, and to cathode of CR25. The other side of CR25 is connected to E4. One side of the potentiometer resistor R326 is connected to the positive 8 volt D.C. regulated power supply and the other side is connected to one side of a resistor R327 of 1.5K ohms. The opposite side of the resistor R327 is connected to ground. The opposite end of the resistor R324 is connected to terminal 8 of operational amplifier U40C, signal Y1, DM brake output, to the one side of a resistor R337 of 10K ohms, and one side of resistor R341 of 2K ohms and one side of a resistor R338 of 330 ohms. The opposite side of the resistor R337, signal Y2, is connected to the base of transistor Q31. The collector of transistor Q31, signal Y3, is connected to the other side of the resistor R336 and resistor R339. The opposite side of the resistor R338 is connected through indicator I3, the opposite side of which is connected to ground. The emitter of transistor Q31 is tied to ground. The opposite side of resistor R341 is connected to the base of transistor Q32 signal Y4. The collector of transistor Q32 provides signal Y5. The emitter of transistor Q32 is connected to ground potential. A diode CR29 has its cathode connected to the collector of transistor Q32 and its anode connected to ground potential.

Operational amplifier U39A has terminal 12, signal F, connected to one side of a resistor R300 of 1K ohm. The opposite side of the resistor R300 is connected to signal line B10. Terminal 4 of operational amplifier U39A is connected to the positive 8 V DC. Terminal 13 of operational amplifier U39A is connected to one side of a resistor R302 of 100K ohms, to one side of a capacitor C180 of 0.022 microfarads and to one side of a resistor R301 of 1K ohms. Terminal 14 of operational amplifier U39A, signal F1, is connected to one side of a resistor R305 of 10K ohms, to the opposite side of resistor R302 and capacitor C180 and to one side of a resistor R303 of 2K ohms. Resistors R301 and R303 have their opposite sides connected to ground.

The opposite side of resistor R305, signal F2, is connected to terminal 9 of operational amplifier U39B. Terminal 10 of operational amplifier U39B is connected to one side of a resistor R308 of 1 megohm and to the wiper of potentiometer resistor R304 of 10K ohms. Potentiometer resistor R304 is connected between the positive 8 volt D.C. line and ground. The opposite side of resistor R308, signal F3, is connected to terminal 8 of operational amplifier U39B and to the anode of diode CR27.

Terminal 6 of operational amplifier U39C, signal P2, is connected to one side of a resistor R309 of 10K ohms. The opposite side of resistor R309, signal P1, is connected to the positive side of a capacitor C181 of 1 microfarad, to one side of a resistor R307 of 15K ohms and to one side of a resistor R306 of 10K ohms. The opposite side of resistor R306 is connected to ground. The opposite side of resistor R307 is connected to the cathode of diode CR26. The anode of diode CR26 is connected to the 12 volt D.C. power source. The opposite side of capacitor C181 is connected to ground. Terminal 5 of operational amplifier U39C is connected to one side of a resistor R311 of 10K ohms to one side of a resistor R312 of 1 megohm and to one side of R310 of 10K ohms. The other side of resistor R310 is connected to ground. The opposite side of resistor R311 is connected to the the positive 8 V DC. The opposite side of resistor R312, signal P3, is connected to terminal 7 of operational amplifier U39C and to the anode of diode CR28.

The positive side of a capacitor C182 of 22 microfarads is connected to the positive 8 volt D.C. line. The negative side or the other side of capacitor C182 is connected to one side of a resistor R313 of 15K ohms, to the base of transistor Q35 and to one side of a resistor R314 of 15K ohms. The opposite side of resistor R314 is connected to ground.

The opposite or the cathode side of diode CR27 is connected to the cathode of diode CR28, to one side of a resistor R315 of 2K ohms and to one side of a resistor R316 of 10K ohnms. The opposite side of R316 is connected to ground. The opposite side of resistor R315 is connected to the base of transistor Q36. The emitters of transistors Q35 and Q36 are connected to ground.

Referring now specifically to FIG. 6 the 12 volt car battery negative 211 is connected to ground and the positive pole 213 is connected to one side of the main vehicle power switch 215. The opposite side of switch 302 provides 12 volt D.C. power source. The output of the main power switch is connected to the anode of diode CR46, to the switched +12 volt line and to one side of a resistor R415 of 511 ohms. The opposite side of the resistor R415 is connected through indicator I6. The other side of the indicator I6 is connected to ground potential 211. The cathode of diode CR46 is connected to the positive side of a capacitors C203 and C204 of 10 microfarads, to terminal 1 of U52, U53 and U54. The opposite side of the capacitors C203 and C204 are connected to ground potential. Terminals 3 of U52 and U53 are connected to ground. Terminal 2 of U52 provides the +8 V DC regulated source and terminal 2 of U53 provides the +5 volt D.C. rgulated source. Also connected to the number 2 terminals is one side of capacitors C205 and C206 of 22 microfarads. The opposite side of capacitors C205 and C206 are connected to ground potential.

Terminals 2 and 4 of the D.C. to D.C. convertor U54 are tied directly to ground potential. Terminal 3 of the U54 is connected to terminal 1, the input of the minus 8 volt D.C. regulated power supply U55 and to one side of a capacitor C207 of 22 microfarads. The opposite side of capacitor C207 is connected to ground potential.

Terminal 2 of U55 provides the minus 8 volt D.C. regulated power source and is connected to ground through C208 of 22 microfarads.

Figures 7, 7B:
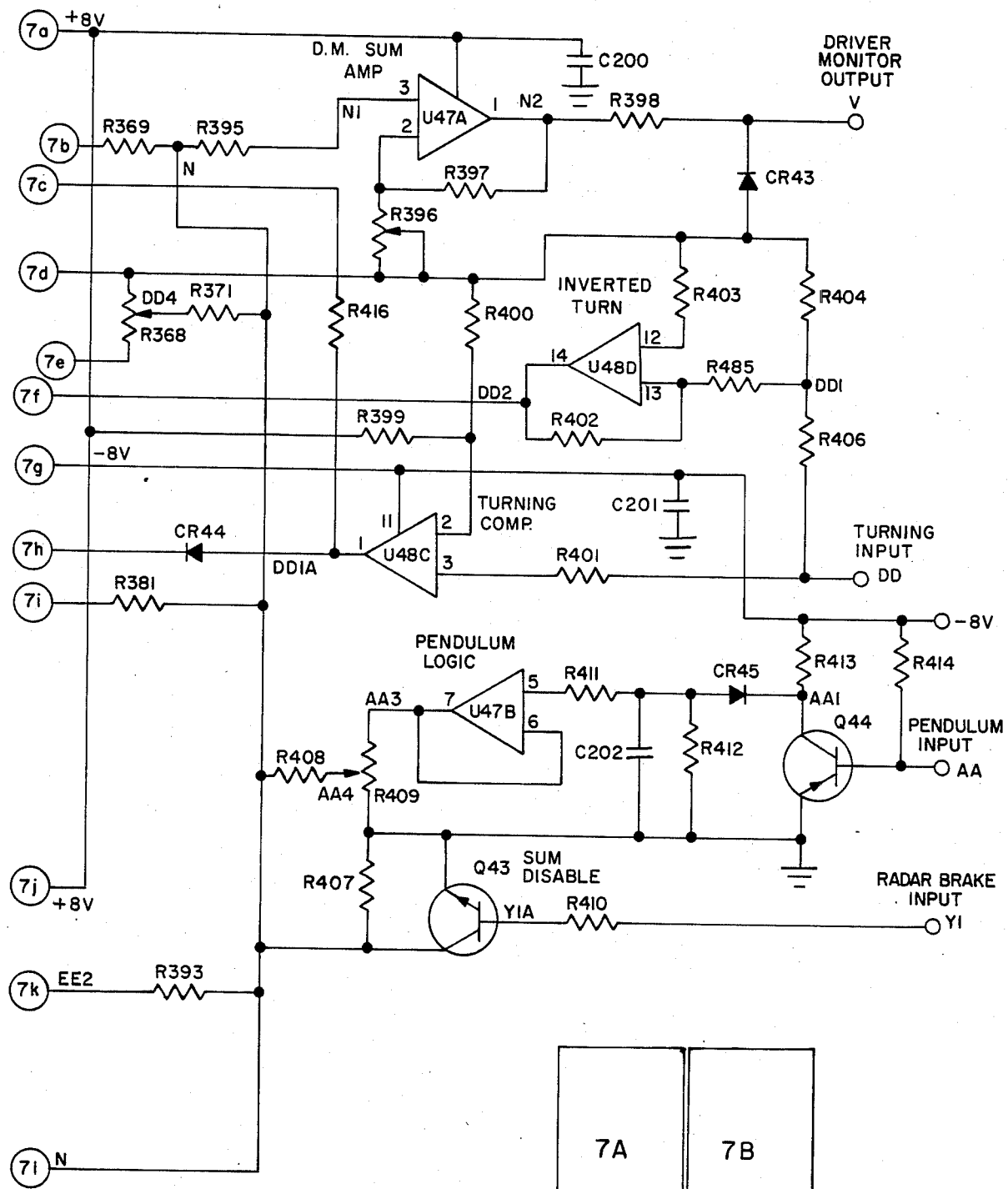
FIG. 7 depicts the relative positions of FIGS. 7A and 7B.
FIGS. 7A and 7B are detailed schematic showings of the drive monitor circuit of FIGS. 4A and 4B.
Figure 7A:
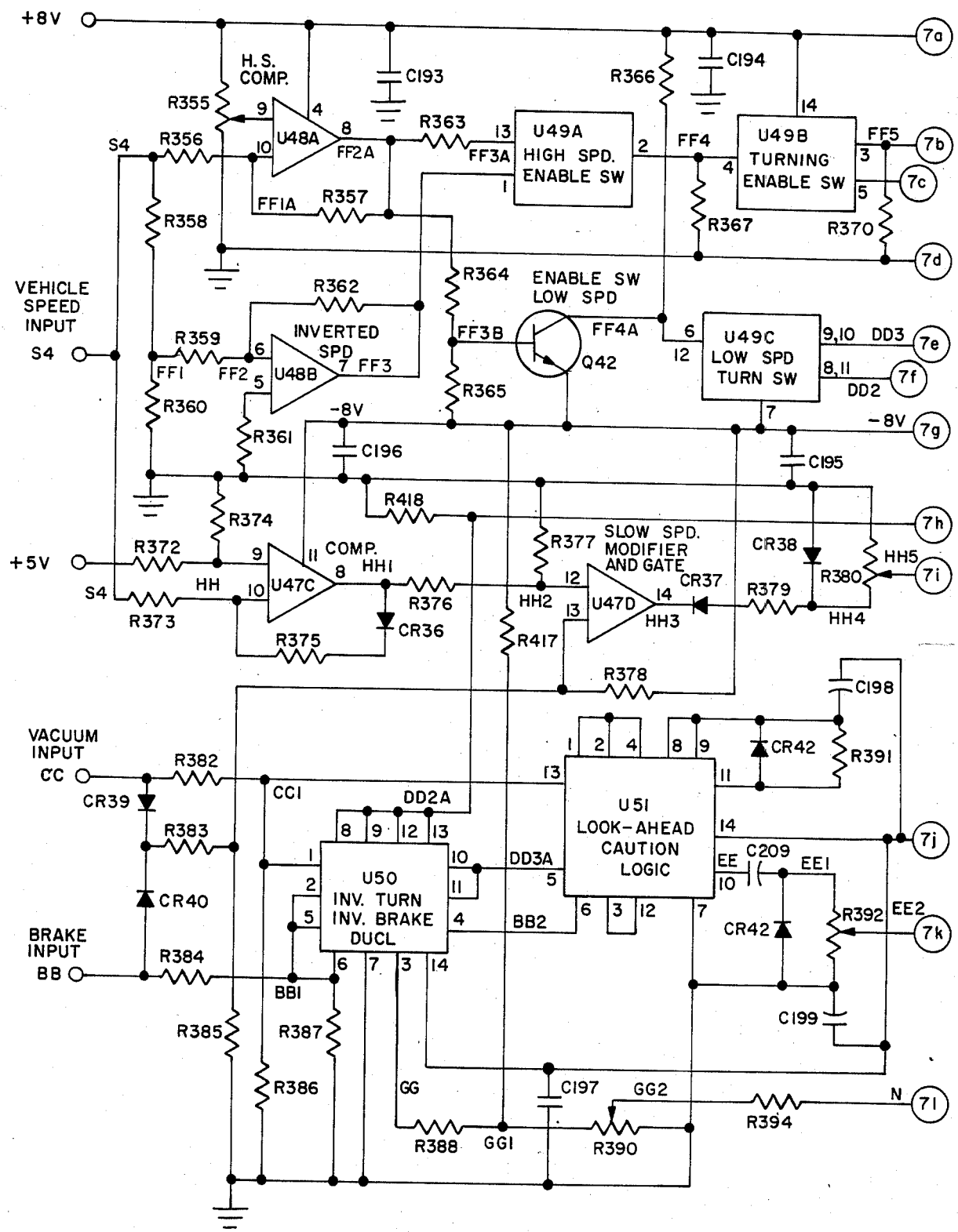

Referring now to the schematic showing of FIGS. 7A and 7B, the relative positions of FIGS. 7A and 7B are shown in FIG. 7. The vehicle speed input signal S4 is connected to one side of a resistor R356 of 10K ohms to one side of R373 of 51.1K ohms, and to one side of a resistor R358 of 1K ohms. The opposite side of the resistor R356, signal FF1A, is connected to terminal 10 of operational amplifier U48A and to one side of a resistor R357 of 2 meg ohms. Terminal 4 of operational amplifier U48A is connected directly to the positive 8 volt D.C. regulated supply. Terminal 8 of operational amplifier U48A, signal FF2A, is connected to the other side of the resistor R357, to one side of a resistor R364 of 10K ohms and one side of a resistor R363 of 10K ohms. Terminal 9 of operational amplifier U48A is connected to the wiper of potentiometer resistor R355 of 10K ohms. One end of potentiometer resistor R355 is connected to positive 8 volt regulated D.C. line. The opposite side of the resistor R355 is connected to ground. A capacitor C193 of 0.01 microfarads is connected between the 8 volt D.C. regulated line and ground potential.

The opposite side of the resistor R358, signal FF1, is connected to one side of a resistor R359 of 10K ohms and one side of a resistor R360 of 10K ohms. The opposite side of the resistor R359, signal FF2, is connected to terminal 6 of operational amplifier U48B and to one side of a resistor R362 of 10K ohms. The opposite side of the resistor R360 is connected to ground as is one side of a resistor R361 of 10K ohms. The opposite side of the resistor R361 is connected to terminal 5 of operational amplifier U48B. The opposite side of the resistor R362, signal FF3, is connected to terminal 7 of operational amplifier U48B and to terminal 1 of the high speed enable switch U49A.

The opposite side of the resistor R363 is connected to terminal 13 of the high speed enable switch U49A. Terminal 2 of high speed enable switch U49A, signal FF4, is connected to terminal 4 of a turning enable switch U49B and to one side of a resistor R367 of 10K ohms. A capacitor C194 of 0.01 microfarads is connected between the positive 8 volt D.C. regulated line and ground potential. The opposite side of the resistor R367 is connected to ground potential.

Terminal 3 of the turning enable switch U49B, signal FF5, is connected to one side of a resistor R369 of 100K ohms and to one side of a resistor R370 of 10K ohms. Terminal 5 of turning enable switch U49B is connected to one side of a resistor R416 of 10K ohms. The other side of R370 is connected to ground.

Terminal 12 of operational amplifier U48D is connected to a resistor R403 of 10K ohms. The opposite side of the resistor R403 is connected to ground potential. One side of R404 of 1K ohms is connected to ground and the other side signal DD1, is connected to one side of a resistor R405 of 10K ohms and to one side of a resistor R406 of 1K ohm. The opposite side of the resistor R405 is connected to the terminal 13 of operational amplifier U48D and to one side of a resistor R402 of 10K ohms. The opposite side of the resistor R406 is connected to one side of a resistor R401 of 10K ohms and provides the DD turning signal input. The output terminal 14 signal DD2, of operational amplifier U48D is connected to terminals 8 and 11 of a low speed steering angle switch U49C and to the other side of the resistor R402.

The opposite side of resistor R401 is connected to terminal 3 of an operational amplifier U48C. One side of a resistor R399 of 7.5K ohms is connected to the positive 8 volt regulated D.C. line. The opposite side of the resistor R399 is connected to one side of a resistor R400 of 47.5 ohms and to terminal 2 of operational amplifier U48C. The opposite side of the resistor R400 is connected to ground potential. Terminal 11 of operational amplifier U48C is connected to the −8 V DC as is one side of a resistor R365 of 10K ohms, to one side of a capacitor C196 of 0.01 micro farad, to one side of a capacitor C195 of 0.01 uF to one side of resistor R417 of 16.2K ohms, capacitor C201 of 0.01 micro farad, resistor R413 of 10K ohms to emitter of transistor Q42 and to resistor R414 of 100K ohms. The opposite side of the capacitors C195, C196 and C201 are connected to ground potential. The output terminal 1, signal DD1A, of operational amplifier U48C is connected to the anode of a diode CR44 and to the other side of the resistor R416.

The opposite side of the resistor R364, signal FF3B, is connected to the base of transistor Q42 and to the other side of the resistor R365. The collector of transistor Q42, FF4A, is connected to one side of a resistor R366 of 10K ohms and to terminals 16 and 12 of low speed turn switch U49C. The opposite side of the resistor R366 is connected to the positive 8 volt D.C. regulated supply.

Terminal 7 of the low speed turn switch U49C is connected to the minus 8 volt regulated D.C. line. Terminals 9 and 10 of low speed turn switch U49C is connected to one side of a potentiometer R368 of 10K ohms. The opposide side of the potentiometer R368 is connected to ground potential.

The other side of the resistor R369, signal N, is connected to one side of a resistor R371 of 100K ohms, to one side of R381 of 100K ohms, to one side of a resistor R393 of 100K ohms, to one side of a resistor R395 of 100K ohms, to one side of a resistor R407 of 100K ohms, to the collector of transistor Q43, to one side of a resistor R408 of 100K ohms and to one side of a resistor R394 of 100K ohms. The opposite side of resistor R371, signal DD4, is connected to the wiper of potentiometer R368, and the opposite side of R394, signal GG2, is connected to the wiper of potentiometer resistor R390.

The input from vacuum switch CC is connected to one side of a resistor R382 of 100K ohms and to the anode of CR 39. The opposite side of the resistor R382, signal CC1, is connected to one side of resistor R386 of 100K ohms, terminal 1 of U50 and terminal 13 of U51. The opposite side of the resistor R386 is connected to ground potential. Terminals 2 and terminals 5, signal BB1, of inverted brake circuit U50 are connected to terminal 6 of U50, to one side of a resistor R387 of 100K ohms and to one side of a resistor R384 of 100K ohms. The opposite side of the resistor R384 is connected to the brake input switch, signal BB, and to the amode of CR40. The other side of R387 is connected to ground.

The opposite side of the resistor R417, signal GG1, is connected to one side of a potentiometer R390 of 10K ohms and to one side of a resistor R388 of 16.2K ohms. The opposite side of the resistor R388, signal GG, is connected to terminal 3 of U50. Terminal 4 of U50, signal BB2, is connected to terminal 6 of look-ahead logic circuit U51. Terminals 8, 9, 12 and 13 of circuit U50 are connected together and to the cathode of a diode CR44 and to one side of a resistor R418 of 10K ohms. The opposite side of the resistor R418 is connected to ground potential. Terminal 7 of inverter turning circuit U50 is connected to the opposite side of potentiometer R390, and to ground potential. Terminal 7 is also connected to one side of a capacitor C197 of 0.01 microfarads. The opposite side of the capacitor C197 is connected to terminal 14 of inverter turning circuit U50, to one side of a capacitor C199 of 0.01 microfarads, to terminal 14 of look-ahead caution logic circuit U51, to one side of a capacitor C198 of 0.1 microfarads and to the positive 8 volt regulated D.C. line. The opposite side of the capacitor C197 is connected to ground potential. One side of potentiometer resistor R392 of 100K ohms, signal EE1, is connected to the anode of the diode CR42, to the negative side of C209 is 1 micro farad. The anode of CR42 is connected to terminal 7 of the look-ahead caution logic circuit U51 and to ground potential. Terminals 1, 2, and 4 of look-ahead caution logic U51 are tied together. Terminals 3 and 12 of look-ahead caution logic U51 are tied together. Terminal 11 of look-ahead caution logic U51 is connected to the anode of a diode CR41 and to one side of the resistor R391 of 22 meg ohms. The cathode of diode CR41 is connected to terminals 8 and 9 of the look-ahead caution logic U51, to the opposite side of the resistor R391 and to the other side of capacitor C198. Terminal 10 of look-ahead caution logic U51 signal EE is tied to the other side of a capacitor C209. The wiper of the potentiometer R392, signal EE2, is tied to the other side of R393. Terminals 10 and 11 of U50, signal DD3A, are connected to terminal 5 of U51. Terminals 1, 2 and 4 are interconnected and terminal 3 and 12 are interconnected on U51.

The opposite side of the resistor R395 is connected to terminal 3, signal N1, of operational amplifier U47A. Resistor R407 is connected the emitter of Q43. The emitter of transistor Q43 is also connected to ground potential. The base of the transistor Q43, signal Y1A, is connected to one side of a resistor R410 of 10K ohms. The opposite side of the resistor R410 provides a Y1 signal. Terminal 2 of operational amplifier U47A is connected to one side of a resistor R397 of 33.2K ohms and to one side of a potentiometer resistor R396 of 10K ohms. The opposite end of the potentiometer resistor R396 and its wiper are connected to ground potential. The opposite side of the resistor R397 is connected to terminal 1 of operational amplifier U47A, signal N2, and to one side of a resistor R398 of 100K ohms. The opposite side of the resistor R398 which provides the V signal to the cathode of a diode CR43. The anode of diode CR43 is connected to ground potential.

The pendulum signal input AA is connected to one side of a resistor R414 of 100K ohms and to the base of a transistor Q44. The collector of the transistor Q44 is connected to the opposite side of the resistor R413, signal AA1, and to the cathode of a diode CR45. The anode of the diode CR45, signal AA2, is connected to one side of a resistor R412 of 10 meg ohms, to one side of a capacitor C202 of 0.047 microfarads and to one side of a resistor R411 of 10K ohms. The opposite side of the capacitor C202 and resistor R412 are connected to ground potential. The opposite side of the resistor R411 is connected to terminal 5 of operational amplifier U47B. The terminal 6 of operational amplifier U47B is connected to output terminal 7, signal AA3, and to one side of a potentiometer resistor R409 of 10K ohms. The opposite side of the potentiometer R409 is tied to ground potential. The wiper of the potentiometer R409, signal AA4, is tied to the other end of the resistor R408.

The opposite end of R381, signal HH5, is connected to the wiper of potentiometer resistor of R380 of 10K ohms. One side of potentiometer resistor R380, signal HH4, is connected to the cathode of CR38 and to one side of resistor R379 of 10K ohms. The anode of diode CR38 and the other end of potentiometer resistor R380 are connected to ground potential. The opposite side of resistor R379 is connected to the anode of diode CR37. The cathode of CR77, signal HH3, is connected to terminal 14 of U47D. Terminal 12 of U47D is connected to one side of resistor R377 of 5.11K ohms and one side of resistor R376 of 10K ohms. The opposite side of R377 is connected to ground potential. Terminal 13 of U47D is connected to one side of resistors R378 of 10K ohms, R383 of 20K ohms and resistor R385 of 10K ohms. The other side of R378 is connected to the −8 V DC source. The other side of R386 is connected to ground potential. The opposite side of resistor R382 is connected to the cathode of CR39 and CR40.

The opposite side of R376, signal HH1, is connected to terminal 8 of U47C and to the anode of diode CR36. Terminal 11 of U47C is connected to the −8 V DC supply. Terminal 9 of U47C is connected to one side of resistors R374 of 1K ohms and R372 of 51.1K ohms. The other end of R374 is connected to ground potential. The other side of R372 is connected to the +5 V DC source. Terminal 10 of U47C, signal HH, is connected to the other side of resister R373 of 51.1K ohms and one side of resistor R375 of 10 Meg ohms. The opposite side of R375 is connected to the cathode of CR36.

The following is a list of the components used in the circuits discussed above:

| Q# | Transistors | Devices | Usage |
|---|---|---|---|
| Q1 | 2N6111 | PNP | Series-Pass Regulator |
| Q2 | 2N2222A | NPN | Current Limiter |
| Q3 | 2N2222A | NPN | Feedback Control |
| Q4 | 2N5771 | PNP | Level Translator |
| Q5 | 2N2369A | NPN | Short Range Modulater |
| Q6 | 2N2369A | NPN | Long Range Modulater |
| Q7 | 2N3906 | PNP | Log-Linear Conv. |
| Q8 | 2N3906 | PNP | Log-Linear Conv. |
| Q9 | 2N3906 | PNP | Log-Linear Conv. |
| Q10 | 2N3906 | PNP | Log-Linear Conv. |
| Q11 | 2N2222A | NPN | 1 VDC Regulator |
| Q12 | 2N2222A | NPN | Hysterisis Sw. |
| Q13 | 2N2907A | PNP | Level Translator |
| Q14 | 2N2222A | NPN | Level Translator |
| Q15 | 2N2907A | PNP | Disable Switch |
| Q16 | 2N2369A | NPN | Slope Inverter |
| Q17 | 2N2222A | NPN | Disable Switch |
| Q18–Q26 NOT USED | | | |
| Q27 | 2N2369A | NPN | Slope Inverter |
| Q28 | 2N2222A | NPN | Switch |
| Q29 | 2N2907A | PNP | Level Translator |
| Q30 | 2N2222A | NPN | Tone Switch |
| Q31 | 2N2222A | NPN | Tone Switch |
| Q32 | MJE1101 | NPN Dar. Trans | Brake Power Switch |
| Q33 | MJE1101 | NPN Dar. Trans | Air-Bag Power Switch |
| Q34 | 2N2222A | NPN | Tone Switch |
| Q35 | 2N2222A | NPN | Power-Up Disable Sw. |
| Q36 | 2N2222A | NPN | Air-Bag Disable Sw. |
| Q37–Q41 NOT USED | | | |
| Q42 | 2N2222A | NPN | Low Speed Enable Sw. |
| Q43 | 2N2222A | NPN | DM "SUM" Disable Sw. |
| Q44 | 2N2907A | PNP | Level Translator |
| U1 | NE566CN | Function Gen. | System Clock |
| U2 | MC14013BCP | Type D Flip-Flop | Gate Generater |
| U3 | MCI4081BCP | AND Gates | Dual Diplex Driver |
| U4 | MCI4082BCP | AND Gates | Channel 2 Control |
| U5 | MC14011BCP | NAND Gates | Inverter |
| U6 | MC14082BCP | AND Gates | Channel 1 Control |
| U7 | MC14066BCP | Angl. Switch | Dual Diplex De-Mod |
| U8 | NE5532A | Op-Amp | Low Noise Pre-Amp |
| U9 | MF4-50 | Low Pass Filter | Low Pass Filter |
| U10 | MF4-50 | Low Pass Filter | Low Pass Filter |
| U11 | MF4-50 | Low Pass Filter | Low Pass Filter |
| U12 | MF4-50 | Low Pass Filter | Low Pass Filter |
| U13A | NE572 | Analog Compdr. | Compressor Control |
| B | " | " | " |
| U14A | NE5532A | Op Amp | Compressor Amp |
| B | " | " | " |
| U15A | NE572 | Analog Compdr. | Compressor Control |
| B | " | " | " |
| U16A | NE5532A | Op Amp | Compressor Amp |
| B | " | " | " |
| U17A | TL082C | J-FET Op Amp | 30DB Amp |
| B | " | " | " |
| U18A | LM339N | Volt Comparator | Squaring Amp |
| B | " | " | " |
| C | " | " | " |
| D | " | " | " |
| U19A | TL082C | J-FET Op Amp | 30DB Amp |
| B | " | " | " |

-continued

| Q# | Transistors | Devices | Usage |
|---|---|---|---|
| U20A | LM339N | Volt Comparator | Squaring Amp |
| B | " | " | " |
| C | " | " | " |
| D | " | " | " |
| U21A | NE5532A | Op Amp | DC Offset Amp |
| B | " | " | DC Amp |
| U22 | MC14011BCP | NAND Gates | Logic Buffer |
| U23 | MC14011BCP | NAND Gates | Logic Sensor |
| U24A | MC145538BCP | Prec. Mono Multi | Pulse Generator |
| B | " | " | Not Used |
| U25 | MC14013BCP | Type D Flip-Flop | Channel Comparator |
| U26 | MC14011BCP | NAND Gates | Phase Shift Detecter |
| U27A | TL082C | J-FET Op Amp | Integrator |
| B | " | " | Comparator |
| U28–U31 NOT USED | | | |
| U32A | MC14011BCP | NAND Gates | Phase Shift Detecter |
| U33A | MC14066BCP | Analog Sw. | Hold Switch |
| B | " | " | " |
| C | " | " | " |
| D | " | " | " |
| U34A | LM324N | Op Amp | Range Integrater |
| B | " | " | DC Offset Amp |
| C | " | " | Doppler Integrater |
| D | " | " | Speed Integrater |
| U35A | MC14538BCP | Prec. Mono Multi | Freq. to Analog Conv. |
| B | " | " | " |
| U36A | LM324N | Op Amp | A–B Doppler Inter. |
| B | " | " | DC Amp |
| U37A | LM324N | Op Amp | DC Amp |
| B | " | " | " |
| C | " | " | " |
| D | " | " | Main "SUM" Amp |
| U38A | LM324N | Op Amp | Doppler Amp |
| B | " | " | A–B "SUM" Amp |
| C | " | " | Doppler Comparator |
| D | " | " | DC Amp |
| U39A | LM324N | Op Amp | S.S. DC Amp |
| B | " | " | S.S. Comparator |
| C | " | " | Power Down Detector |
| D | " | " | NOT USED |
| U40A | LM324N | Op Amp | Warning Comparator |
| B | " | " | Caution Comparator |
| C | " | " | Brake Comparator |
| D | " | " | Air-Bag Comparator |
| U41 | NE566CN | Function Gen | Audio Tone Gen. |
| U42 | LM386N | Power Amp | Audio Power Amp |
| U43–U47 NOT USED | | | |
| U47A | TL084C | J-FET Op Amp | D.M. "SUM" Amp |
| B | " | " | Pendulum Logic |
| C | " | " | Comparator |
| D | " | " | AND Gate |
| U48A | TL084C | J-FET Op Amp | High Speed Comparator |
| B | " | " | Speed Inverter |
| C | " | " | Turning Comparator |
| D | " | " | Turning Inverter |
| U49A | MC14066BCP | Analog Sw. | High-Speed Enable Sw. |
| B | " | " | Turning Enable Sw. |
| C | " | " | Low-Speed Turn. Sw. |
| D | " | " | NOT USED |
| U50A | MC14011BCP | NAND Gates | Inverted Turn |
| B | " | " | Inverted Turn |
| C | " | " | Inverted Brake |
| D | " | " | Driver Under Cntl. Logic |
| U51 | MC14011BCP | NAND Gates | Look-Ahead Caution Logic |
| U52 | MC78M08C | Pos. V. Reg. | +8V DC Regulator |
| U53 | MC78M05C | Pos. V. Reg. | +5V DC Regulator |
| U54 | Al-H12512/125W | DC-DC Conv. | Minus Voltage Supply |
| U55 | MC7908C | Neg. V. Reg. | −8V DC Regulator |

Diodes
CR1, 21, 22 and CR36 are IN4002
CR3 Zener Diode IN5239B
All others are 1N4148

Inputs
J1 Heavy Traffic Switch
J2 High-Low Margin Switch
J3 Wet Road Sensor Switch
AA Rate Sensor-Pendulum
BB Brake Input
CC Carburetor Vacuum Input
DD Turning Sensor-Steering The following is a description of all the output indications of the radar system:

I1 "W1B" is a light emitting diode which illuminates when the Warning channel is activated.

I2 "X1A" is a light emitting diode which illuminates when the Caution channel is activated.

I3 "Y1A" is a light emitting diode which illuminates when the Brake channel is activated.

I4 "Z3A" is a light emitting diode which illuminates when the Air-Bag channel is activated.

I5 "B19A" is a light emitting diode which illuminates upon a Loss of Signal condition by the radar, which exceeds 30 seconds.

I6 is a light emitting diode (pilot light) which illuminates when DC power is applied to the radar.

I7 "B12A" is a 1 ma panel meter which indicates the level of Signal Strength of a "radar target" in a DB above a no signal condition (80 DB range).

I8 "K8" is a 1 ma panel meter which indicates the Range to the radar target in feet. (250 feet maximum).

I9 "D6" is a 1 ma panel meter which indicates the Doppler closing rate.

I10 "S7" is a 1 ma panel meter which indicates vehicle speed.

I11 "V1A" is a 1 ma panel meter which indicates "sum" voltage. (degree of danger)

I12 "KA4A" is a 1 ma panel meter which indicates long range channel in feet. (0–5000 feet)

I13 "E5" is a light emitting diode which illuminates when a target is moving away from the vehicle. (Directional Doppler)

I14 "KA8" is a light emitting diode which illuminates when a target is greater than 250 feet away from the vehcile.

INPUTS

The following is a description of the inputs other than from the radar sensing.

Auto Speed "S" Input

This input normally comes from the car's cruise control circuit. The input is 12 volts in amplitude and switches on and off approximately every 24 inches. This input can read any pulse waveform 5 volts in amplitude or higher and converts to MPH.

Vacuum Input "CC"

The vacuum switch input is activated by the car's motor vacuum system. When the vacuum is high the switch is closed and supplies 12 VDC to point "CC". High vacuum is 3 PSI (or more) of vacuum suction and when the vacuum is low or below 3 PSI the vacuum switch is open providing 0 volts.

A car's engine has low vacuum when the motor is working or accelerating and it has a high vacuum when the car's accelerator is not depressed. The carburetor's butter-fly valve, when open, causes the vacuum to drop or go low and vice-versa.

Brake Input "BB"

The brake input "BB" is the same 12 VDC that is used for the brake stop lights on the rear of the car. When the brakes are applied, you are slowing the car, and informing the radar system that you are doing so. The radar's influence is modified so that it will not interfere with what the driver.

Pendulum Input "AA"

The pendulum switch is activated only by and during a sudden turn by the vehicle. The pendulum senses only a sudden change in the vehicle direction of travel and quickly returns to its normal position (off) when the vehicle ceases the turning movement. When a quick turn is made, point "AA" is switched to ground by the pendulum action and this action tells the radar that the car is turning in a sudden or evasive manner.

Turning Input "D"

Point "DD" is connected to six resistors in series that are individually by-passed by six switches which are activated when the car's steering wheel is turned up to 360°. This string of resistors is connected to +8 V at one end and to point "DD" at the other end.

When the steering wheel is rotated (L or R) 30°, the first switch is connected to the string of six resistors. This first step will modify the radar's safe zone about 6 feet and the other switches do likewise. This will modify or decrease the safety zone in turns and will prevent or ignore unwanted warnings. The second switch is turned on and by-passes the first resistor and this action continues as the steering wheel continues to be turned. The fourth switch is activated at 180°, the fifth at 270° and the sixth switch at 360°.

The number of switches and resistors can be increased as necessary. There are twelve switching steps (left and right) and these switches can be used for other turning considerations.

Antenna Turning

When a car is not traveling a straight course it is turning in a curved pathway, or in a circle. The radar's narrow beam, is called a pencil beam because its shape is straight and cannot be curved.

When a car is turning it appears to be going straight but it is not. The real direction of travel is determined by the tire angle with respect to the car's body. For the Radar Collision Avoidance System to be effective in turns, it must look to a point on a precise chord-line to intersect the circular pathway to see where the car will be going.

The antenna's turning with the, angle of turn and the car's speed are combined to give a complex modification of the straight driving algorithum. An example is: if a car is going 10 MPH and the steering wheel is turned 45°, the logic zone is brought in (shortened) by 10 feet from its usual 30 feet. At 50 MPH on a slightly curved freeway if the steering wheel angle is 15°, turn the zone is reduced to 100 feet (straight travel is 150 feet).

Figure 8:
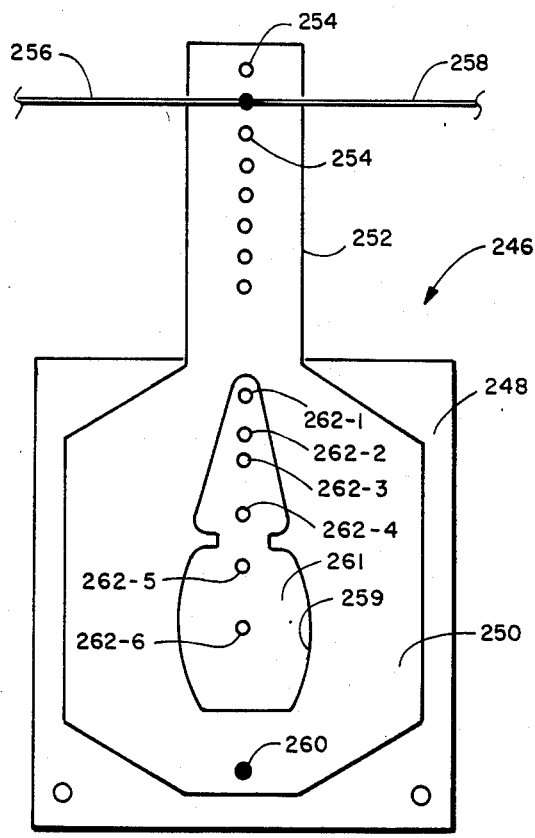
FIG. 8 is a plan view of the turn switch of the invention.
Figure 9:
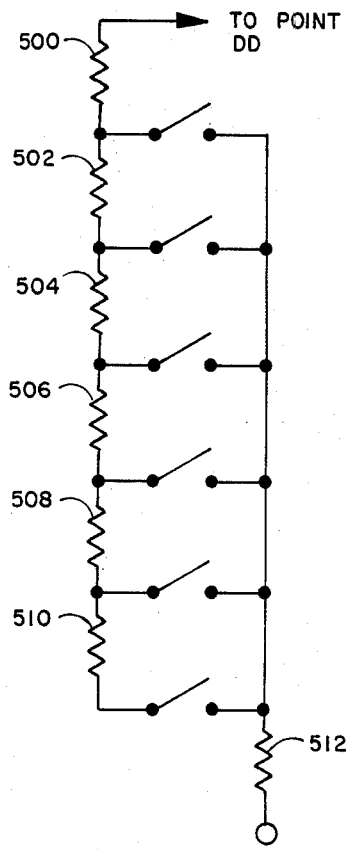
FIG. 9 is the electrical schematic of the turn switch circuit.

FIG. 8 depicts the turning switch 246 for producing the turning signal DD. The switch comprises a plastic mounting plate 248 and a control arm 250, the control arm 250 somewhat resembling a paddle. The outer portion 252 of the control arm includes a plurality of apertures 254. A cable 256 is attached to the automobile steering tier rod, not shown, and cable 258 is connected to a spring bias, not shown. These cables are connected to the same aperture. The proper aperture 254 is selected that provides the required turning to wheel direction for a given automobile. The control arm 250 is constructed of an electrically conductive material such as, for example, brass, copper or the like. The center of the control arm has an opening 259 assembling generally the shape of a bottle. The control arm is pivotally attached to the plastic mounting plate 248 by means of pivot 260. Electrical contacts 262-1 through 6 are mounted on the mounting plate beneath the opening. The rotation of control arm 250 causes the control arm to progressively engage switch contacts 262-1 through 6. The switch contacts, see FIG. 9, in conjunction with resistors R500 through R512 act as a voltage divider between the +8 VDC source and signal point DD. The shape of the opening 259 and the value of the resistors R500 and R512 provide the required voltage output at DD for a given turning radius.

Figure 10:
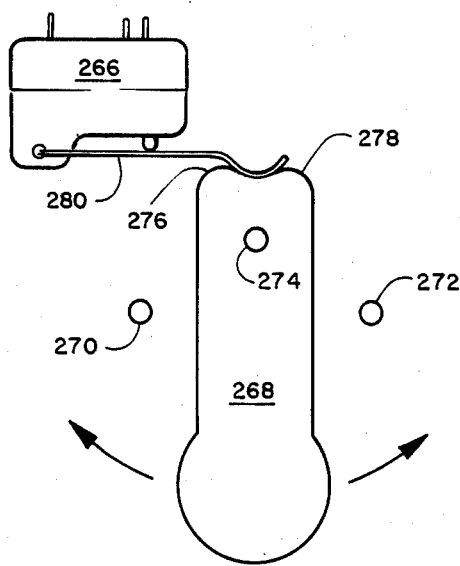
FIG. 10 is a schematic showing of the pendulum and associated switch of the invention.

FIG. 10 depicts the pendulum switch 264 which provides signal AA. The switfch 264 comprises a microswitch 266 in conjunction with a pendulum weight 268. The switch and pendulum are mounted vertically on the vehicle at any convenient location near the radar system. A pair of stops 270 and 272 are employed to prevent excessive pendulum swing. The pendulum weight 268 is pivotable about pivot point 274. When the pendulum weight is caused to pivot about 274, cams 276 and 278 cause the switch activating arm 280 to close the switch to its on position and connect signal AA to vehicle ground.

OPERATION OF THE INVENTION

The automotive radar system of the invention is a CW diplexed Doppler radar that operates at a frequency of 10.525 or 24.125 GHZ. The radar R.F. power output is approximately 10 milli-watts (mw) and provides and operating range of 220 feet and a maximum range of 2000 feet. The antenna 48 has a shaped beam width of six degrees that is designed to cover one lane of roadway. The radar of the invention is designed to improve driving safety by warning the driver before imminent collision, partially brake the car if danger exceeds a predetermined condition and finally, activates air bag development when a high speed collision is certain.

The Radar system is made up of three major assemblies; the antenna assembly 22, the main signal processor unit 20 and the output monitor 42. The antenna assembly consists of a microwave antenna, a 10.525 GHZ transceiver, and a printed circuit board which contains the Gunn-diode modulator 56, a low noise preamplifier 66, a system clock 52, a dual diplex generator 54, demodulator switches 94-100 and the low pass filters 102A-102D. The transceiver contains a Gunn diode transmitter 58, a receiver Schottky barrier diode receiver 64, a waveguide coupler/circulator 60 and an RF load 62. The transceiver uses a "zero" frequency IF to obtain the Doppler difference frequencies. The Gunn diode 58 is frequency modulated with a 125 KHZ wave form and deviated 62 KHZ peak to peak (P-P) and also 983 KHZ P-P. This modulation deviation produces a range of 5000 feet for a 180 degree phase shift for the long range channel and 250 feet for the short range channel and a Doppler frequency of 31.4 HZ/MPH. The Schottky diode receiver 64 in the receiver portion of the transceiver is biased to 100 millivolts D.C. by adjusting a screw into the waveguide (not shown). The output signal of the receiver 64 is fed through a co-axial cable to a low noise preamplifier (signal point "A"). The low noise pre-amplifier (U8) has a gain of 20 DB and a noise figure of 1.5 DB at its output "A4".

The system clock (U1 and Q4) generates a 250 KHZ square-wave 10 volt P-P signal at its output M3. Signal M3 is fed to the low pass filters (U9, 10, 11 and 12) whose "corner frequency" is determined by dividing the clock frequency by fifty (5 KHZ). Signal M3 is also fed to the gate generator (U2) which produces the modulating pulse 4 micro seconds (us) wide at M4. The "long" range gate at M4B and also the "short" range gate at M4A are 8 us wide. The dual diplex driver (U3) takes the modulating pulse and both range gates and provides the proper modulation waveforms M6 and M6A to the gunn diode modulator (Q5 and 6). The output of the long range modulator (Q6) is adjusted for 5000 feet range and the short range modulator (Q5) for 250 feet. The channel "2" (U4) control takes the modulating pulse, both range gates, and the B16 threshold signal and produces the proper de-modulation waveforms for both "CH. 2's" (long and short range) to the dual diplex de-modulator (U7) M9 and M10.

Signals M9 and M10 are also fed to the inverter (U5) and at its outputs M11 and M12 are supplied to the channel "1" control (U6) along with the threshold signal B16 and both range gate signals (M4A and M4B). These signals are then used to produce the proper demodulation waveforms M13 and M14 for control of both "CH. 1's" (long and short range) to the dual diplex de-modulator (U7), along with the input signal A4. The de-modulator (U7) then separates the input signal A4 into four channels (long and short range CH. 1 and CH. 2) signals A5, A5A, A5B and A5C are then filtered by the low pass filters (U9, U10, U11 and U12) to remove the diplex frequency since that is no longer required.

The log amp circuit consists of a low pass filter between signal A4 and B1 with a −6 DB point of 20 KHZ and roll-off of 24 DB/octave, a DC amplifier 74 (B11 to B12), a threshold detector 76 (B13 to B16), and a log-to-linear converter 70 (Q7 to Q11) which is a symmetrical signal limiter amplifier). This amplifier is adjusted for proper operation by setting (R43) for equal voltages across emitter to collector, as compared with the emitter and collector resistors. The log-to-linear conversion is accomplished by summing the base current of each stage in a common sum line B8. The gain of each stage is approximately 20 DB (80 DB total) and as each stage reaches limiting there is no further increase in its base current into the sum line B8. The low pass filter on the sum line (C42, R45, and R46) reduces the ripple due to Doppler signal feed-through at 6 DB/ocatave above 70 HZ.

The output level at B12 is adjusted to zero V DC with R49 for a no signal input at "A". The accuracy of the log amp from 10 uv to 100 mv input "A" is +−5%. The DC amplifier (U21, A, B) has 40 DB gain, and its output will change 1 volt with each 20 DB change in signal strength. The threshold detector (Q12 and Q13) will change state at B16 from −8 V DC to +8 V DC when +0.5 V DC is reached at B12, which would occur when there is a 30 uv or greater signal at the input A. The output of the threshold detector B16 is divided and applied to both the logic sensor and the threshold switches. The logic sensor (U22 and U23) generates two timing functions, a hold signal B19 which changes state from +8 V DC to −8 V DC only when the signal drops below the threshold at B12 (for up to a maximum of 500 milliseconds), and a loss of signal output B19A when the input B12 stays below the threshold (no signal) for more than 30 seconds it will then supply 15 mA of current into a light emitting diode (I5) 82.

The compressor amps (U13, 14, 15 and 16) from A7, A, B and C to A9, A, B and C are used to control the 80 DB dynamic range of the input-signal to output signal change of 40 DB. This improves the speed and accuracy of processing Doppler and range information under all signal dynamic conditions. Each has a variable gain range of −6 DB to +45 DB and an attack time of 400 microseconds and a decay time of 40 milliseconds. The overall frequency response of the amplifier is 10 Hz to 15 KHZ +1 to −3 DB. Each amplifier has a zero adjust R71, R99, R129, and R154 to set their outputs A9, A, B and C respectively to zero V DC, for greatest dynamic range. The gain of each stage is controlled by U13 and U15 (A or B) which acts as a variable feedback resistor connected across U14 or U15. A one meg ohm resistor is also used as a feedback resistor to limit the maximum gain of each stage to 45 DB.

The amps (U17 and 19) from A9, A, B ad C to A14, A, B and C provide the additional gain required to process range and Doppler data, for signals as low as 30 uv at signal point "A" (30 DB gain).

The squaring amps (U18 and 20) from A14, A, B and C to A17, A, B and C prduce precision "square-waves" from the input waveform (sine, triangle and etc.) and have a 40 DB dynamic range. The negative "hysterisis" point for each squaring amp is adjusted by R79, 107, 138 and 163 respectively. At this point the short range (A17 and A17A), the Doppler output (A17D) and the long range (A17B and A17C) are split into separate channels for different processing.

The directional Doppler detector (U24, U25 and Q15) consists of a timing pulse generator (U24), a channel comparaor (U25) and a disable switch (Q15) which is used to determine which direction a "target" is moving (either opening or closing range). The signal inputs are A17 and A17A, and the output E4 (will be discussed later).

The long range channel (A17B and A17C) consists of 180° phase detector (U26) and its output KA is combined with the inverted threshold signal B16 at the input of the slope inverter (Q16).

The output of the slope inverter (Q16) KA2 is fed to the long range integrator (U27A) it produces a voltage proportional to range (5 v DC for zero range and 0 v DC for 5000 feet) at its output KA4. The long range comparator (U27B) and range disable switch (Q17) is set to activate for any range reading of 250 feet or greater (4.75 v DC) by R178. Range disable output K4 will be discussed later.

The next blocks consist of the short range phase detector 91, slope inverter 90, range hold switch 84, range integrator, DC offset amplifier, range DC amp, and the range meter output. First the input signals A17 and A17A are fed to the range phase detector (U32). The phase detector 91 is comprised of four nand gates that produce a 0 to 180 degree phase shift. It has maximum output (+5 V DC) at 180 degree phase shift between the input signals A17 and A17A. This corresponds to a range of 250 feet.

The slope inverter 90 (Q27) takes the range input A19 and inverts it, to have mximum output (+5 V DC) at zero range. Also fed to A19 is a threshold signal B21, which insures that point K is always zero V DC (maximum range) with no usable signal at input point A.

From the output of the inverter at K, the signal is fed through R208 to the range hold switch 84 and to C145. The purpose of the range hold switch (U33A) is, as its name implies, to hold the last range information voltage for up to 500 milliseconds when there is a momentary signal loss. The Doppler hold switch, (U33B) also holds the last Doppler speed information when there is momentary signal loss. The hold switches U33A and U33B are controlled by the threshold detector B19 (hold signal).

The signal voltage at the output of range hold switch K1 is then filtered by the range integrator (U34A) which has a −6 DB corner frequency of 10 hertz and a 12 DB/octane roll off at K4. The long range disable input is also fed in at circuit point K4 (operation discussed previously).

The DC offset amp (U34B) is adjusted by R214 for zero VDC @220 feet of range at its output K5.

The range DC amp (U37A) is adjusted by R220 for +4 V DC at K7 for zero range. The output K7 is fed to the range meter (I8), and to the algorithm sum point V where it will be summed with the Doppler closing rate D5, vehicle speed S6, and the output of the driving monitor 196. The range channel accuracy is + or −2% of full scale.

The Doppler channel signal A17D consists of a frequency to analog converter U35A, a Doppler hold switch U33B, Doppler integrator U34C, a DC amp U37B and a Doppler meter output D5. The input signal A17D to the frequency to analog convertor (U35A) produces a 150 microsecond wide pulse at point D, for every leading edge of the input square wave, and then integrates it into a DC voltage proportional to the input frequency at point D3.

The Doppler hold switch 86 (U33B) operates in the same manner as the range hold switch except that it is holding the last Doppler voltage present at D1.

The Doppler integrator (U34C) filters the signal voltage D1, and has a −6 DB corner frequency of 10 hertz and a 12 DB/octave roll off at D3. The output at D3 is fed to the Doppler DC amp.

The output level of the DC amp (U37B) is set with R232 to provide the necessary voltage at D5 required for the Doppler portion of the sum algorithm at point V. The output of the DC amp D5 is also fed to the Doppler meter I9. Full scale reading of the Doppler channel is 210 mph, with an accuracy of + or −2%.

The next channel is vehicle speed which consists of the frequency to analog convertor 156 (U35B), speed integrator 160 (U35D), a DC amp 162 (U37C), and an output to the vehicle speed meter. The input S, vehicle speed, comes from the output of the car cruise control circuit. The frequency to analog convertor (U35B) will handle any input voltage waveform S and convert it to zero to +5 Volt level at S1. The output of the convertor S2 will produce a 10 millisecond wide pulse 5 volts in amplitude, for every leading edge of the speed waveform voltage.

The speed integrator 160 (U34D) filters the signal voltage S2 and has a −6 DB corner frequency of 2 hertz with a 12 DB/octave roll off at its output S4. The output is then fed to the DC amp (U37D) and driving monitor input S4.

The output level of the DC amp (U37C) is set with R252 to provide the necessary voltage at S6 for the vehicle speed portion of the sum algorithm, at point V. The output of the DC amp S6 is also fed to the vehicle speed meter 110. The full scale accuracy of the vehicle speed channel is dependent on the speed transducer and tire wear, as well as the circuit accuracy. The speed circuit accuracy is + or −2% of full scale reading.

The sum point V (sum algorithm equivalent to danger level) is buffered by the sum amp (U37D) into the sum monitor test point V1. NOTE: (The air bag deployment is a separate channel and is not degraded by either the driving monitor sum input or by J1). At point V2 the sum voltage can be lowered by J1 (a "driver" option switch, Heavy Traffic) which can be used in heavy traffic to degrade the warning and danger audio tone trip levels under close traffic conditions. The input sensor J1 affects only the caution and warning tones settings and not the brake control or its audio tone.

From point V2 the sum voltage is fed to the warning comparator (U40A) and R319 adjusts the input voltage trip point (all sensors off). The output of the comparator W1 is split three ways. The first route is to the warning LED (I1), then to an optional cruise control disable switch and the third route is to activate the power switch (Q28 and Q29) which supplies +8 VDC to the audio tone generator (U41).

The directional Doppler input E4 is fed to the warning comparator (U40A) through CR23, the caution comparator (U40B) through CR24 and the brake comparator (U40C) through CR25. Signal E4 is used to disable the comparators whenever the "target" is moving away from the antenna.

The audio tone generator produces a frequency of 400 HZ when it is first turned on. The voltage at point T controls the frequency of the tone, and when the caution level switch (Q30) is turned on the tone will increase to 1000 HZ and when the braking switch (Q31) is turned on the tone will be 2.1 KHZ, and when the air bag switch (Q34) is turned on the tone will be 3 KHZ.

The selected audio tone at point T1 is fed to a volume control R344 and then to the audio power amplifier (U42) where it is amplified up to 500 milliwatts. Then the signal is coupled to point T3, where it will be connected to an 8 ohm speaker. Also from point V2 the sum voltage is fed to the caution comparator (U40B), and the trip point for the input is set by R322. The output X1 of this comparator is divided and fed to the caution LED I12 and it is also fed to the caution tone switch (Q30), as previously discussed.

From point V1 the sum voltage is fed to the braking comparator (U40C) and the trip point for its input is set by R326. The output of this comparator Y1 is split four ways. The first route is to the brake LED I3, then to the brake power switch (Q32), which can handle 4 amps of DC current. The third route from Y1 is to the brake switch (Q31) that changes the tone as previously discussed. The fourth is to the "DM" brake input Y1.

The air bag channel is unique in that it has high speed Doppler and Range active integrators. The reason for this is that the normal integrators employed in the main Doppler and range channels have a 100 milli-second delay as compared to ten milliseconds (ten times faster) delay for the high speed integrators. This is important when the time factor of the air bag deployment is initiated at 200 milliseconds before impending collision at a closing rate of 35 mph and higher. The high speed integrators were not used in the main Doppler and range channels because at speeds below 10 mph, too much ripple is present for good accurate processing. The air bag Doppler channel consists of a Doppler integrator, a DC amp, a Doppler amp, and a Doppler comparator. The Doppler integrator (U36A) receives its input from point D, the output of U35A which is composed of 150 micro-second wide pulses. The integrator has a time constant of 10 milli-seconds and has a voltage proportional to the Doppler rate at its output G2. The voltage level at the output of the DC amp (U36B) is adjusted by R265 to a value of +4 volts G4 at a Doppler rate equivalent to 200 mph. Then R280 is adjusted at a 35 mph input from A17D for an output trip point at G7B in the Doppler comparator (U38C). The resulting voltage step of 0.75 VDC at G8B is then fed to the air bag sum point Z. The Doppler amp (U38A) receives an input G5A from R280 and its output G6A is routed to the air bag sum point Z. The air bag range channel consists of a range integrator 85, a DC offset amp 87 and a DC amp 126. The range integrator (U36C) receives its input from the range slope inverter 90 at point K and its output H2 is voltage proportional to range (0 to 250 feet). The voltage level, signal H3, is then fed to the DC offset amp (U36D), whose output H4 is adjusted the same as the amp (U34B) in the main range channel, except that R272 is adjusted for 0 VDC @ 200 feet of range. The range DC amp (U38D) is adjusted by R277 for an output H6 of 4 VDC @ zero-range. The output H6 is then fed to sum point Z. The operation of the air-bag sum amp 132 is as follows: Point Z has three inputs; a step voltage at speeds 35 mph or greater closing rate; a Doppler closing rate input; and a range input. From these inputs it is determined that when the air bag comparator (U40D) output Z3 is adjusted with R295 to trip for the condition of 35 mph (or higher) closing rates and a range of 10 feet minimum (equal to 200 milliseconds from impending collision), so that no air bag deployment will occur below 35 mph. Above 35 mph the air bag will start deployment at 200 milliseconds before impending collision up to 210 mph closing rates. From point Z3 the signal is split three ways; the first is routed to the air bag LED I4, and then to the air bag power switch 138 (Q33) that can switch 4 amps of DC current and finally to the air bag tone switch (Q34) as discussed previously. The last portion of air bag channel consists of a signal strength DC amp 88 (U39A), a DC power-up disable 202 (Q35), and a disable switch 186 (Q36) and a power down detector (U39C). The signal strength input B10 is used in the air bag channel to prevent false-triggering or air bag deployment for targets smaller than a motorcycle (such as flying birds, blowing debris, balls, etc.). These small targets usually would not injure the vehicles' passengers; nor would the air bag help in these situations.

The S.S. DC amp 88 (U39A) is a high-speed version of U21B and its output F1 drives the S.S. Comp. 202 (U39B). The S.S. Comp. is adjusted with R304. The signal voltage at F3 ranges from 6.5 VDC with small or no targets to zero VDC with large ones and is fed to the disable switch (Q36) which controls the air bag power switch 138 (Q33) at point Z4. When the radar is first turned on the DC power-up disable 190 (Q35) will keep point Z4 shorted-out for one-half second until the radar circuitry is stabilized. When the radar is turned off or there is a large negative going transient on the vehicles' 12 volt system; point P monitors the DC drops below 10.5 VDC, the output P3 of the DC power-down detector (U39C) will go positive (6.5 VDC) and short-out point Z4 through the disable switch 198 (Q36).

The driving monitor circuits of FIGS. 7A-7D are as the name implies. The circuits monitor degree and rate of turn, vehicle speeds, braking, rolling and acceleration. Any operations that a driver initiates can be an input, weighted as required in magnitude and duration. If a vehicle is going straight at 55 mph in a normal safe manner, the driving monitor (DM) output N2 would be zero. The driving monitor circuit has two radar inputs. They are the vehicle speed input S4 and the radar brake input Y1. The driving monitor circuit also has four inputs from the vehicle. They are the steering angle DD, the vacuum switch CC, the brake switch BB, and the pendulum switch AA. The DM sum output N2 goes into point V, the main sum point. The purpose of the driving-monitor circuit is to take into account the vehicle's attitude, the driving responses and the radar outputs S4 and Y1. Then a determination is made whether or not to modify the sum main voltage at point V. Under controlled or less dangerous conditions the sum voltage V will be lowered (driver braking, turning, or evasive-maneuver). This allows for a decreased safety zone, when it's determined that the driver has the vehicle under control. There is a condition when the safety zone is increased momentarily, and that is when the vacuum CC goes to maximum and there is no braking BB or steering DD input for two seconds. This will cause the radar to look-ahead for any impending dangers that the driver may not be fully aware of.

The following paragraphs will explain the operation of the drving-monitor circuits. The first being the low speed steering circuit (U48A, U48B, U49C and Q42). For vehicle speeds less than 30 mph the circuit will cause a decrease in the safety zone of 6 to 30 feet of range, for a vehicle tire steering angle change of from 1° to 30°. When a vehicle is turning, it is departing from a straight course, therefore its "safe-zone" would now be longer than necessary. This change is in six discrete steps as the angle increases from zero degrees (straight ahead). The circuit is enabled (below 30 mph) by the low-speed enable switch (Q42), signal FF4A, to be hereinafter described. The input steering angle voltage DD is connected to terminal 13 of the steering angle inverter (U48D) producing a negative voltage DD2, then to the low speed steering angle switch (U49C) which is controlled by the low speed enable switch (Q42) herein-before described. The output level at terminal 1 of U49C, DD3, is adjusted by R368, to produce signal DD4 which is fed through R371 to the DM sum line N. The high speed turing circuit (U48A, U48B, U49A and U49B) will produce a variable safety zone signal by subtracting the vehicle speed voltage signal from the main sum algorithm V (refer to drawing of FIG. 12) in turns with vehicle speeds greater than 30 mph. The vehicle speed input S4 is fed into the high speed comparator (U48A), as signal FF1A, and its output signal FF2A is adjusted by R355 to trip at a vehicle speed equal to 30 mph. This output FF2A controls the low speed enable switch (Q42) discussed above and the high speed enable switch (U49A). The output signal FF3 from speed inverter (U48B) is fed into the high speed enable switch (U49A) terminal 1 as signal FF3 described above. The inverted vehicle speed voltage FF4 is then fed to the turning enable switch (U49B) which is turned on by the steering angle comparator (U23D) signal DD1A whenever the steering input DD senses a turn. The output at terminal 11 of the turning enable switch (U49B), FF5, is also fed to the DM sum line N through R369.

The look-ahead caution logic (U51) has three inputs; the vacuum switch signal CC1, the inverted brake input (U50) BB2, and the inverted steering (U50) DD3A. The purpose of the look-ahead caution logic is to produce a positive pulse at its output signal EE1 (100 milliseconds in duration) when the vaccum goes to maximumm level CC and stays there for at least two seconds, when there is no input from either the inverted brake BB2 or the inverted steering DD3A. The output EE1 is adjusted by R392 to produce a increase in the safety zone of 30 feet.

The driver under control logic (¼ of U50), will produce an output GG, when both the brake BB and the vacuum switch CC are activated (which indicates the driver is responding to a danger before the radar does). The output is adjusted by R390, GG2, to produce a decrease in the safety zone of 15 feet.

The next block is the slow speed modifier (U47C and U47D) which is used to de-grade the warning and brake levels at vehicle speeds (S4) of 3 MPH or less. The inputs used are S4 to the slow speed comparator (U47C) and either or both vacuum (CC) and brake (BB) signals to the AND gate (U47D). The negative output HH4 is adjusted with R380 to produce −0.5 vDC signal at HH5.

The sum line N has six inputs FF5, DD4, EE2, HH5, GG2 and AA4. The sum line N also has an input from the DM sum disable switch (Q43), which will short out all the inputs when the radar activates the vehicle's brakes Y1.

The DM sum amp (U47C) is adjusted by R396 with only the high speed turning circuit signal FF5 activated, to an equal negative voltage at its output N2 as compared with S6 (output of the vehicle speed DC amp (U17C) output). The output N2 is then fed to the main sum point V.

The DC power supply consists of a DC-DC converter (U54), a −8 VDC regulator (U55), A +8 VDC regulator (U52), and a +5 VDC regulator (U53). The front end assembly has a separate +10 VDC regulator for supplying lower noise voltage to the pre-amp and modulator circuits. The above regulators supply power to all the circuits of the radar.

The antenna 48 is isolation mounted to the vehicle and is rotated by the steering linkage through +25 degrees so the radar can see in the directions of vehicle travel. When a vehicle is turning it is traveling the circumference of a circle. In turns the antenna beam is aimed ahead at a point further around the circle. The antenna steering angle is approximately one and one half times the tire angle.

Figure 11:
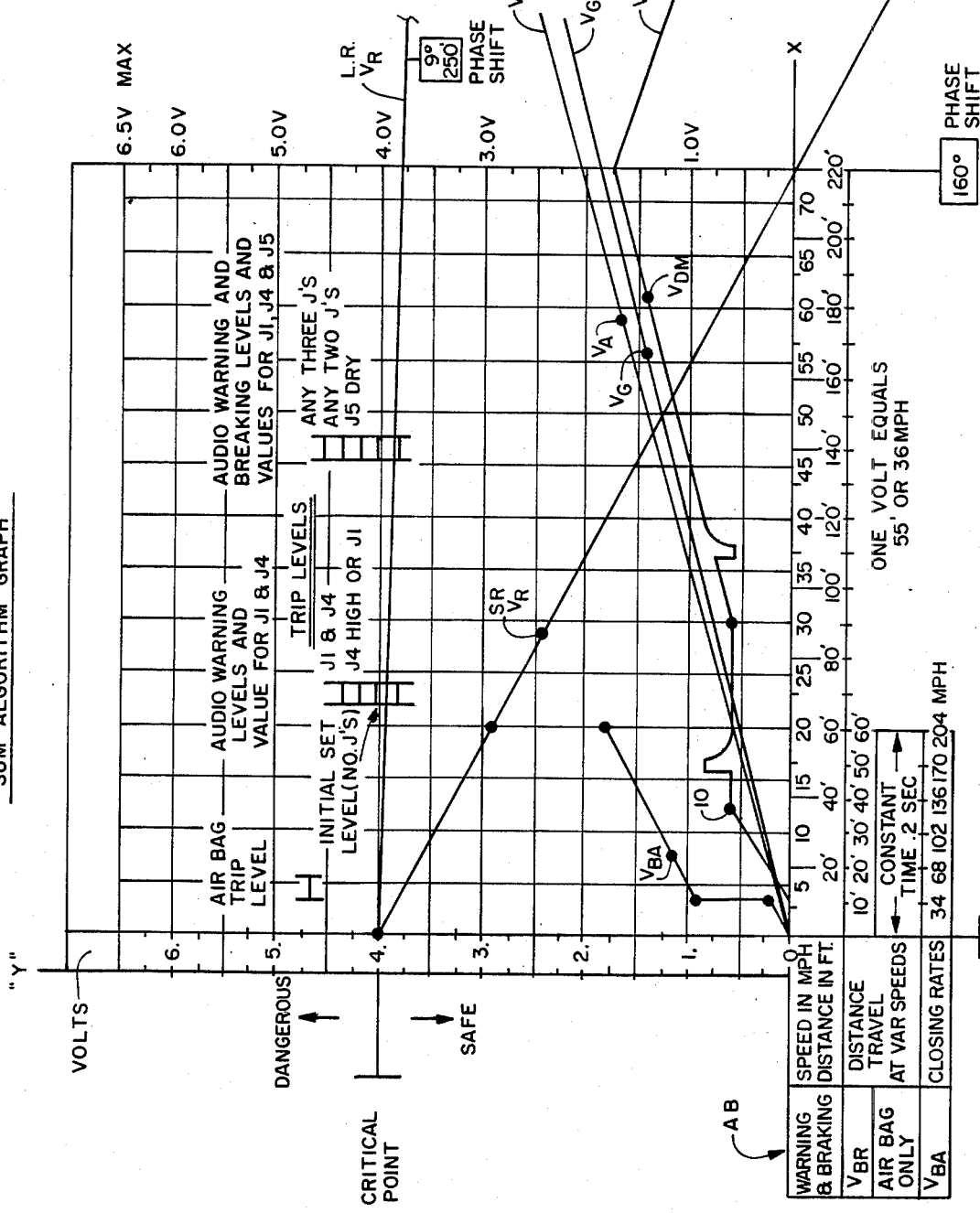
FIG. 11 is a graphic showing of the operation of the invention under varying conditions and relationships.

Referring now to the graph of FIG. 11. The vertical or "Y" axis is represented by voltage in the range of 0 volts at the bottom to 6.5 volts at the top. The horizontal or "X" axis represents speed in mph and distance from an object in feet. Two different scales are used along the "X" axis. One scale represents warning and vehicle braking and the other represents air bag deployment. The radar operational parameters fall within the bounds of the graphs of FIGS. 11 and 12. Information outside of the graph parameter are not considered important to the radar operation and are accordingly disregarded.

The auto radar of the invention operates on a "safe zone" concept which is a selected analytical voltage level algorithm that provides a typical safe driving distance margin for the vehicle to stop before impact. That is, the distance needed to stop a car in controllable situation. The algorithm is the sum total of five or more voltage inputs to the radar system that can make driving safer as will be shown below. The primary algorithm is for the warning and braking functions. The air bag algorithm is a special high speed algorithm and it will be described last. The algorithm's main inputs are distance, speeds, turning rates, driving patterns and time. These inputs are converted to voltage levels for further processing and the desired results provide adequate stopping distances or margins and time before possible impact so the driver can avoid the collision.

| | | | |
|---|---|---|---|
| A. | Sum Voltage (totals) | Vs | Vs = Vr + Va + Vg − Vdm. A safe level is set below 4V and a dangerous level above 4V. |
| B. | Range Voltage (distance) | Vr | has values from zero volts at 220′ and up to 4 volts at zero range. |
| C. | Doppler Voltage (closing rate) | Va | has values from zero volts up to about 2.1 volts at 73 mph. |
| D. | Car Speed Voltage (gnd sp.) | Vg | approximately the same value range as Va above |
| E. | Driving Monitor Inputs | | |
| 1 | Turning Angle (DD) | VDM | is zero volts when going straight and ranges from +.5 volts to −2.5 volts when turning |
| 2 | Turning Rate (AA) | | |
| 3 | Vehicle Speed (S4) | | |
| 4 | Vehicle Acceleration (CC) | | |
| 5 | Vehicle Braking (BB) | | |
| 6 | Radar Braking (Y1) | | |

Doppler voltage can be either a closing or opening rate. Doppler opening rates are not considered because the warning, caution, and brake comparators (U40) are disabled by the directional Doppler signal E4.

FIG. 11 is a graph presentation of the system operation. In the FIG. 11 graph, the "safe zone" ends at Vs=4 volts and the danger zone begins at Vs=4 volts. Vr can be from 4 volts at zero range to 0 volts at 220 feet. Va can be from 0 volts at zero mph and up to 2.1 volts at 73 mph. Vg is the ground speed the car is traveling and it can range from 0 volts up to 1.9 volts at 73 mph.

When using the graph of FIG. 11 keep in mind that one volt equals 55 feet or 36 mph. When using the graph to work a problem, the answer will be in volts and must be transposed from volts to feet or mph to get the margin or safe zone before impact. I use the relationship where Distance (D) equals Rate (R), times Time (T) and the units of distance, speed or time can be transposed and vice versa. D=R×T and Feet=Speed×Seconds. The various units are normalized electronically and converted into volts. The average time (in seconds) before impact is assumed to be about one second at slow speeds, about two seconds at moderate speeds and three or more seconds at high speeds. If the vehicle operator is alerted seconds before impact and has more time or stopping distance to control the vehicle it is believed that an accident could be avoided or its consequences greatly reduced in all normal driving situations.

In the air bag portion AB of the showing of FIG. 11, VBs=VR+VBA=voltage Bag Sum. The air bag activation signal is limited at 4.65 V. VBA is the high speed approaching rate voltage used to activate the air bag activation signal 0.2 seconds prior to impact. The air bag algorithm sum voltage (Vbs) operates on the same principal as the safe zone algorithm. Since the air bag's demanding requirements are quite different and must be deployed at high speeds, short ranges (10 feet–60 feet) and high closing rates (35–204 mph) the algorithm is tailored to handle these situations. A special closing rate voltage curve (Vba) is used with the range curve (Vr) in order to determine the air-bag sum voltage which activates the air bag. The Vba voltage value can be 0 to 1.9 V and Vr values used for air-bag deployment are normally between 3 and 4 volts. FIGS. 13 and 14 depict FIG. 12, saw-tooth slopes and lines that represent the primary Vr and ambiguous range returns V1, 2, etc. Two Vr range slopes are used. The primary short range (SR) Vr is used from 0′ to 250′ and the secondary long range (LR) VR is used to disarm the radar from about 250′ to 9750′. Now note that we use the first SR Vr range voltage slope from 0 feet, which is 4 V and 250 feet, which would be 0 V. The other ambiguous range slopes will cause more problems of false range return when the radar actually looks at large targets beyond 250′. The primary SR range slope is used for collision warning, braking and air-bag deployment and the second LR slope is used to confirm the closeness (with 250′) of the target and to prevent the SR ambiguous range return from giving us fake returns from 250′ to 9750′. The second, LR Vr voltage slope is 4 V at 0 feet and 3.8 volts at 250 feet and continuously goes down to 0 V at 5000 feet. In operation, when a target is seen, the SR and LR channels output range accordingly but the SR return will only register if the LR return indicates it is within 250′ (3.8 V or greater). Otherwise, the LR channel indicates the target is not to be considered. The first LR ambiguous return occurs between 9,750 feet and 10,250 feet and this is too small to register. The car's speed Vg is not used in the bag sum voltage Vbs. The voltage generated by Vba starts at zero and rises to approximately 0.2 V at 35 mph (point 6) and then the Vba curves step up (now armed) to approximately 0.95 V (point 7) and will continue to rise as speed increases. When the distance to impact is a about 10 feet (that is when Vgr increases to 3.70 V) the air bag will deploy as Vbs reaches the trip level set at 4.65 V. Vbs=Vr+Vba=4.65 V. Note that Vr+Vba would never reach the bag trip level if the Vba curve did not step up 0.75 V when it become armed at 35 mph.

The audio warning and braking algorithm is derived for a car going straight ahead but when the car turns, the safety zone is too long and must be shortened appropriately. If a car turns sharply, a 20 foot zone would be ample and in moderate turns and at higher speeds a 40 feet or 50 feet zone would be adequate. A car makes sharp turns at lower speeds and gradual turns at higher speeds. For this reason, the driving monitor (DM) normally negative voltage input was added to the algorithm graph. The effect of this negative voltage is to shorten or otherwise adjust the safe zone in turn at various speeds and conditions. The radar antenna also physically turns 25° in both directions to enable the radar to see ahead in turns.

The air bag is set to deploy 0.2 sec before impact at all approaching speeds between 35 to 204 mph. This allows time for the bag to fully inflate before impact. The total time it takes the radar system of the invention to activate the air bag is 0.01 seconds (1 foot @ 68 mph) from the time the target first appears.

The theory of operation of the radar system of the invention is explained in the following examples utilizing the graph of FIG. 11.

EXAMPLE 1

Let Vs=4 v (border line where danger starts and the safety margin is becoming too short) and Va=0.85 v (30 mph) and Vg=1.5 v (56 mph) and solve for Vr (i.e., determine how much distance you should maintain in this situation to keep a safe margin).

| Formula is | Vs = Vr + Va + Vg − Vdm | let Vdm = 0 |
|---|---|---|
| now | 4v = Vr + .85 + 1.5 − 0 | no turns |
| and | Vr = 4 − .85 − 1.5 = 4 − 2.35 | |
| so | Vr = 1.65v or 132 feet | |

The solution implies that when the vehicle is approaching an object at 30 mph and the vehicle is going 56 mph, the vehicle should be 132 feet away to have an adequate safety margin. This is a highway situation where the vehicle is traveling straight ahead at 56 mph, the car in front is going only 26 mph so the vehicle is approaching it at 30 mph and the 132 feet distance is the vehicle safety margin.

EXAMPLE 2

Let Vs=4 v and Va=0.1 v (3.6 mph) and Vg−0.1 v (3.6 mph) and solve for Vr. This situation will occur when a vehicle is moving toward a building at 3.6 mph. The problem is to stop just before the vehicle impacts the building. How far away is the vehicle when the radar system applies braking?

| Vs = 4v Va = .1v Vg = .1v | and Vr is the safe distance |
|---|---|
| Vs = Vr + Va + Vg − Vdm | Vdm = 0 |
| again | Vs = Vr + Va + Vg + 0 |
| Vr = Vs − Va − Vg = 4 − .1 − .1 = 3.8 or 3.8v | | so when Vr=3.8 v and the vehicle is about 11 feet from the building, the radar system of the invention warns the vehicle operator. This warning should provide sufficient time to allow the vehicle to come to a full stop when going 3.6 mph.

EXAMPLE 3

Let the vehicle speed and closing rate be 60 mph which means Va=1.75 v and Vg=1.6 as read from the algorithm graph. Again Vs=4 v because that's where the danger is assumed to start.

$Vs = Vr + Va + Vg - Vdm$

Vs=4
Vr=unknown
Va=1.75
Vg=1.6
Vdm=0
now that is $Vs = Vr + Va + Vg$ or $Vr = Vs - Va - Vg$ and $Vr = 4 - 1.75 - 1.6 = 0.65.$ So when Vr=0.65 v, the audio alarm will sound at 185 feet.

This means that the vehicle operator will have 185 feet in which to stop the vehicle while traveling at 60 mph toward the building. This may not be all the stopping distance required but would be sufficient time to slow the vehicle down to about 15 mph which would be a 16 times improvement. The vehicle operator is now alerted and is in control of the vehicle for stopping or varying the path of travel.

EXAMPLE 4

Let a vehicle approach another vehicle on the highway and then follow it while traveling at 55 mph.

$Vg = 55$ mph or (1.45 v)

$Va = 5$ mph or (0.15 v)

which indicates that the followed vehicle is going a little slower or 50 mph. since $Vs = Vr + Va + Vg - Vdm$ (let $Vdm = 0$)

then $Vr = Vs - Va - Vg = 4 - 0.15 - 1.45 = 2.4$ v therefore 2.4 v equals 88 feet to the vehicle being approached when the closing vehicle is going 55 mph.

Closer than 88 feet, the first audio tone would sound at about 82 feet, the second tone at about 75 feet, the third tone and one-third braking at around 68 feet. However the braking would maintain the distance between vehicles at about 71 feet and if the operator heeded the first tone he would have stayed back 88 feet or more.

EXAMPLE 5

Now examine a situation that suddenly happens when a vehicle is traveling at 45 mph and a second vehicle suddenly pulls out in front of the first vehicle from a cross street and is only 70 feet ahead of the first vehicle.

$Vs = Vr + Va + Vg - Vdm$ let Vdm=0 and let Vs=4 be the margin desirable $Vg = 45$ mph = 1.2 v $Va = 45$ mph = 1.3 v and Vr=70 feet=2.75 now $Vs = 1.2 + 1.3 + 2.75 + 0 = 5.25$ since 5.25 is 1.25 more than 4.0, the first vehicle needs about 68 feet more than the 70 feet it already has to have ample stopping margin.

The radar sees and weights electronically the degree of danger and it's designed to react accordingly as designed.

In Example 5, the first vehicle probably can't fully stop but its speed can be reduced substantially. The operator may be able to steer around the second vehicle, especially when the radar gives an appropriate audio warning, applies braking.

In the above situation the radar warning system is initially designed to warn the operator in less than 1 second or at 65 feet from impact and then start one-third braking to slow the first vehicle down. If the speed is not reduced to less than 35 mph, the air bag would start to deploy at 10 feet before impact. In this situation the vehicle operator could probably reduce the vehicle speed to less than 35 mph with only ⅓ radar braking and perhaps to around 20 mph with operator brake application. The advantage of partial radar braking is that it's automatic and initially quicker than operator braking and that partial braking still leaves the operator in braking control. When the radar activates the brake and the operator brakes too, the system lets the operator do 100% of the braking as provided by the Driver Monitor Input.

The Air Bag Algorithm

The air bag (AB) portion of the algorithm works the same as, and is similar to, the main warning and braking algorithm except the circuits are faster and the algorithm is weighted differently. The AB circuits output is ten times faster and the closing rate curve (Vba points 2 to 6 to 7 to 8) is weighted twice the Va curve. The Vba curve doesn't arm until the approaching speed is 35 mph or greater. When 35 mph is reached the Vba curve steps up from point 6 to point 7 (now armed) and continues to rise up to point 8 if approaching speeds increase. The AB circuit deployment is set (adjusted) for 0.2 seconds before collision at all closing rates between 35 and 204 mph. When working AB problems, curves Vba and Vr indicate Vbs. The trip level for the AB will be 4.65 volts before it will activate.

EXAMPLE 6

Two vehicles are going toward each other at a closing rate of 110 mph. Car A is going 60 mph and Car B is going 50 mph, both on the same path of travel and only 100 feet apart.

When $Vbs = 4.65v$ the air bag will deploy
and $Vba = 110$ mph $= 1.25v$
so what value of $Vr$ will deploy the air bag
$Vbs = Vba + Vr$ or $Vr = Vbs - Vba = 4.65 - 1.25 = 3.4v$
When $Vr = 3.4$ or about 32 feet away the air bag will activate If either car veered out of the pathway before 32 feet the air bag would not deploy. Assume that the vehicle that veered away travels toward a parked vehicle still going 50 mph then $Vba = 1.0$ volts.

|    | $Vbs = Vba + Vr$ |
|----|----|
| or | $Vr = Vba - Vba = 4.65 - 1.0 = 3.65v$ |
| or | 15' |
| So | the air bag deploys 15' or .2 seconds before impact with the parked vehicle |

The Driving Monitor

The driving monitor (DM) circuit monitors the vehicle's operation as it is driven and feeds this information back into the algorithm to modify the safety zone. If the vehicle operator brakes or accelerates the car, makes slow, fast, gradual or sharp turns at various speeds, then these actions change the radar primary algorithm output sum voltage thereby changing the safety zone required from that already established for straight driving. The DM voltage curve normally represents a negative voltage that is added to the positive voltage sum Vs. The DM curve is somewhat complex due to the algebraic sum of the nine input factors and how they are weighted by the primary components of Vdm due to the degree of turn the vehicle operator makes at various speeds. When the vehicle is going slow turns may be very sharp and turns are usually mild at high speed.

As the vehicle goes slow and turns sharp a normal straight 30 feet zone would be reduced to about 15 feet in a turn. The safety zone is never brought back to zero but as the degree of turn increases the zone is brought back leaving enough zone immediately ahead to protect. In turns, less distance is needed straight ahead. More margin is needed in the direction of travel or turns. To enable the radar to see better in the direction of the turn, the antenna is pivoted up to 25 degrees to look at a point ahead in the path of the turn. As vehicle speed is increased and a mild turn is made, the zone is brought in to about 60'. In a high speed turn the zone may be reduced to only 100' while turning.

Figure 12:
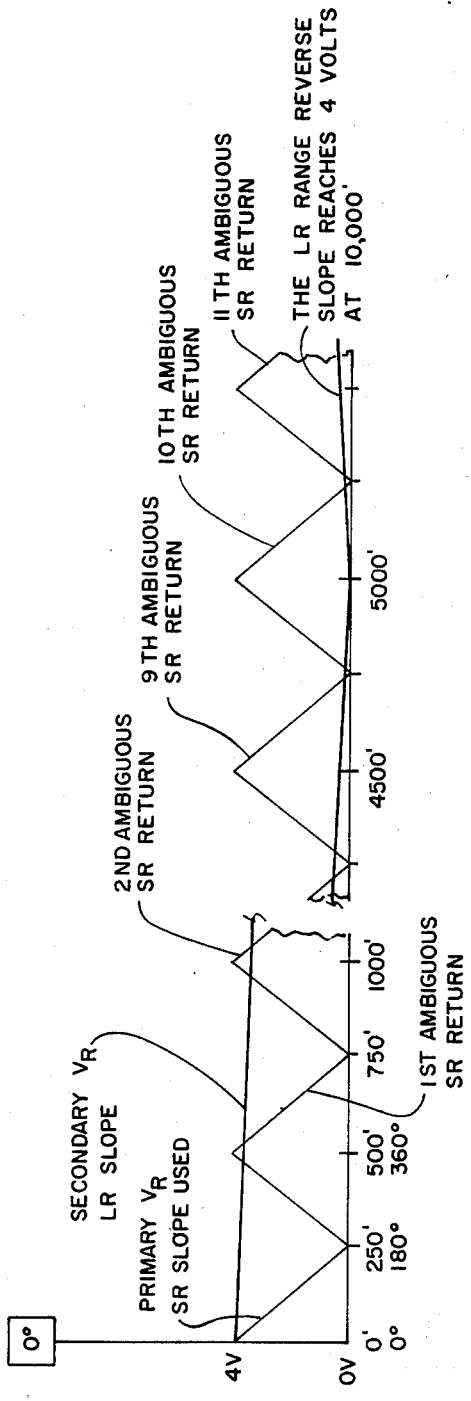
FIG. 12 is a graphic showing of the ambiguous reflected signals rejected by the receiver of the system.

FIG. 12 is a graph presentation of desirable range and rejection of ambiguous (unwanted) signals beyond that range. The 250' primary short range (SR) slope at 180° phase shift point is dependent on the frequency of deviation of the transmitter and can be established between 1000' and 20,000'. The system employs two deviation frequencies, one for 250' and the other for 5000'. The LR channel inhibits the ambiguous return from the SR multiple returns (see the graph). The system uses only a range of from 0 to 250' and it is desirable to eliminate all other ambiguous distance signals further than 250'. The LR channel is used primarily to assure that a target is within 250' or that it is more distant. If the target is at a distance greater than 250', the LR channel is preventing the SR channel from seeing the target. Without the LR channel to inhibit the SR ambiguous or unwanted return signals target range could not be determined properly. The above examples should help in understanding the radar concepts of the invention and how the various factors are interrelated to provide the safety margin needed.

The above described embodiment of this invention is merely descriptive of the principles and is not to be considered limiting. The scope of this invention instead shall be determined from the scope of the following claims including their equivalent:

What is claimed is:

1. An automotive vehicle radar for a vehicle, said vehicle having a body and steerable wheels comprising:
   a transmitter for transmitting an FM CW radar signal of a selected beam width in a selected direction relative to the direction of said steerable wheels;
   a receiver for receiving the transmitted radar signals reflected from objects within said selected direction and producing a plurality of separate and distinct analog voltage level signals therefrom, each signal having a different voltage level range which represent different vehicle to object relationships;
   vehicle means for producing a plurality of separate and distinct analog DC voltage level signals each having a different range of predetermined value levels and representing different relative vehicle conditions;
   summing means for adding together the DC levels of the plurality of separate and distinct analog DC voltage level signals from said receiver and vehicle means and producing a single DC voltage amplitude level signal therefrom equal in amplitude to the total amplitude of the voltage levels thereof;

means for producing a first predetermined analog DC voltage level signal which represents a maximum voltage level of said single DC voltage amplitude level signal for safe vehicle operation;

comparator means for comparing said single DC voltage amplitude level signal with said first predetermined DC voltage level signal and producing a first command signal therefrom only when said single DC voltage amplitude signal exceeds the level of said first predetermined DC voltage level signal.

2. The invention as defined in claim 1 further comprising:

an air bag driver restraint system including an air bag;
a second summing means for adding together the DC levels of a plurality of separate and distinct DC voltage level signals from said receiver and producing a second single DC voltage level signal therefrom equal to the total sum of the voltage levels amplitudes thereof;

means for providing a second predetermined DC voltage level signal representing a voltage level which when exceeded by the level of the voltage from said summing means represents eminent danger to the vehicle and driver; and a second comparator means for comparing said second single DC voltage level signal with said second predetermined DC voltage level signal and producing an air bag deployment system activating signal therefrom for deploying said air bag when said second single DC voltage signal exceeds said second predetermined DC voltage level signal.

3. The invention as defined in claim 1 further comprising means for producing a second predetermined voltage level wherein said comparator means produces a second command signal when said second predetermined voltage signal is exceeded.

4. The invention as defined in claim 3 further comprising means for inhibiting said comparator means from producing said second command signal below a selected vehicle speed.

5. The invention as defined in claim 4 wherein said means for inhibiting said comparator means is further controlled by the rate of closure distance between the vehicle and certain objects after said selected vehicle speed is reached.

6. The invention as defined in claim 1 additionally comprising driver means for modifying the different and distinct DC voltage level signals provided to said summing means from said vehicle means.

7. The invention as defined in claim 1 additionally comprising distance rejection means for limiting the range of receiver produced plurality of separate and distinct DC voltage level signals to a predetermined distance from said vehicle.

8. The invention as defined in claim 1 wherein the receiver produced plurality of separate and distinct DC voltage level signals comprise signals which represent the distance between said vehicle and said certain objects and the rate of change of that distance therebetween.

9. The invention as defined in claim 1 wherein said vehicle means for producing a plurality of separate and distinct DC voltage level signals comprise inputs related to vehicle ground speed, turning angle and centrifugal force related thereto, vehicle braking and vehicle acceleration and deacceleration conditions.

10. The invention as defined in claim 1 wherein one of said plurality of separate and distinct voltage level signals is a vehicle ground speed voltage level signal provided by a vehicle speed sensing circuit.

11. The invention as defined in claim 1 wherein one of said plurality of separate and distanct voltage level signals is a turning angle voltage signal provided by a turning switch means.

12. The invention as defined in claim 1 wherein one of said plurality of separate and distinct voltage level signals is a vehicle turning centrifugal force voltage signal provided by a pendulum activated switch means.

13. The invention as defined in claim 1 wherein one of said plurality of separate and distinct voltage level signals is a vehicle braking voltage level signal provided by the vehicle brake light switch.

14. The invention as defined in claim 1 wherein said first command signal operates the vehicle brakes.

15. The invention as defined in claim 14 wherein said vehicle brakes are applied at approximately 35% of their braking capability.

16. The invention as defined in claim 1 wherein said first command signal operates audio warning means.

17. The invention as defined in claim 16 wherein said audio warning means comprises at leasat three audio devices for producing different frequency output signals under different vehicle danger conditions.

18. The invention as defined in claim 1 wherein said first command signal operates vehicle driver visual warning means.

19. The invention as defined in claim 18, wherein said vehicle operates visual warning means comprise a plurality of three different colored indicator lamps.

20. The invention as defined in claim 1 wherein said predetermined voltage signal is one unit of D.C. voltage and said different and distinct voltage level signals comprise vehicle ground speed voltage level signals in the range of 0 to 0.2286 units relating directly to speeds of 0 to 72.5 miles per hour, approaching rate between said vehicle and a certain object having a voltage level range from 0 to 0.525 units related directly to 0 to 220 feet and a vehicle safe distance from said certain object having voltage level signal ranging from 1 unit to 0 units from 0 to 220 feet.

21. The invention as defined in claim 20 wherein said one unit is equal to 4 volts D.C.

22. The invention as defined in claim 1 wherein means is provided to adjust said predetermined voltage level signal upwardly by the vehicle driver depending on vehicle operating conditions.

23. The invention as defined in claim 1 further comprising an antenna, directional coupler and a load, said directional coupler is interposed between said transmitter, receiver, antenna and load, the transmitted signal from said transmitter is directed into said antenna and said load and the signal received from said antenna is directed into said receiver and said load.

24. The invention as defined in claim 23 wherein approximately 98 percent of said transmitted signal is directed to said load and approximately 2 percent of said transmitted signal is directed to said antenna.

25. The invention as defined in claim 24 wherein substantially all of the signal received by said antennna is directed to said receiver with a small portion directed into said load.

26. The invention as defined in claim 23 wherein the transmitter output signal level is approximately 100 milli watts.

27. The invention as defined in claim 26 wherein approximately ninety-eight milli watts are directed into said load and approximately 2 milli watts are directed into said antenna.

28. The invention as defined in claim 1 wherein said antenna is shock mounted to improve signal-to-noise ratio.

29. The invention as defined in claim 1 further comprising memory means for maintaining the last received plurality of different and distinct voltages from said receiver for a predetermined length of time during loss of received signals by said receiver.

30. The invention as defined in claim 29 wherein said memory means comprises a log amplifier circuit.

31. The invention as defined in claim 1 further comprising means for disregarding signals reflected from certain objects when said objects are increasing their distance from said vehicle.

32. The invention as defined in claim 31 wherein said means for disregarding signals comprises a directional doppler means.

33. The invention as defined in claim 1 further comprising means for disregarding signals reflected from certain objects when said objects are increasing their distance from said vehicle.

34. The invention as defined in claim 33 wherein said means for disregarding signals comprises a directional doppler means.

35. The invention as defined in claim 31 wherein said memory means comprises a log amplifier circuit.

36. The invention as defined in claim 1 wherein said transmitter and receiver comprise dual diplex modulator and demodulator circuits.

37. The invention as defined in claim 1 wherein said transmitter and receiver comprise dual diplex modulator and demodulator circuits.

* * * * *